United States Patent
Dearing et al.

(10) Patent No.: US 11,423,419 B2
(45) Date of Patent: Aug. 23, 2022

(54) SYSTEM AND METHOD FOR RETRIEVING CONTENT ASSOCIATED WITH DISTRIBUTION ITEMS

(71) Applicant: United States Postal Service, Washington, DC (US)

(72) Inventors: Stephen M. Dearing, Herndon, VA (US); Kuldip K. Goyal, Alexandria, VA (US); Gary C. Reblin, Falls Church, VA (US); Margaret L. Choiniere, Gainesville, VA (US)

(73) Assignee: United States Postal Service, Washington, DC (US)

( * ) Notice: Subject to any disclaimer, the term of this patent is extended or adjusted under 35 U.S.C. 154(b) by 194 days.

(21) Appl. No.: 16/523,499

(22) Filed: Jul. 26, 2019

(65) Prior Publication Data
US 2019/0354996 A1   Nov. 21, 2019

Related U.S. Application Data

(62) Division of application No. 13/554,476, filed on Jul. 20, 2012, now Pat. No. 10,510,084.
(Continued)

(51) Int. Cl.
*G06Q 20/00*   (2012.01)
*G06Q 30/02*   (2012.01)
(Continued)

(52) U.S. Cl.
CPC ............... *G06Q 30/02* (2013.01); *B07C 3/18* (2013.01); *G06Q 30/0601* (2013.01);
(Continued)

(58) Field of Classification Search
CPC ...... G06Q 30/02; G06Q 50/32; G06Q 50/184; G06Q 30/0601; B07C 3/18; B07C 2301/0066
(Continued)

(56) References Cited

U.S. PATENT DOCUMENTS

| | | | |
|---|---|---|---|
| 4,796,196 A | 1/1989 | Durst, Jr. et al. | |
| 4,800,505 A | 1/1989 | Axelrod et al. | |

(Continued)

FOREIGN PATENT DOCUMENTS

| | | |
|---|---|---|
| EP | 0 673 686 A1 | 9/1995 |
| EP | 1 022691 A2 | 7/2000 |

(Continued)

OTHER PUBLICATIONS

International Search Report & Written Opinion dated Mar. 25, 2013 in International Application No. PCT/US2012/47648 filed Jul. 20, 2012.

(Continued)

*Primary Examiner* — Dante Ravetti
(74) *Attorney, Agent, or Firm* — Knobbe Martens Olson & Bear, LLP

(57) ABSTRACT

Systems, methods and apparatus are disclosed for providing content associated with an information item on a distribution item using a computing device. In one aspect a method includes identifying an image of an information item on a distribution item. The method further includes processing, in a processor the image, to generate a data item determined by the information item. The method further includes decoding the data item to determine a set of attributes of the distribution item. The method further includes retrieving content associated with the distribution item using at least one of the attributes in the set of attributes. The method further includes delivering content associated with the distribution item.

10 Claims, 28 Drawing Sheets

Related U.S. Application Data

(60) Provisional application No. 61/512,343, filed on Jul. 27, 2011, provisional application No. 61/510,456, filed on Jul. 21, 2011.

(51) Int. Cl.
| | |
|---|---|
| *G06Q 50/18* | (2012.01) |
| *G06Q 30/06* | (2012.01) |
| *G06Q 50/32* | (2012.01) |
| *B07C 3/18* | (2006.01) |

(52) U.S. Cl.
CPC ........... *G06Q 50/184* (2013.01); *G06Q 50/32* (2013.01); *B07C 2301/0066* (2013.01)

(58) Field of Classification Search
USPC .............................................. 705/16, 21, 59
See application file for complete search history.

(56) References Cited

U.S. PATENT DOCUMENTS

| | | |
|---|---|---|
| 4,831,555 A | 5/1989 | Sansone et al. |
| 4,979,605 A | 12/1990 | Svyatsky |
| 5,005,124 A | 4/1991 | Connell et al. |
| 5,079,714 A | 1/1992 | Manduley et al. |
| 5,161,109 A | 11/1992 | Keating et al. |
| 5,229,932 A | 7/1993 | Connell et al. |
| 5,319,181 A | 6/1994 | Shellhammer et al. |
| 5,420,403 A | 5/1995 | Allum et al. |
| 5,422,821 A | 6/1995 | Allen et al. |
| 5,424,524 A | 6/1995 | Ruppert et al. |
| 5,470,427 A | 11/1995 | Mikel et al. |
| 5,514,863 A | 5/1996 | Williams |
| 5,602,382 A | 2/1997 | Ulvr et al. |
| 5,612,889 A | 3/1997 | Pintsov et al. |
| 5,682,429 A | 10/1997 | Cordery et al. |
| 5,703,783 A | 12/1997 | Allen et al. |
| 5,731,574 A | 3/1998 | Bodie et al. |
| 5,737,729 A | 4/1998 | Denman |
| 5,770,841 A | 6/1998 | Moed et al. |
| 5,781,634 A | 7/1998 | Cordery et al. |
| 5,790,429 A | 8/1998 | Baker et al. |
| 5,862,243 A | 1/1999 | Baker et al. |
| 5,871,288 A | 2/1999 | Ryan, Jr. et al. |
| 5,925,864 A | 7/1999 | Sansone et al. |
| 5,930,796 A | 7/1999 | Pierce |
| 5,953,427 A | 9/1999 | Cordery et al. |
| 5,984,174 A | 11/1999 | Kato et al. |
| 6,032,138 A | 2/2000 | McFiggans et al. |
| 6,055,520 A | 4/2000 | Heiden et al. |
| 6,125,357 A | 9/2000 | Pintsov |
| 6,131,101 A | 10/2000 | Maitino et al. |
| 6,175,827 B1 | 1/2001 | Cordery et al. |
| 6,176,428 B1 | 1/2001 | Joseph et al. |
| 6,178,411 B1 | 1/2001 | Reiter |
| 6,178,412 B1 | 1/2001 | Ratzenberqer, Jr. et al. |
| 6,189,784 B1 | 2/2001 | Williams et al. |
| 6,253,219 B1 | 6/2001 | Gardner et al. |
| 6,269,344 B1 | 7/2001 | Junger |
| 6,292,709 B1 | 9/2001 | Uhl et al. |
| 6,311,104 B1 | 10/2001 | Shea et al. |
| 6,370,446 B1 | 4/2002 | Divine et al. |
| 6,371,521 B1 | 4/2002 | Petkovsek |
| 6,385,504 B1 | 5/2002 | Pintsov et al. |
| 6,457,012 B1 | 9/2002 | Jatkowski |
| 6,527,179 B1* | 3/2003 | Itoh .................... G06K 7/1465 235/462.01 |
| 6,532,452 B1 | 3/2003 | Pintsov et al. |
| 6,536,659 B1 | 3/2003 | Hauser et al. |
| 6,542,933 B1 | 4/2003 | Durst, Jr. et al. |
| 6,549,892 B1 | 4/2003 | Sansone |
| 6,557,000 B1 | 4/2003 | Seestrom et al. |
| 6,629,642 B1 | 10/2003 | Schwartz et al. |
| 6,680,783 B1 | 1/2004 | Pierce et al. |
| 6,741,724 B1 | 5/2004 | Bruce et al. |
| 6,826,548 B2 | 11/2004 | Hungerpiller et al. |
| 6,865,561 B1 | 3/2005 | Allport et al. |
| 6,938,023 B1 | 8/2005 | Ryan et al. |
| 7,085,811 B2 | 8/2006 | Sansone et al. |
| 7,096,192 B1 | 8/2006 | Pettitt |
| 7,328,085 B2 | 2/2008 | Fogel et al. |
| 7,346,591 B2 | 3/2008 | Sansone |
| 7,558,380 B2 | 7/2009 | DiVEnuta et al. |
| 7,647,231 B2 | 1/2010 | Kuebert et al. |
| 7,734,729 B2 | 6/2010 | Du et al. |
| 7,797,199 B2 | 9/2010 | Forshaw et al. |
| 2001/0010334 A1 | 8/2001 | Park et al. |
| 2001/0032881 A1 | 10/2001 | Wells et al. |
| 2001/0052545 A1 | 12/2001 | Serebrennikov |
| 2002/0059430 A1 | 5/2002 | Orbke et al. |
| 2002/0065728 A1 | 5/2002 | Ogasawara |
| 2002/0143431 A1 | 10/2002 | Sansone |
| 2003/0126036 A1 | 7/2003 | Mascavage, III et al. |
| 2003/0172272 A1 | 9/2003 | Ehlers et al. |
| 2003/0200184 A1 | 10/2003 | Dominguez et al. |
| 2004/0019563 A1 | 1/2004 | Sines et al. |
| 2005/0045728 A1 | 3/2005 | Kargman |
| 2005/0171841 A1 | 8/2005 | Prorock et al. |
| 2005/0184160 A1 | 8/2005 | Steinmetz et al. |
| 2005/0236480 A1 | 10/2005 | Vrotsos et al. |
| 2005/0286463 A1 | 12/2005 | Matsumoto |
| 2006/0010086 A1 | 1/2006 | Klein |
| 2006/0026097 A1 | 2/2006 | Nethery, III |
| 2006/0080266 A1 | 4/2006 | Kiani et al. |
| 2006/0098874 A1 | 5/2006 | Lev |
| 2006/0180647 A1 | 8/2006 | Hansen |
| 2006/0259440 A1 | 11/2006 | Leake et al. |
| 2006/0271236 A1 | 11/2006 | Rosen et al. |
| 2007/0124596 A1 | 5/2007 | Chevrel et al. |
| 2008/0127331 A1 | 5/2008 | Seidman et al. |
| 2008/0147652 A1 | 6/2008 | Kirkpatrick |
| 2008/0269946 A1 | 10/2008 | Kiani et al. |
| 2009/0012885 A1 | 1/2009 | Cahn |
| 2009/0057207 A1 | 3/2009 | Orbke et al. |
| 2009/0143898 A1 | 6/2009 | Kiani et al. |
| 2010/0057247 A1 | 3/2010 | Frankenberg et al. |
| 2010/0106290 A1 | 4/2010 | Isles et al. |
| 2010/0174599 A1 | 7/2010 | Rosenblatt et al. |
| 2010/0292833 A1 | 11/2010 | Gorp et al. |
| 2011/0082747 A1* | 4/2011 | Khan ................. G06Q 30/0261 709/204 |
| 2011/0131062 A1 | 6/2011 | Menschik et al. |
| 2013/0169686 A1 | 7/2013 | Saunders |
| 2020/0174599 A1* | 6/2020 | Frey ........................ G06F 3/045 |

FOREIGN PATENT DOCUMENTS

| | | |
|---|---|---|
| JP | 7-171505 A | 7/1995 |
| JP | 2000-334389 A | 12/2000 |
| KR | 2001-0064264 | 7/2001 |
| WO | WO 00/10113 A1 | 2/2000 |
| WO | WO2004/080097 | 9/2004 |
| WO | WO2005/003926 | 1/2005 |

OTHER PUBLICATIONS

The International Search Report, International Application No. PCT/US 06/48920, dated Oct. 26, 2007, 2 pgs.
The International Search Report and Written Opinion for International Application No. PCT/US 2008/051501, dated May 20, 2008, 6 pgs.
Address Change Service Application, Address Change Service Department, National Address Information Center.
Augmented Planet, "The worlds first augmented reality stamp," Sep. 8, 2010, http://www.augmentedplanet.com/2010/09/the-worlds-first-augmented-reality-stamp/, printed Sep. 11, 2012.
Federal Register Notice, Implementation of New Standards for Intelligent Mail Barcodes, 73 Fed. Reg. 49,333 (Aug. 21, 2008).
Information Disclosure Statement filed on Jan. 31, 2007, in U.S. Appl. No. 90/008,470.
Letter from U. S. Postal Services addressed to Honorable Thomas C. Sawyer, Nov. 24, 1993.

(56) References Cited

OTHER PUBLICATIONS

Letter from U.S. House of Representatives addressed to Honorable Marvin Runyon, Oct. 5, 1993.
Letter from U.S. Postal Service addressed to Managers Sales (Area), Dec. 20, 1994.
Letter from U.S. Postal Service, Customer and Automation Service Department, Aug. 28, 1991.
Letter from U.S. Postal Service, National Customer Support Center, Aug. 8, 1996.
Postal Automated Redirection System—The USPS Solution, 13th International Conference on Postal Automation, May 23-28, 1999.
Supplemental Information Disclosure Statement filed on Apr. 14, 2008, in U.S. Appl. No. 90/008,470.
Supplemental Information Disclosure Statement filed on Apr. 29, 2009, in U.S. Appl. No. 90/008,470.
Supplemental Information Disclosure Statement filed on Jul. 16, 2008, in U.S. Appl. No. 90/008,470.
Supplemental Information Disclosure Statement filed on Jun. 29, 2007, in U.S. Appl. No. 90/008,470.
Supplemental Information Disclosure Statement filed on Nov. 21, 2007, in U.S. Appl. No. 90/008,470.
Supplemental Information Disclosure Statement filed on Nov. 9, 2009, in U.S. Appl. No. 90/008,470.
The Federal Register, vol. 62, No. 60, pp. 15055-15065, Mar. 28, 1997.
ToolWatch Visibility, Product Sheet for Nextel Mobile Phone Scanner AC25, http://www.toolwatch.com/accessories_scanning_ac25.htm, printed Apr. 7, 2011.
U.S. Postal Service, A Guide to Intelligent Mail for Letters and Flats (Dec. 2008) Part 1.
U.S. Postal Service, A Guide to Intelligent Mail for Letters and Flats (Dec. 2008) Part 2.
U.S. Postal Service, Confirm Service Featuring OneCode Confirm: Publication 197 (Mar. 2008).
U.S. Postal Service, Intelligent Mail Barcode Guide (Jun. 2008).
U.S. Postal Service, Intelligent Mail Barcode Technical Resource Guide (Apr. 10, 2008).
United States Postal Service, Address Change Service, Addendum to Publication 8 Address Change Service, Publication 8, Sep. 1998.
United States Postal Service, Address Change Service, Creative Solutions for Your Business Needs, News Briefs, Publication 8, Jul. 1990.
United States Postal Service, Address Change Service, Third-Class Address Change Service, Sep. 13, 1988.
United States Postal Service, Draft Information-Based Indicia Program (IBIP) Performance Criteria for Information-Based Indicia and Security Architecture for Closed IBI Postage Meterina Systems (PCIBI-C), Jan. 12, 1999.
United States Postal Service, National Customer Support Center, Move Update, pp. 1-12, Apr. 1997.
United States Postal Service, Postal Bulletin, Second-Generation Address Change Service, PB 21798, Sep. 19, 1991.
United States Postal Service, The Mailroom Companion, vol. 2, No. 2, pp. 1-8, Feb. 1997.
United States Postal Service, Your Guide to Address Change Services, DD. 1-25, May 1, 1991.

\* cited by examiner

SYSTEM AND METHOD FOR RETRIEVING CONTENT ASSOCIATED WITH DISTRIBUTION ITEMS

CROSS REFERENCES TO RELATED APPLICATIONS

This application is a divisional of U.S. patent application Ser. No. 13/554,476 entitled "SYSTEM AND METHOD FOR RETRIEVING CONTENT ASSOCIATED WITH DISTRIBUTION ITEMS" filed on Jul. 20, 2012, which claims benefit under 35 U.S.C. § 119(e) to U.S. Provisional Patent Application No. 61/510,456 entitled "INTELLIGENT BARCODE CONTENT RETRIEVAL SYSTEMS" filed on Jul. 21, 2011, and which further claims benefit under 35 U.S.C. § 119(e) to U.S. Provisional Patent Application No. 61/512,343 entitled "CONTENT RETRIEVAL SYSTEMS FOR DISTRIBUTION ITEMS" filed on Jul. 27, 2011. The disclosures of all applications referenced above are hereby incorporated by reference in their entirety.

BACKGROUND

Field

This development relates to using information affixed to a distribution item and methods and systems of processing distribution items using information affixed to a distribution item to link recipients with additional content and/or services associated with the distribution item.

Background

Mailers that use the mail delivery systems typically affix data such as barcodes to their distribution items such as mail pieces to help the mailing system sort, track, and deliver the distribution items. Conventionally, mailing systems offer automation discounts for mailers that place such information on their mail pieces. In addition to offering automation discounts, mailing systems can provide additional services to meet the business needs of mailers. Mailers, and in particular business mailers, typically want to know where their mail is in the mail stream, how it is being processed by the mailing system, when their mail pieces are delivered, and how complete and accurate their addresses are. Mailers also seek access to more data about their mail pieces as they travel through the mail stream. Mailing services seek such data to monitor processing, improve services, reduce costs, and accurately calculate postal charges. Further, mailing services seek to expand the scope and type of services that may be provided through the delivery and receipt of distribution items.

For example, when a distribution item is sent, the mailer may wish to encourage or provide additional information or offerings beyond what is cost effective or possible to provide with the distribution item itself. While a distribution item may include information that provides instructions or requests for how a recipient may be provided with further information or services, in many scenarios, the recipient may be unwilling to take further action due to inconvenience or difficulty. As such, the services and offerings provided by a mailer to a recipient may be limited to the contents of the distribution item itself. Obtaining the participation of a recipient in additional interactive offerings may be difficult.

SUMMARY

Various embodiments of systems, methods and devices within the scope of the appended claims each have several aspects, no single one of which is solely responsible for the desirable attributes described herein. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims.

An embodiment provides a computerized method. The computerized method includes identifying an image of an information item on a distribution item. The computerized method further includes processing, in a processor the image, to generate a data item determined by the information item. The computerized method further includes decoding the data item to determine a set of attributes of the distribution item. The computerized method further includes retrieving content associated with the distribution item using at least one of the attributes in the set of attributes. The computerized method further includes delivering content associated with the distribution item.

One embodiment provides a computing device. The computing device includes an image capture device. The computing device includes a processor. In some aspects, the processor can receive image data from the image capture device. In some aspects, the processor can identify an image of an information item on a distribution item using the image data and generate a data item determined by the information item. The computing device includes a decoder component. In some aspects, the decoder component can decode the data item to determine a set of attributes of the distribution item. The computing device includes a network component. In some aspects, the network component can transmit at least one of the attributes in the set of attributes and receive a response indicating content associated with the distribution item. The computing device includes a display device configured to display the image of the information item and to display the content associated with the distribution item.

One embodiment provides a computing device. The computing device includes an image capture device. The computing device includes a processor. In some aspects, the processor can receive image data from the image capture device. In some aspects, the processor can identify an image of an information item on a distribution item using the image data and generate a data item determined by the information item. The computing device includes a network component. In some aspects, the network component can transmit the data item to a decoder service and receive a response from the decoder service indicating content associated with the distribution item. The computing device includes a display device. In some aspects, the display device can display the image of the information item and display the content associated with the distribution item.

An embodiment provides a system. The system includes a computing device. The computing device includes an image capture device and a processor. In some aspects, the processor can receive image data from the image capture device. In some aspects, the processor can identify an image of an information item on a distribution item using the image data and generate a data item determined by the information item. The computing device includes a network component that can transmit the data item. The computing device includes a display device. The system includes a server, remote from the computing device that can receive the data item. The server includes a decoding component. In some aspects, the decoding component can decode the data item to determine a set of attributes of the distribution item. The server includes a processing component. In some aspects, the processing component can retrieve content associated with the distribution item using at least one attribute in the set of attributes of the distribution item. In some aspects, the server can send a message to the computing device indicating content associated with the distribution item. In some aspects, the display device can display the image of the decoded value and display the content associated with the distribution item in response to the message from the server.

An embodiment provides a computerized method. The computerized method includes retrieving an image of an information item from a distribution item using a computing device. The computerized method includes processing in a processor the image so as to decode the information item to determine a set of attributes of the distribution item. The computerized method includes retrieving content associated with the distribution item using at least one of the attributes in the set of attributes. The computerized method includes enabling the computing device to display the content associated with the distribution item.

An embodiment provides a computerized method. A computerized method includes receiving a message including data associated with an information item affixed to a distribution item. A computerized method includes determining in a processor a set of attributes of the distribution item based on the data associated with the information item affixed to the distribution item. A computerized method includes determining content associated with the distribution item using at least one of the attributes in the set of attributes. A computerized method includes sending the content to a computing device.

An embodiment provides a system. The system includes a database. In some aspects, the database can store information associating an attribute of a distribution item with a content item. The system includes a processor. In some aspects, the processor can receive information associated with an information item affixed to a distribution item over a network. In some aspects, the processor can determine a set of attributes of the distribution item based on the information associated with the information item. In some aspects the processor can query the database to retrieve a content item associated with at least one of the attributes in the set of attributes. In some aspects the processor can send the content item to a computing device.

An embodiment provides a computing device for processing a distribution item. The device includes means for identifying an image of an information item on the distribution item. The device further includes means for processing to generate a data item determined by the information item. The device further includes means for decoding the data item to determine a set of attributes of the distribution item. The device further includes means for retrieving content associated with the distribution item using at least one of the attributes in the set of attributes. The device further includes means delivering content associated with the distribution item.

Figure 1:
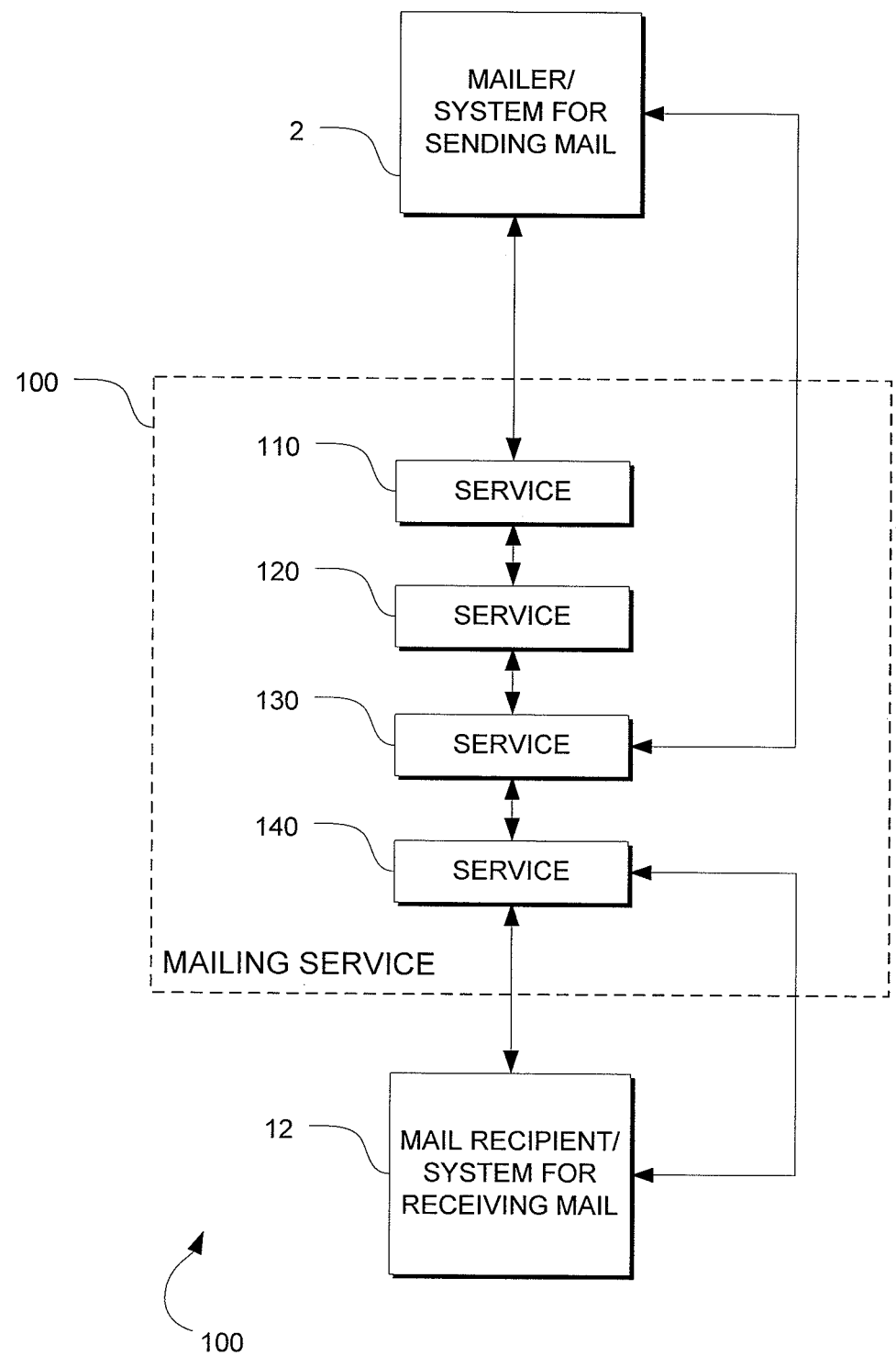
FIG. 1 is a top level block diagram illustrating one embodiment of a mailing system using various types of information affixed to a physical distribution item for mailing.

Various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Embodiments of the developments described herein can include such features as, but not limited to, the use of data that may be extracted from a physical distribution item for associating content with distribution items using a computing device. Individually or in combination, systems according to embodiments of the development can allow computing devices to access content associated with distribution items using data that may be extracted from a physical distribution item.

Persons of skill in the art will understand that mailing systems are but one embodiment of the development, and described herein for purposes of disclosure. Mailing systems, methods, and processes as described herein can be broadly interpreted to include, for example, shipping systems; warehouse receipt, storage, and delivery systems; and baggage handling systems. Similarly, distribution items as described herein can be broadly interpreted to include, for example, mail pieces, letters, postcards, parcels, bags in a baggage handling system, packages in a shipping system, shipping containers in a long distance transport system, and objects in a warehousing system.

FIG. 1 is a top level block diagram illustrating one embodiment of a mailing system 100 using various types of information affixed to a physical distribution item for mailing. The information affixed to a distribution item may include barcodes (e.g., 1D, 2D, and 3D barcodes), postage, permits, mailing system provider markings, address information, images, short-range wireless objects (e.g., radio-frequency identification (RFID) tags), and the like. A mailer 2 transmits distribution items to a mailing service 100. In one embodiment, the mailer 2 transmits a distribution item to the mailing service 100 in order for the mailing service 100 to deliver the distribution item to a mail recipient 12. The mailer 2 is not limited to mail preparers and mail owners, and can include a system for sending mail. Systems for sending mail can include, for example, presort mailers who perform automated processing of distribution items from multiple mail owners or customers. These systems can receive mail in batches from different customers, combine and sort the batches to obtain postage discounts, and then transmit the combined mailing to the mailing service 100. The mailer 2 may also transmit data or other information to the mailing service 100, in addition to transmitting a mailing to the mailing service 100. In one embodiment, the mailing service 100 transmits distribution items back to the mailer 2. In another embodiment, the mailing service 100 transmits data or information back to the mailer 2, indicating, for example, receipt of a mailing.

The mailing service 100 can be configured to perform various services on mail transmitted by the mailer 2. Such services are represented by service modules 110, 120, 130, and 140. Services can include but are not limited to sorting, tracking, address correction, mail return, mail forwarding, and mail delivery services. The service modules 110, 120, 130, and 140 can transmit entire mailings or individual distribution items to a different service module. In one embodiment, a service module 110, 120, 130 or 140 can transmit one or more distribution items back to the mailer 2. In the embodiment illustrated in FIG. 1, the service module 130 transmits one or more distribution items to the mailer 2. In another embodiment, a service module, such as but not limited to the service module 130, transmits data or other information to the mailer 2. Such data or other information can include for example, information on a service that is planned to be performed, is currently being performed, or has been performed on one or more distribution items. Similarly, the mailer 2 can transmit data or other information directly to the service module 130, or any other suitable service module included in the mailing service 100.

In one embodiment, the mailing service 100 delivers distribution items or a mailing to the mail recipient 12. The mail recipient 12 is not limited to individuals or businesses, and includes systems for receiving mail. Academic institutions, hospitals, prisons, and other facilities may encompass such systems for receiving mail, for example. In one embodiment, the mailing service 100 transmits data or other information to the mail recipient 12, including but not limited to data or information on distribution items scheduled to be delivered to the mail recipient 12. In another embodiment, the mail recipient 12 transmits distribution items or a mailing to the mailing service 100. The mailing recipient 12 may also transmit data or other information to the mailing service 100. In yet another embodiment, the mailing service 100 transmits data or information to the mailing recipient 12, indicating, for example, receipt of a mailing from the mailing recipient 12. In yet another embodiment, a service module, such as but not limited to the service module 140, transmits data or other information to the mail recipient 12. Similarly, the mail recipient 12 can transmit data or other information directly to the service module 140, or any other suitable service module included in the mailing service 100. While embodiments described herein refer to a mailer 2 and mailing service 100, it should be appreciated that embodiments described herein may be applicable to any sort of item that may be distributed by a number of different types of entities.

As described above, a mailer may wish to encourage or provide additional information or offerings beyond what is cost effective or possible to provide with a physically delivered distribution item. While a distribution item may include information that provides instructions or requests for how a recipient may be provided with further information or services, in many scenarios, the recipient may be unwilling or unable to take further action due to inconvenience or difficulty. As such, the services and offerings provided by a mailer to a recipient may be limited to the contents of the distribution item itself. As such, providing method and systems for obtaining the participation of a recipient in additional interactive offerings is desirable. Moreover, expanding the user experience associated with receiving a distribution item may allow mailers to expand advertising and other opportunities associated with sending distribution items.

According to one embodiment, an expanded user experience may be provided to a recipient 12 of the distribution item by using information affixed to a distribution item. This information may be information already be affixed to the mail piece and used to route, track, and sort packages in a mailing system 100. This information may also be affixed to the distribution item 8 for the purpose of being used to provide access to expanded offerings associated with the distribution item 8. For example, a mailer 2 of a distribution item may desire to provide a recipient 12 with further information or additional offerings associated with a distribution item in addition to the content of the distribution item itself. For example, a mailer 2 who mails a product offering may wish to encourage a recipient 12 to look at other product offerings in addition to any product offering included in a mailing. Additionally, a mailer may wish to encourage a recipient to participate in an interactive offering that is available via the Internet or take advantage of an online service associated with a mail piece that would ask the recipient to follow instructions included in the distribution item.

Figure 2:
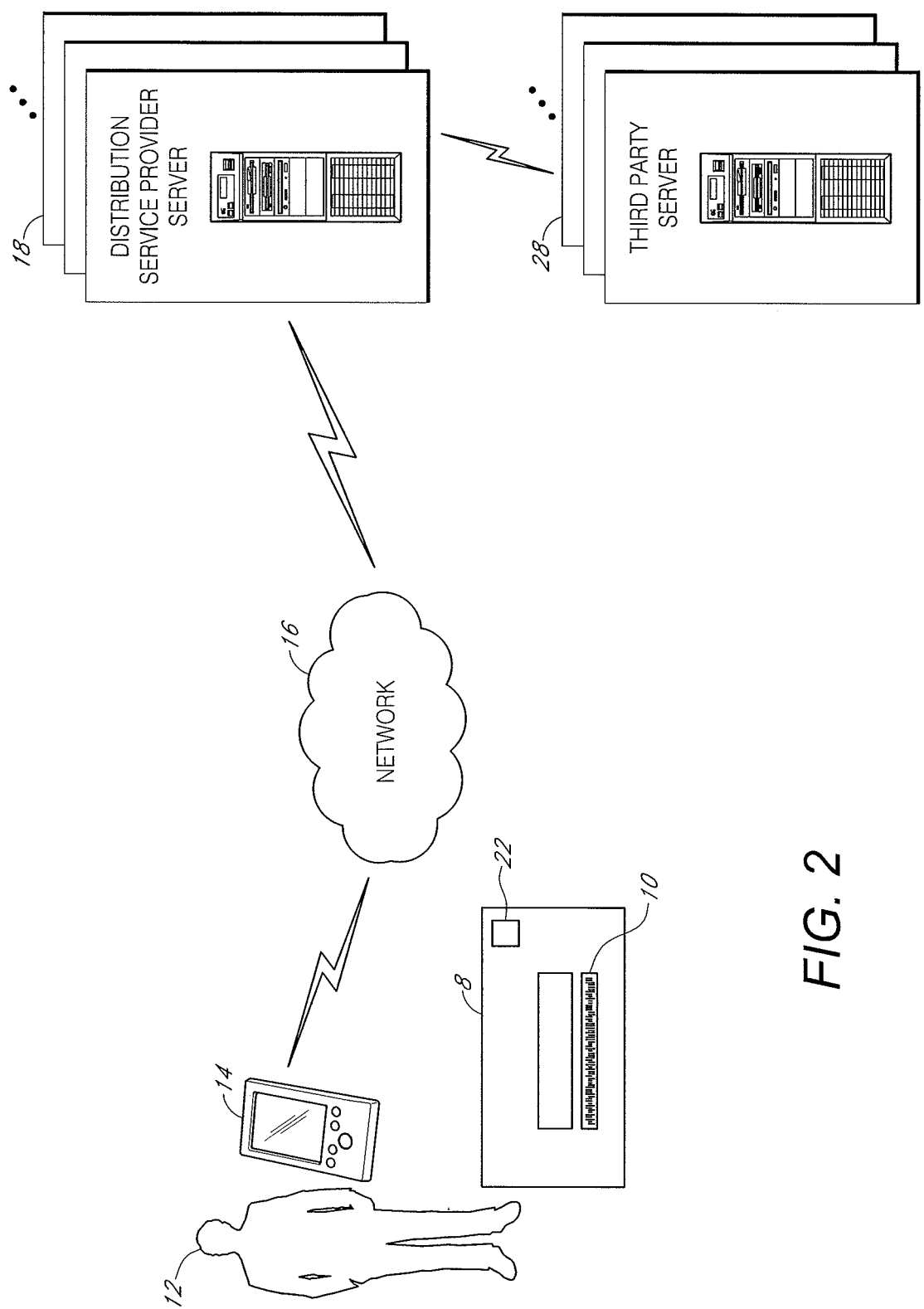
FIG. 2 shows an example of a system for providing content associated with a distribution item to the recipient of a distribution item by using an information item affixed to or printed on the distribution item.

FIG. 2 shows an example of a system for providing content associated with a distribution item 8 to the recipient 12 of a distribution item 8 by using an information item 10 affixed to or printed on the distribution item 8. The distribution item 8 may include a letter, a postcard, a package, or the like. A recipient 12 may be an individual or any entity to which a distribution item 8 may be addressed. In addition, while the information item 10 is shown as a barcode, the information item 10 may include one or more of encoded values, postage 22, permits, mailing system markings, images, short-range wireless objects (e.g., objects using RFID and near field communication (NFC)), and any other information or indicia that can be used in some way to identify information about a distribution item 8 or content associated therewith. Affixing an information item 10 may refer to information that is attached, printed, imprinted, embossed, provided, delivered along with, or any other method of providing information with a distribution item 8 that allows a computing device to extract and/or derive data from the information item 10.

The information item 10 and other information may allow association of the distribution item 8 and/or contents thereof with additional content that may be determined by the mailer 2 or operator of the mail service. The content may include further information, service offerings, interactive service offerings, tracking information, or the like as will be further described below. This content may be identified by information stored in a remote server 18 which is able to identify content associated with information derived from the information item 10 provided with the distribution item 8. As such, the information item 10 may be configured to be in a machine readable (or machine extractable) format. A computing device 14, operated by the recipient 12, may be used to process the information item 10 (e.g., a barcode 10, postage 22, etc) to extract and/or derive data from the information item 10. The computing device may send the derived data over a network 16 to retrieve content associated with the distribution item 8 and/or contents thereof. The computing device 14 may be a smart phone, a PDA, a laptop, a desktop computer, a tablet computer, or the like. The data derived from the information item 10 may then be provided by the computing device 14 to a server 18, such as a web server, to retrieve the content or an indication of content associated with the distribution item. The remote server 18 may be associated with the entity operating the mail distribution service. The remote server 18 may also connect with a third party server 28 to access and/or generate content using information sent from the computing device 14 as will be described in further detail below. The remote server 18 may then deliver the content to the computing device 14 over the network 16.

In one embodiment, a message provided by the server 18 may include a link to content associated with the distribution item 8 and/or the contents thereof. The link may be used by the computing device 14 to access additional content and/or services. For example, a link to content may be a uniform resource locator (URL) that allows a web browser on a computing device 14 to load additional content. In other embodiments, content such as media files may be delivered directly to the computing device 14 by the remote server 18.

As just described, the computing device 14 may use the information item 10 to provide additional interactive services and offerings associated with the distribution item 8 such as online content, applications, and further offerings. In one aspect, the content may be referred to as "augmented reality," as the information item 10 on a distribution item 8 may be used to provide a virtual or augmented experience with respect to a fixed piece of information or image (that may be the information item 10) affixed to a distribution item 8. For example, the content provided to the recipient using the computing device 14 may provide an expanded virtual experience for an image affixed to a distribution item.

In other words, the distribution item 8 may provide a direct way to augment its contents via the computing device 14. As such, a mailer 2 may setup access to additional services or offerings to any recipient 12 with a computing device 14.

As will be further described below, the mailer 2 may thus expand offerings and information associated with a mailing, while a recipient able to decode the information may be able to more easily and conveniently access interactive content and additional services associated with a received distribution item 8. In one aspect, using an information item 10 provided by the mailing service or other type of distribution entity (e.g., the U.S. Postal Service) may allow for using information already needed and/or obtained by the distribution entity to route and send the distribution item 8 to additionally allow for additional content. This may allow a mailer 2 to avoid having to develop and design other proprietary systems for provided expanded content to the user associated with the mail piece. As such, there may be many advantages to using an information item 10 provided by the distribution entity to route and send packages to additionally provide a mechanism to provide a recipient 12 with interactive services/offerings associated with the contents of a distribution item 8.

The development contemplates a wide variety of content and/or services that may be provided according to the system described in FIG. 2 as further disclosed by the description below. According to one embodiment, a distribution item 8 may include an advertisement for a product or offering. When the recipient processes an information item 10, such a barcode, with the computing device 14 the computing device 14 may present the recipient with additional information about the advertised product or may provide an additional discount for product purchase to the recipient. Further examples of the types of content and offerings that may be available are described below.

Figure 3:
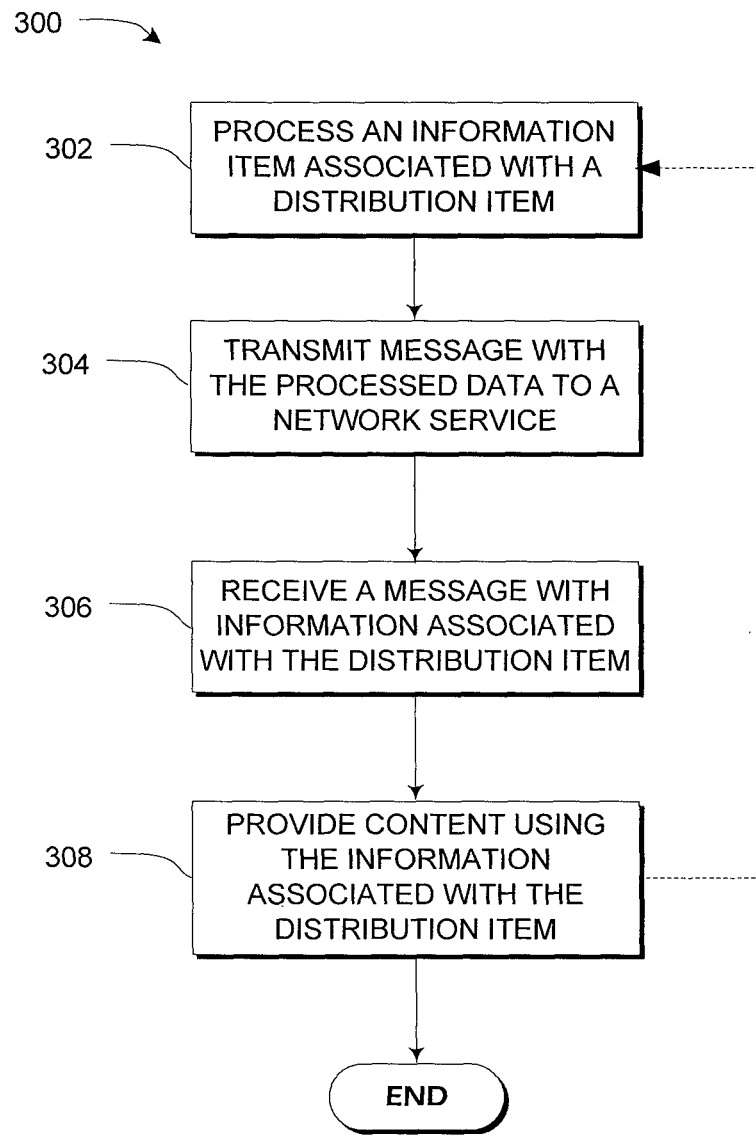
FIG. 3 shows a flowchart of an exemplary method for providing content associated with a distribution item to a recipient using a computing device operated by the recipient as shown in FIG. 2.

FIG. 3 shows a flowchart of an exemplary method 300 for providing content associated with a distribution item 8 to a recipient 12 using a computing device 14 operated by the recipient 12 as shown in FIG. 2. In one embodiment, the method 300 may begin after a distribution item with an information item 10 is received by a recipient 12. The information item 10 may be any of items described above, such as an encoded value (e.g., a barcode), or as those described below. In block 302, a computing device 14 processes the information item 10. The processing may include capturing information about the encoded value, and decoding or preparing the encoded value so that it may be used by a network service to determine information associated with the mail piece as will be further described below. In one embodiment, processing the information item 10 may include capturing an image of at least a portion of the distribution item 8 including the information item 10 and performing image processing to extract information from the image. If the information item is an image, processing may include performing image recognition. In addition, if an information item 10 includes alphanumeric characters, processing may include capturing an image of the information item 10 and performing optical character recognition (OCR). Furthermore, if an information item 10 is stored within an RFID tag (not shown), processing may include reading the contents of the RFID tag with an RFID tag reader in the computing device 14. Those of skill in the art will appreciate the variety of methods that may be used to process an information item 10 associated with a distribution item 8 using a computing device 14.

After processing the information item 10, in block 302, the computing device 14 may transmit a message with the processed data determined from the information item 10 to a network service as depicted in block 304. In one embodiment, the network service may be provided, for example, by a remote server 18. In another embodiment, the network service may be provided by a cloud service. In some embodiments, the processed data may be an image of the information item 10 prepared for decoding/performing image recognition by the network service. In other embodiments, the processed data may be a decoded or partially decoded value which may be used by the network service to determine information associated with the distribution item 10, as will be described in further detail below.

In block 306, the computing device 14 may receive a message including information associated with the distribution item 8. This information may be provided in a variety of forms, such as text viewable on the computing device 14, a link to further content accessible via a web browser on the computing device 14, media files, or other information that may be used by the computing device 14 to access information associated with the mail piece 8. It should be appreciated that block 306 is optional, as in some embodiments, the computing device 14 may determine content associated with the distribution item without relying on a network service. In block 308, the computing device may then use the information to provide content and/or services associated with the distribution item 8. For example, if the information received is a URL, the computing device 14 may be automatically triggered to open up a web browser that will provide functionality for displaying the content associated with the link. If the information received is content, an application on the computing device 14 may be configured to display the content to the user. If the content is audio-based content, the computing device 14 may play the audio using internal or integrated speakers. In some embodiments, the content may trigger a computing device 14 to provide haptic feedback. Further examples of the types of content, services, and offerings that may be provided via the computing device will be further described below. The method shown in FIG. 3 may be repeated for additional distribution items with associated information items.

Figure 4:
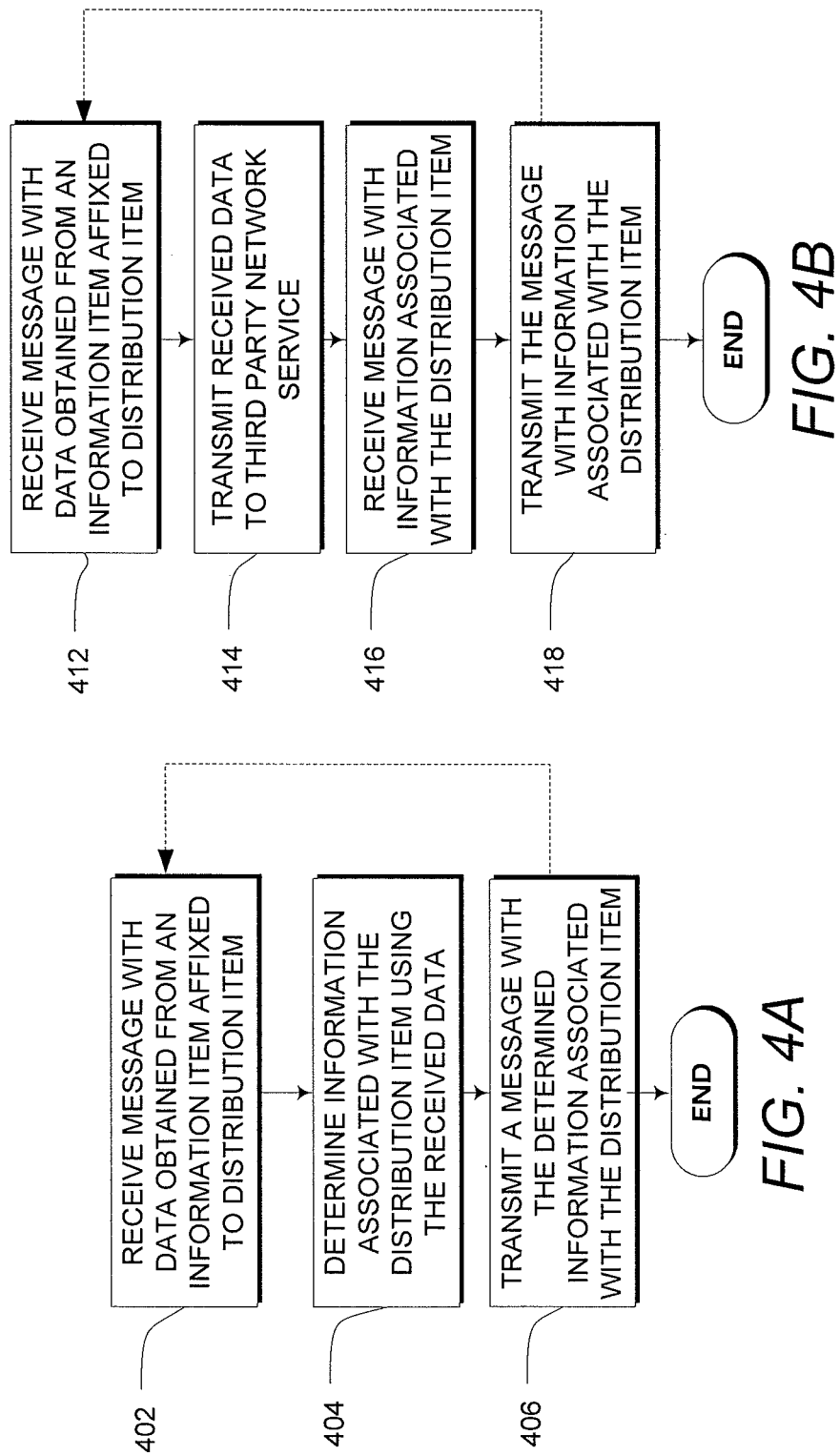
FIG. 4A shows a flowchart of an exemplary method for determining content associated with a distribution item using data derived from an information item affixed to the distribution item.
FIG. 4B shows another flowchart of an exemplary method for determining content associated with a distribution item using data derived from an information item affixed to the distribution item.

FIG. 4A shows a flowchart of an exemplary method for determining content associated with a distribution item 8 using data derived from an information item 10 affixed to the distribution item 8. In block 402, a network service may receive a message with data obtained from an information item 10 affixed to a distribution item 8. The data may provide information to identify the source of the mailer, a particular type of mailing, information about the contents of the distribution item 8, a unique identifier of the distribution item 8, and the like. Furthermore, the message may include other information regarding the computing device 14. For example, the message may include the geographical location of the computing device 14, the date/time, proximity to an object, or previous actions of a user.

In block 404, the network service may determine information associated with the distribution item 8 using the received data. The data may be used to identify targeted/customized content associated with the distribution item 8. In some embodiments, the content associated with the distribution item 14 may be pre-stored and may be accessed via a storage mechanism such as a database. In another embodiment, the content may be dynamically generated based on the data. In one embodiment, the network service may perform additional processing on the data received in order to further identify the distribution item and content associated therewith. For example, if the data includes an image, the network service provider may be configured to perform image recognition to determine the contents of the image in order to know what content is associated with the distribution item 8. Once content has been identified, then in block 406, the network service transmits a message with the determined information associated with the distribution item 8 to a computing device 14.

FIG. 4B shows another flowchart of an exemplary method for determining content associated with a distribution item 8 using data derived from an information item 10 affixed to the distribution item 8. As in block 402 of FIG. 4A, in block 412, a network service may receive a message with data obtained from an information item 10 affixed to a distribution item 8. In block 414, received data is transmitted to a third party network service. The third party network service may be located on another server 22, or may be a cloud service, or the like. In one embodiment, further processing of the received message may be performed by the network service before transmitting the received data to the third party network service. For example, if the message includes an image, the network service may perform image recognition on the image to determined data associated with the distribution item 8. The data may then be transmitted to the third party network service once processed.

The third party network service may be operated by the mailer 2 of the distribution item 8. In this way the mailer 2 may be able to provide targeted content to a recipient 12 based on information received from the mailing service that is transmitted to the mailing service when the recipient processes the information item 10 with a computing device 14. In addition, as described above, in one embodiment, the information item 10 may be provided by the mailing service or other distribution entity ready to route and send the distribution item 8. In this way mailer 2 may be able to take advantage of the existing information to further provide additional targeted content to a recipient 12 without additional information. In block 416, the network service may receive a message from the third party network service with information associated with the distribution item 10. In block 418, the network service transmits a message with the information associated with the distribution item to the computing device 14. In some embodiments, the third party network service may directly provide content to the computing device 14 rather than transmitting information to the network service.

Figure 5:
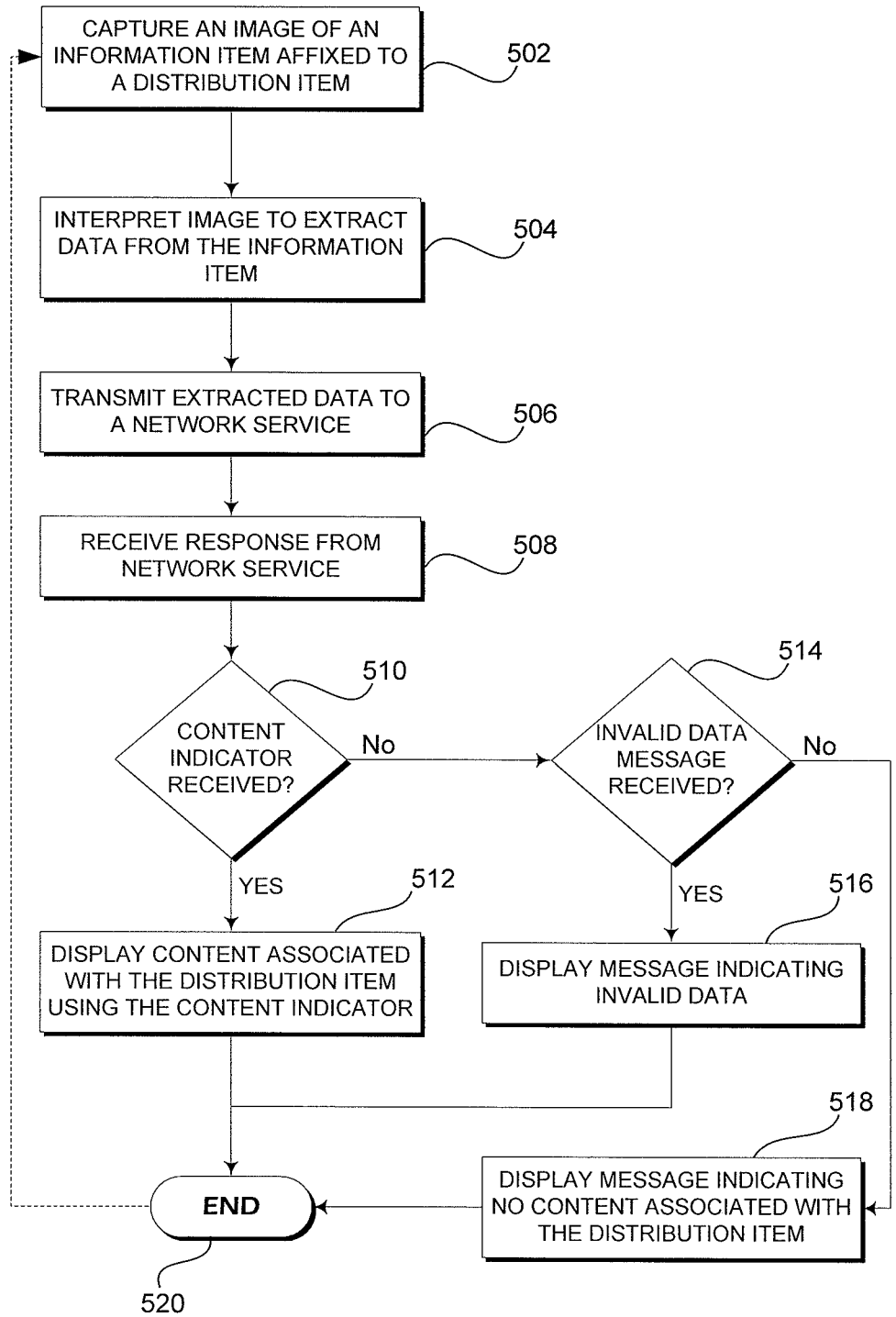
FIG. 5 shows a flowchart of an exemplary method for retrieving information associated with a distribution item including an information item.

FIG. 5 shows a flowchart of an exemplary method for retrieving information associated with a distribution item 8 including an information item 10. In block 502, the method begins when an image of an information item 10 affixed to a distribution item 8 is received and/or captured using a computing device 14 equipped with a digital camera or webcam. In one embodiment, the computing device 14 may be a smart phone with an integrated digital camera, a personal computer with an attached digital camera device, a laptop computer with an integrated digital camera, a tablet computer, or any other computing device 14 capable of capturing and processing images. Once an image of the information item 10 has been received by the computing device 14, in block 504, the computing device 14 interprets the image to generate data determined by the image of the information item 10. For example, as will be further described below, an image of a barcode may be interpreted to generate decoded alphanumeric values determined by the barcode image.

Once the data has been determined, the data is transmitted to a network service in block 506. The computing device 14 may thereafter receive a response from the network service 508. The response may indicate whether valid data associated with a distribution item 8 was received and whether there is content associated with the distribution item 8. In block 510, a computing device 14 processes the message and determines whether a content indicator has been received. The content indicator may be, for example, a uniform resource locator (URL) which can be used by a web browser on the computing device 14 to retrieve and display content. If a content indicator was received in the response from the network service, in block 512, the content associated with the distribution item 8 may be displayed on the computing device 14 by using the content indicator. As described above, in another embodiment the network service may provide actual displayable and or usable content directly to the computing device 14 rather than just providing a link. The method then concludes at block 520, until the computing device 14 captures and/or receives another image of an information item 10.

If a content indicator was not included in the response, the method continues at block 514 where the computing device 14 determines whether the response included an indication that the information item 10 was invalid. If the response indicates the information item 10 was invalid, the method proceeds to block 516 where the computing device 14 displays a message indicating that the image received was invalid. If no content indicator was received and there was no indication that the information item 10 was invalid, then the computing device 14 may determine that there was no content associated with the distribution item 8. In this case, as shown in block 518, the computing device 14 may display a message indicating that no content associated with the distribution item 8 was identified by the network service.

Figure 6:
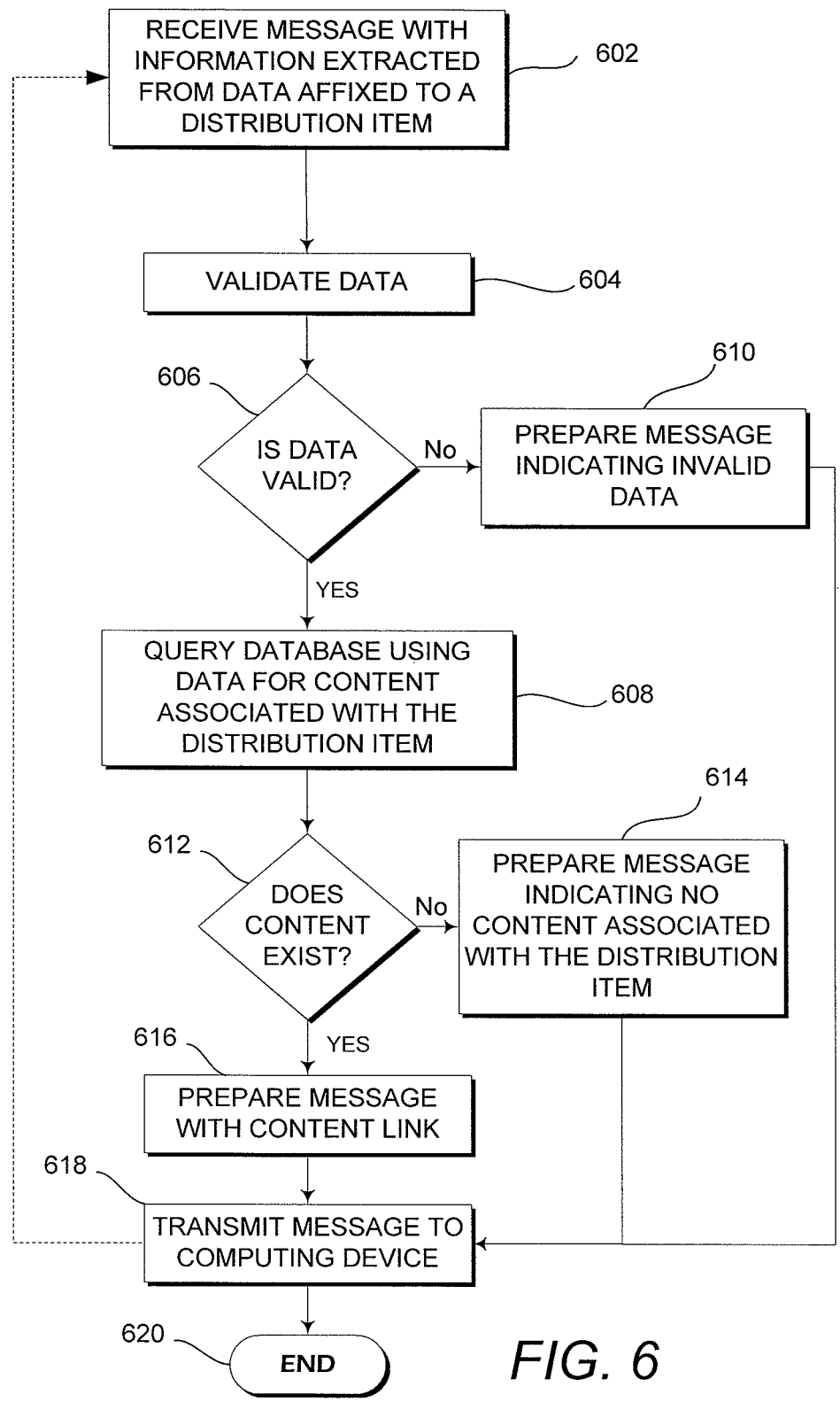
FIG. 6 shows a flowchart of an exemplary method for determining content associated with a distribution item using an data derived from an image of an information item.

FIG. 6 shows a flowchart of an exemplary method for determining content associated with a distribution item 8 using data derived from an image of an information item 10. According to one embodiment, the method shown in FIG. 13 may be performed by a network service on a remote server 18, such as a web service. In block 602, the method may begin when a server 18 receives data indicating information about a distribution item 8 from an image of an information item 10 affixed to the distribution item 8. In some embodiments, the server may perform additional processing of the data to extract or determine other data indicating information about a distribution item 8.

The data is validated in block 604 to ensure that the data corresponds to an acceptable value and that it may be accurately associated with a distribution item 8. Some validation may also take place when performing any additional processing. Validation may include determining whether each numerical value for a field of an information item 10 is within a determined range of values or may use other validation techniques, which will be appreciated by a person/one having ordinary skill in the art. In block 606, the server determines whether the data is valid. If the data is invalid, a message is prepared indicating that the information received was invalid in block 610.

If the data from the information item 10 is valid, then in block 608, the network service uses the data to query a database for content associated with the distribution item 8. The database may be local to the server or may be at a remote location from the server. In block 612, the network service determines whether the query to the database returned any content associated with the distribution item 8. If the query response indicated that there was no content associated with the distribution item 8, the network service may prepare a message indicating that no content associated with the distribution item 8 was found at block 614. If the query response contained content associated with the distribution item 8, then in block 616, a message is prepared with the content or a link to the content returned by the query. As described above, the database may return either a link to content, such as a URL, or actual content that may be used by a computing device 14. The appropriate message, generated by either blocks 610, 614, or 616 is then transmitted to a computing device 14 shown in block 618. The process ends in block 620.

Figure 7:
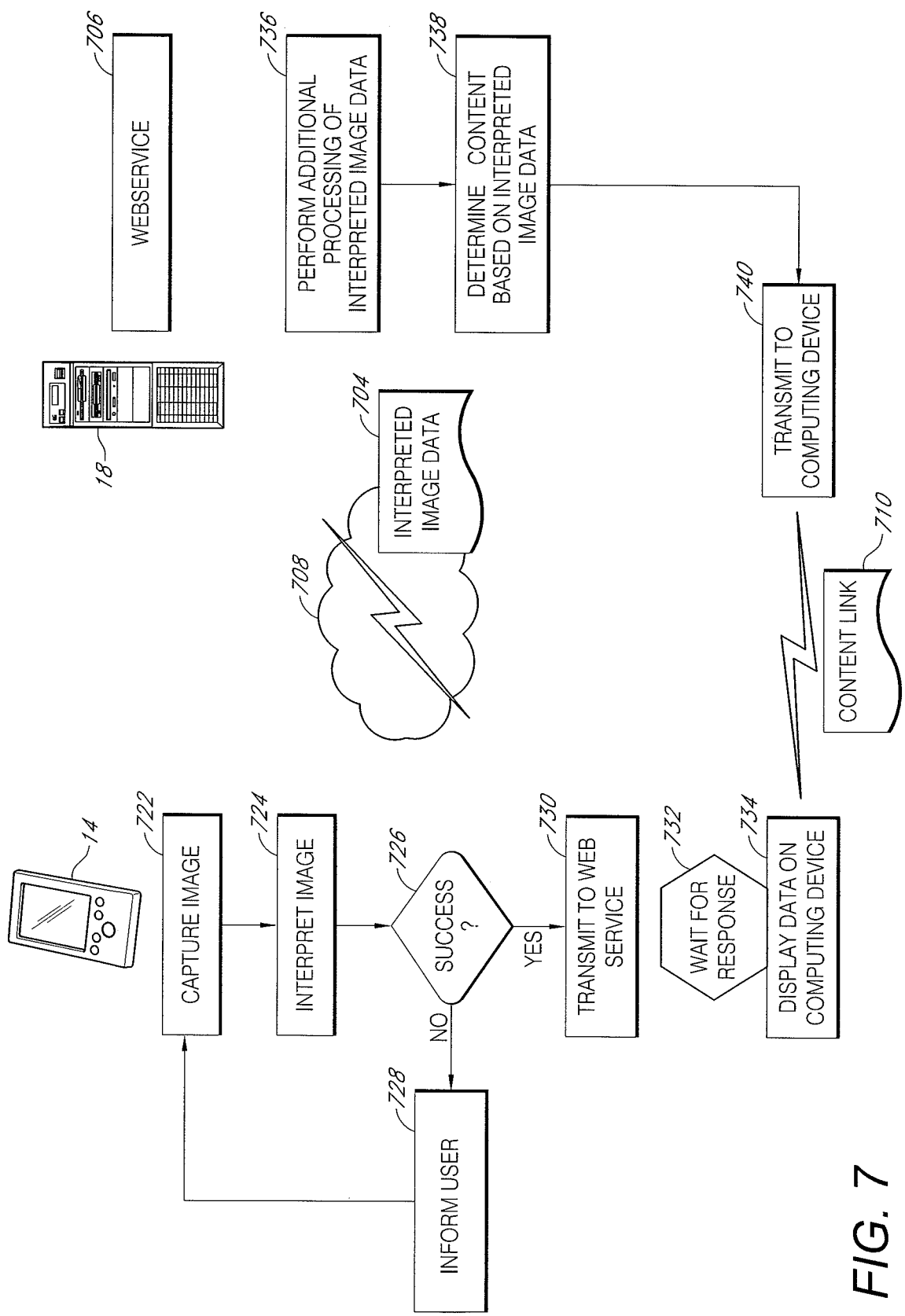
FIG. 7 shows a flowchart according to an exemplary system where image processing is performed by the computing device used to capture an image of the information item.
Figure 8:
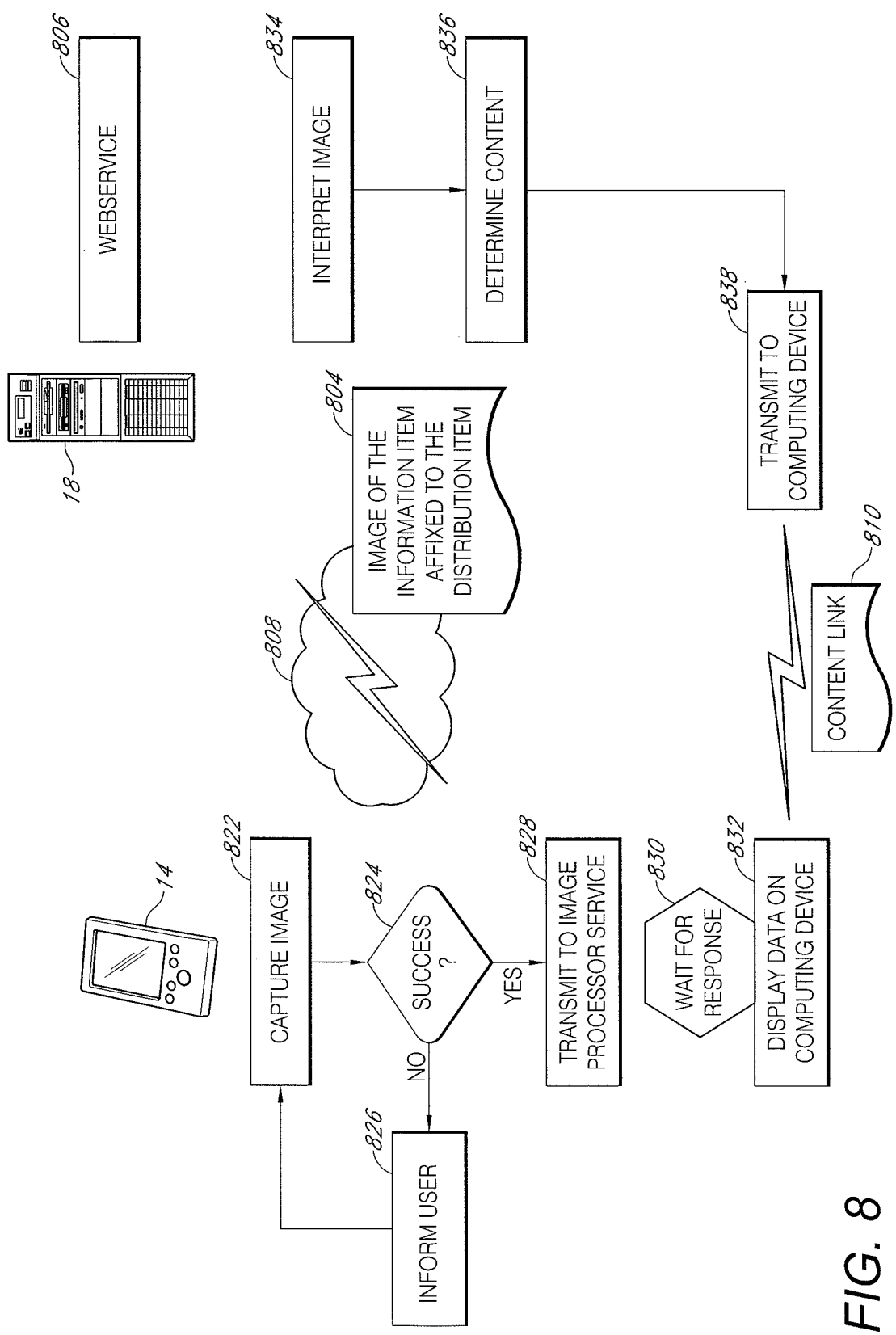
FIG. 8 shows a flowchart according to an exemplary system where image processing of image of an information item affixed to a distribution item is performed by a web service on a server.

As described with reference to FIGS. 5 and 6, the computing device 14 may interpret data retrieved from an information item 10, such as an image, to generate data determined by the information item 10. It should be appreciated that this operation, and other similar operations that may be performed to provide the data may be done either entirely on the computing device 14, entirely by a network service, or any combination thereof. FIGS. 7 and 8 show examples of embodiments where processing an information item 10 is performed either on the server 18 or on the computing device 14.

FIG. 7 shows a flowchart according to an exemplary system where image processing (or other such processing of an information item 10) is performed by the computing device 14 used to capture an image of the information item 10. In block 722, the computing device 14 in FIG. 7 captures an image of an information item 10. In block 724, the computing device 14 interprets the image. If the image is an encoded value, interpreting the image may include performing decoding steps and other similar functions. Furthermore, the computing device may perform OCR to extract textual information from the image. According to another embodiment, the computing device 14 may perform image recognition algorithms, if an information item 10 includes an image. In block 726, the computing device 14 determines whether the information item 10 was successfully processed to extract valid information. If the information item 10 was successfully processed, then the data providing information about the distribution item 8 is transmitted to a server 18 that includes a web-service 706 in block 730. If information item 10 was not successfully generated, the computing device 14 may display a message indicating such to a user in block 728. Otherwise, the computing device 14 waits for a response from the server 18 in block 732. Once the response is received, then the computing device 14 may display the response or data associated with the response (e.g., the contents of a link using a web browser) on the computing device 14 as depicted in block 734.

Once data derived from the information item 10 is received at the server's web service 706, in some embodiments, the data may go through some additional processing to determine more specific information about the distribution item 8, as depicted in block 736. The server 18 with the web service 706 may be accessed via a wide area network 708, such as the Internet. As depicted in block 738, the web service 706 may then determine whether there is content associated with the data derived from the information item 10, such as for example querying a database as described above with reference to FIG. 6. In block 740, the web service 706 transmits the content, if any, to the computing device 14. The content may be a content link 710 which may be used by the computing device 14 to view content associated with the mail piece or may be other content. According to FIG. 7, the web service that receives data derived from the information item 10 is not required to perform image processing of the information item. Avoiding image processing by the web service may reduce latency if the web service is requested to process multiple requests simultaneously. This may allow for greater scalability as an increase in requests for content associated with a barcode will have less of an impact on latency if image processing is performed by the computing device 14. Low network latency may improve the user experience such that the process is used more frequently and different and diverse applications might be more easily developed for custom image interpreters built for different devices.

FIG. 8 shows a flowchart according to an exemplary system where image processing is performed by a web service 806 on a server 18, rather than by the computing device 14 used to capture an image of an information item 10. The computing device 14 in FIG. 8 captures an image of an information item 10 in block 822 and additionally may perform some pre-processing of the image. The computing device 14 determines if the image is captured successfully as depicted at block 824. If the image was captured successfully, then data 804 including the image is transmitted to the server 18 in block 828 that includes a web service 806. If the image was not successfully captured, the computing device 14 may inform the user in block 826. The computing device 14 then waits for a response in block 830. Once the response is received, then the computing device 14 may display the response or data associated with the response (e.g., contents of a link) on the computing device 14 as depicted in block 832.

Once the image of the information item 10 is received at the web service 806, the image is interpreted to generate data derived from the information item 10 at block 834. As described above, the image processing may include any number of algorithms configured to recognize barcodes or other encoded values, perform OCR, perform image recognition algorithms, and the like. The web service may be accessed via a wide area network 808, such as the Internet. In block 836, the method determines whether there is content associated with the data derived from the information item 10, for example by querying a database as described above. The server 18 then transmits the content, if any, to the computing device 14 at block 838. The content may be a content link 810 which may be used by the computing device to view content associated with the mail piece or it may be other content. According to FIG. 8, barcode interpretation and decoding are both preformed by the network service. In one aspect, according to this architecture, all client computing devices may reuse image interpretation processes as it would be performed on a server. This embodiment may allow for a large number of client computing devices with capabilities of acquiring images of an information item 10, to access content associated with a distribution item 8 without having to incorporate native image interpretation processes for each client device. On the other hand, this architecture may increase latency as multiple requests to interpret images may have to be processed by the network, rather than done individually by each requesting client computing device 14.

It should be appreciated that the network architectures shown in FIGS. 7 and 8 describe just two examples of the division of responsibility for performing the operations necessary for decoding an image of an information item 10 and retrieving content associated therewith and other embodiments are possible. For example, the computing device 14 may be configured to partially decode an encoded value and then be configured to transmit this data to a network service. Additionally, further validation may be able to occur on the computing device 14 that may improve scalability of the system where less processing is required by the network service.

Intelligent Barcodes

Figure 9:
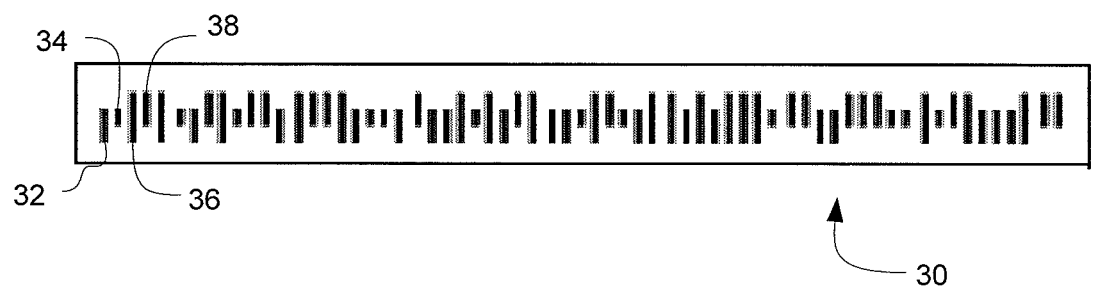
FIG. 9 illustrates an intelligent barcode that can be used in systems according to embodiments of the development.

A wide variety of different types of information items that may be included with a distribution item 8 and used to derive data to identify information about the distribution item 8 are contemplated by the development. One type of information item 10 that may be printed or affixed to a distribution item 8 may include a barcode. A barcode may include a variety of different types of barcodes such as 1D, 2D, and 3D barcodes. FIG. 9 illustrates an intelligent barcode 30 that can be used in systems according to embodiments of the development. An intelligent barcode 30 can be affixed on a distribution item 8 and used to sort and track the distribution item 8. In one embodiment, the intelligent barcode 30 is printed directly on an outer surface of the distribution item 8. In another embodiment, the intelligent barcode 30 is stamped directly on an outer surface of the distribution item 8. In yet another embodiment, a mailer prints the intelligent barcode 30 on a label, and then affixes the label to an outer surface of the distribution item 8. In still another embodiment, the mailer prints intelligent barcode 30 on a piece of correspondence, and then inserts the correspondence inside an envelope such that the intelligent barcode 30 is visible through a clear or see-through window in the envelope. In one embodiment, the window is covered with clear cellophane and the intelligent barcode 30 is visible through the cellophane. The intelligent barcode 30 can be used with any distribution item 8 having such a window, not just envelopes. In addition to sorting and tracking systems, intelligent barcode 30 can also be used with and in other systems and methods described herein.

Figure 10:
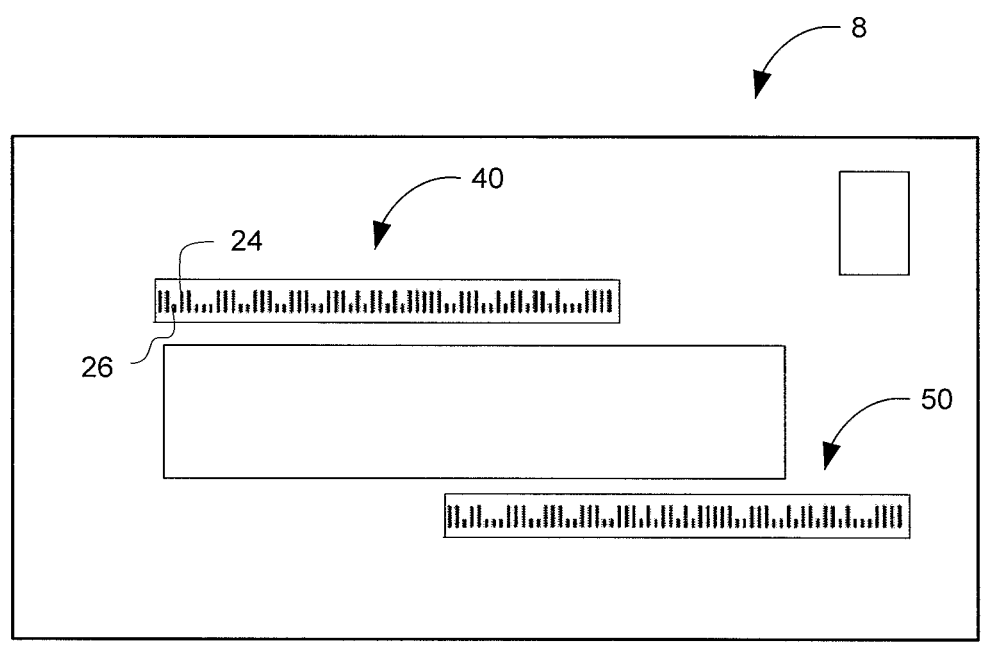
FIG. 10 illustrates an example of other types of barcodes that may be used according to embodiments of the development.

FIG. 10 illustrates an example of other types of barcodes 40, 50. The barcodes 40 and 50 are optical machine-readable representations of data. The barcodes 40 and 50 illustrated in FIG. 10 are height-modulated such that the data representation consists of evenly spaced bars of varying height. The barcode 40 illustrated in FIG. 10 is a two-state barcode in which data is encoded using two types of bars—short bars 26 and tall bars 24. The intelligent barcode 30 shown in FIG. 9 in one embodiment of the development is a height-modulated four-state barcode, in which data is encoded using four types of bars. In the embodiment illustrated in FIG. 9, the four bar types are descender bars 32, tracker bars 34, full bars 36, and ascender bars 38.

Different barcodes may include different information. For example, referring to FIG. 10, the barcode 40 may be configured to include tracking information, while the barcode 50 may be configured to include sorting information. A mailer 2 may need to place both barcodes 40 and 50 on a single distribution item 8 to allow the mailing service to sort the distribution item 8 when it is first introduced into the mailing system, as well as allow the mailing service and the mailer to track the distribution item 8 along its route to an ultimate destination. Sorting information can include, for example, a ZIP™ Code, which can be used to determine a delivery point mailing address. Tracking information can generate, for example, distribution item 8 processing data used for tracking purposes when the distribution item 8 is processed on automated mail processing equipment. In some embodiments, using both barcodes 40 and 50 adds complexity and requires extra information and processing. In contrast, the intelligent barcode 30 shown in FIG. 9 may be designed for use in high-speed, automated mail sortation machines. As will be described and shown in the figures referenced below, information from barcodes 40 and 50 can be combined and represented by a single intelligent barcode 30 that includes encoded data representing values stored in barcodes 40 and 50. For example, tracking and sorting information can be combined into one intelligent barcode 30. Using one intelligent barcode instead of two prior art barcodes can free up more open space on the distribution item 8, save printing costs such as but not limited to ink costs, and simplify production.

In addition to the capability to combine data from multiple barcodes, the intelligent barcode 30 may offer expanded data capacity compared with prior art barcodes. This expanded data capacity can include, for example, expanded tracking capabilities. The current data capacity of prior art barcodes will first be described.

Figures 11A, 11B:
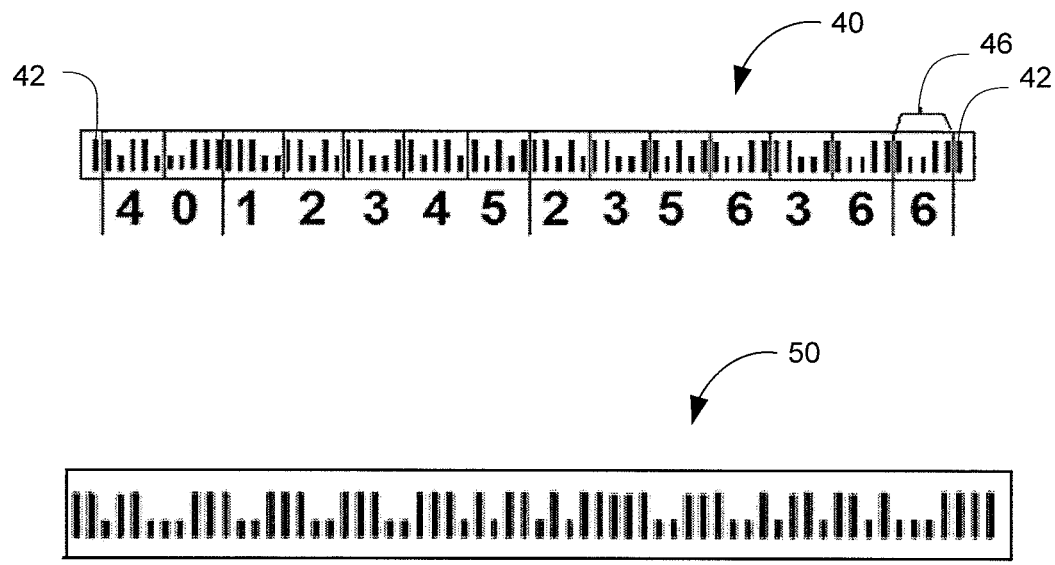
FIGS. 11A and 11B illustrate the barcodes of FIG. 10 in greater detail.

Referring now to FIG. 11A, the barcodes 40, 50 contain human readable representations of numerical digits. In one embodiment, the barcode 40 is a thirteen-digit barcode that can be used in combination with the barcode 50, another thirteen-digit barcode, to uniquely identify the distribution item 8. The barcodes may begin and end with frame bars 42. While shown as a corresponding to two thirteen digit barcodes, the barcodes 40 and 50 can be adapted and configured to include any number of digits, including but not limited to 11 or 13 digits.

As shown in FIG. 11B, one combination of five tall and short bars represents the digit 0, a different combination of five tall and short bars represent the digit 1, and so on to digit 9. The barcodes 40 and 50 may use different combinations of short bars 26 and tall bars 24 to represent the same digits, or, as demonstrated in the embodiment illustrated in table 45, the digit symbology for the barcode 40 may be the inverse of the digit symbology for the barcode 50. The barcodes 40 and 50 may also include a check-sum digit 46 configured to detect errors in the barcodes.

The types of data that can be represented in the barcodes 40 and 50 will now be described in further detail with reference to the barcode 40 illustrated in FIG. 11A. Following the framing bars 42, the first two digits in the barcode 40, "40," can represent data such as, but not limited to, the service type and the class/shape of the mail. Service types can include, for example, First-Class Mail, Standard Mail, and Periodical Mail. The class/shape of the mail can include, for example, letters, flats, and cards. Thus, in one embodiment, the first two digits can represent a Service Type Identification (ID) for the distribution item 8. A Service Type ID of "40" can represent First-Class Mail letters, while a Service Type ID of "43" can represent Standard Mail flats in one example.

The next five digits in the barcode 40, "12345," can identify a mail preparer, a mail owner, a subscriber to a particular mailing system service, or a system for sending mail. In one embodiment, this number is a Subscriber ID assigned by the mailing service to a subscriber to identify that a particular distribution item 8 was mailed by a particular subscriber. Further, the subscriber's particular tracking and handling preferences can be stored in records kept by the mailing service. In some embodiments, these preferences or settings can be used to identify the particular handling a distribution item 8 should receive. Systems to match a particular distribution item 8 with a particular mailer and the mailer's preferences will be described in greater detail below.

The next six digits in barcode 40, "235636," can be made available to the mailer to use for identification purposes. The number may be used to identify a particular distribution item 8, client, or account, for example. Mailers can use these six digits in combination with the barcode 50 to identify the distribution item 8 uniquely. The last digit, "6," represents a check sum or correction character to detect errors in the barcode. In some embodiments, the check sum digit is the single-digit number (0 to 9) that, when added to the sum of the other digits in the barcode 40, results in a whole number that is a multiple of 10.

Figure 12:
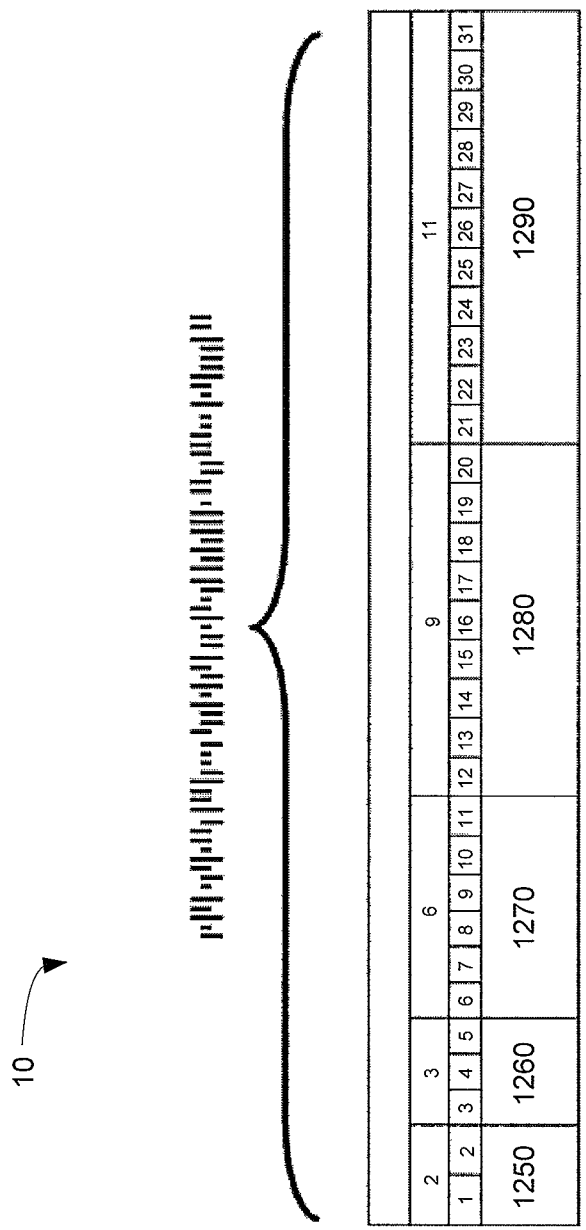
FIG. 12 illustrates an intelligent barcode according to embodiments of the development.

The types of data that can be represented in the intelligent barcode 30 will now be described in further detail. FIG. 12 illustrates an intelligent barcode 30 according to embodiments of the development. The intelligent barcode 30 can be divided into multiple fields, such as but not limited to fields 1250, 1260, 1270, 1280, and 1290. In one embodiment illustrated in FIG. 12, the field 1290 contains 11 digits which represent routing or destination data that can be used to sort and route a distribution item 8. In other embodiments, field 1290 contains 0, 5, or 9 digits. For example, the field 1290 can accommodate 0, 5, 9, or 11 digits of ZIP™ Code information, also known as a delivery point ZIP™ Code, associated with a mail recipient 470, or addressee.

A field 1280 may contain 9 digits representing a mailing identification (ID), or serial number. In some embodiments, the field 1280 is available to the mailer 2 to use for its own identification purposes and is thus considered "open" by the mailing service 100. The digits can uniquely identify, for example, a particular distribution item 8, a particular mailing, or a particular client.

A field 1270 may contain a six-digit code which, in some embodiments, is not considered "open" by the mailing service 100. The field 1270 may include, for example, a mailer identification (ID), also known as a subscriber ID. This mailer ID/subscriber ID can be assigned to the mailer 2 by the mailing service 100 to identify a particular mailer or a particular subscriber to a service offered by the mailing service 100. In some embodiments, mailers 410 who were assigned a five-digit Subscriber ID to use in barcodes 40, as discussed above, can add a leading zero to their Subscriber ID to represent a six-digit Subscriber ID for use in the intelligent barcode 30.

In one embodiment, the mailer ID is a six-digit number that uniquely identifies the mailer 2. According to one example, if the mailer ID is a six-digit number, the mailing ID is limited to nine digits. Thus, according to this example, there are 1 billion unique nine-digit mailing IDs available for mailers 410 using a six-digit mailer ID. In another embodiment, the mailer ID is a nine-digit number that uniquely identifies the mailer 2. According to this example, if the mailer ID is a nine-digit number, the mailing ID is limited to six digits. Thus, according to one example, there are 1 million unique six-digit mailing IDs available for mailers 410 using a nine-digit mailer ID.

According to one aspect of the development, the mailing service 100 assigns the mailer 2 a mailer ID based on the volume of mail the mailer 2 transmits annually to the mailing service 100. In one embodiment, a mailer 2 who mails 10 million or more distribution items annually will be assigned a six-digit mailer ID. The mailer 2 can request additional six-digit mailer IDs to satisfy additional mailing needs. In another embodiment, a mailer who mails less than 10 million distribution items annually will be assigned a nine-digit mailer ID. The mailer 2 can request additional nine-digit mailer IDs to satisfy additional mailing needs. In yet another embodiment, six-digit mailing IDs assigned by the mailing service 100 begin with numbers "0" through "8," and nine-digit mailing IDs assigned by the mailing service begin with the number "9."

A field 1260 may contain a 3-digit code identifying the specific service the mailer 2 has selected for the distribution item 8. For example, the field 1260 may contain a service type identification (ID) that identifies the mailer 2 requests destination confirm service for the distribution item 8, or alternatively, origin confirm service for the distribution item 8. The Service Type ID can also identify the mail class of the distribution item 8, such as but not limited to First-Class, Standard, and Periodicals mail. The mail class can indicate, among other things, what class of service or treatment the distribution item 8 should be given, based on the mailer 2's indication of a particular mail class. Table 1 illustrates possible classes of service for a distribution item 8 according to one embodiment.

TABLE 1

| Service Type ID | Class/Shape of Mail |
| --- | --- |
| 040 | First-Class Mail letters |
| 041 | First-Class Mail flats |
| 042 | Standard Mail letters |
| 043 | Standard Mail flats |
| 044 | Periodicals letters |
| 045 | Periodicals flats |
| 046 | First-Class Mail cards |
| 047 | Standard Mail cards |

Thus, for example, a Service Type ID of "040" in the field 1260 can represent the mailer's 2 selection of Destination Confirm First Class treatment for a letter distribution item 8. Similarly, a Service Type ID of "042" can represent the mailer's 2 selection of Destination Confirm Standard Mail treatment for a flat distribution item 8. In one embodiment, all distribution items requesting origin confirm service have "050" in the field 1260, regardless of the mail class of the distribution item 8.

In one embodiment, the mailer 2 identifies a mail class for a distribution item 8 using a specific Service Type ID, and thereby requests special services for the distribution item 8 such as tracking or address correction services. Special services can include tracking and address correction services for mailers 2 who use the intelligent barcode 30, such as for example, OneCode Confirm™ and OneCode ACS™. According to one embodiment, OneCode Confirm™ is a tracking service, such as a destination and/or origin confirm service, offered to the mailer 2 who requests such tracking and/or confirm services in the Service Type ID of the intelligent barcode 30 applied to its distribution items. According to another embodiment, OneCode ACS™ is an address correction service offered to the mailer 2 who requests such address correction services in the Service Type ID of the intelligent barcode 30 applied to its distribution items.

In another embodiment where the mailer 2 does not identify a mail class for the distribution item 8 or request special services, the Service Type ID can be used by the mailing service 100 to apply automation rate discounts. Thus, the mailer 2 who does not request special services may still receive an automation rate discount in accordance with the Service Type ID in the intelligent barcode 30 applied to a distribution item 8.

A field 1250 may contain a 2-digit code for internal use by the mailing service 100. In one embodiment, mailers 410 may populate the field 1250 with two zeroes. In some embodiments, the field 1250 is reserved for indicating an optional endorsement line sort level and exception handling. For example, in one embodiment, optional endorsement line and exception handling information encoded in the intelligent barcode 30 provide instructions to the mailing service 100 on disposition of a distribution item 8. In another embodiment, the mailing service 100 treats a distribution item 8 in accordance with optional endorsement line and exception handling instructions for a fee.

In one embodiment, the mailer 2 "seeds" outgoing mailings with an intelligent barcode 30 attached to some distribution items, but not every distribution item 8. The mailer 2 can use data from the seeded distribution items to make assumptions about the entire mailing. For example, in one embodiment, the mailer 2 seeds every tray of a mailing with five destination confirm intelligent barcodes 30 attached to five distribution items. The mailer 2 can receive information from the mailing service 100 about the seeded distribution items to make assumptions about the entire tray. The mailer 2 can choose the seed quantity and coverage to meet its specific needs. For example, the seeded mail may indicate a common geographic location for each distribution item 8. Based on this information, the mailing service may make the assumption that all distribution items in the tray are destined for the same general location. As another example, the intelligent barcode may include information that uniquely identifies a specific offering or service for each distribution item 8 in the tray sent to different recipients. In this case, the five seeded intelligent barcodes may allow the assumption that every distribution item 8 in the tray includes the same specific service or offering.

In another embodiment, the mailer 2 seeds outgoing mailings by placing intelligent barcodes 30 on Confirm™ Smart Seed™ distribution items in the mailing. In one embodiment, Confirm™ Smart Seed™ is a service offered by the mailing service 100 that allows the mailer 2 to receive mail processing equipment scan data for the mailing without applying the intelligent barcode 30 to distribution items that will be delivered to customers. Thus, in one embodiment, the mailer 2 obtains the benefit of seeding using intelligent barcode technology without attaching the intelligent barcode 30 to its distribution items. Further embodiments and details of destination confirm services offered by the mailing service 100 according to one embodiment are described in U.S. Postal Service, Confirm Service Featuring One Code Confirm: Publication 197 (2008), which is hereby incorporated herein by reference.

In some embodiments, the combination of Mailing ID digits in the field 1280 and the Subscriber ID digits in the field 1270 make the intelligent barcode 30 unique to the particular distribution item 8 to which it is affixed. Thus, the combination of Mailing ID and Subscriber ID in the intelligent barcode 30 may be a unique distribution item 8 identifier. In some aspects, it is desirable to maintain distribution item 8 uniqueness for a specific period of time. Maintaining distribution item 8 uniqueness can assist the mailing service 100 to sort and track distribution items, for example. In one embodiment, the mailing service 100 instructs the mailer 2 to maintain distribution item 8 uniqueness for a specific period of time, including but not limited to 10, 25, 30, 45, 50, or 60 days. In another embodiment, the specific period of time during which distribution item 8 uniqueness must be maintained is 45 calendar days.

In another embodiment, the mailer 2 uses the intelligent barcode 30 bearing Mailing ID "X" and Subscriber ID "Y" on a first distribution item 8. The mailing service 100 instructs the mailer 2 not to reuse this same intelligent barcode 30 bearing Mailing ID "X" and Subscriber ID "Y" on a second distribution item 8 within 45 calendar days of the date the first distribution item 8 was inducted into the mailing system 400. In yet another embodiment, the mailer 2 may not use the intelligent barcode 30 bearing Mailing ID "X" and Subscriber ID "Y" on two pieces of mail in the same mail category within 45 calendar days, but may use the same intelligent barcode 30 bearing Mailing ID "X" and Subscriber ID "Y" on two distribution items in different mail categories within 45 calendar days. Thus, in this embodiment, distribution item 8 uniqueness is not maintained across mail classes, and two distribution items can carry the same Mailing ID and Subscriber ID combination within the same 45-day uniqueness period as long as they are in different mail classes.

Persons of skill in the art will understand that multiple fields in the intelligent barcode 30 can be used to maintain distribution item 8 uniqueness, not just the Mailing ID and Mailer/Subscriber ID. Thus, in one embodiment, the combination of Service Type ID, Mailer/Subscriber ID, and Mailing ID is used to maintain distribution item 8 uniqueness across mail classes, but not within the same mail class. For example, in one embodiment the same Mailing ID and Subscriber ID is used on two distribution items in different classes of mail, and the distribution items bear different Service Type IDs in the intelligent barcode 30. In this example, the Service Type ID, and particularly the combination of Service Type ID, Mailer/Subscriber ID, and Mailing ID, is used to uniquely identify the distribution items.

Because maintaining distribution item 8 uniqueness can improve the mailing service's sorting and tracking services and systems, the mailing service 100 may incentivize mailers 410 to use unique, intelligent barcodes 30 on their mailings. Such incentives may be called "automation discounts." In one embodiment, the mailing service 100 offers reduced postal rates to mailers 410 who apply the intelligent barcodes 30 to their mailings. Other incentives, such as but not limited to the provision of advanced tracking information to the mailer 2, the provision of address correction information at no or reduced cost, and forwarding of undeliverable-as-addressed (UAA) mail at no or reduced cost.

In one embodiment, the mailer 2 applies unique, intelligent barcodes 30 to individual distribution items. In another embodiment, the mailer 2 also applies unique, intelligent barcodes to each handling unit used to transport individual distribution items to the mailing service 100. Handling units can include, for example, trays, tubs, sacks, or bundles. The intelligent barcode 30 that is applied to a handling unit may take the same or similar form to that described above with respect to the intelligent barcode 30 for distribution items, or it may take another form. In some cases, the mailer 2 has a large number of handling units and uses containers to transport the handling units to the mailing service 100. In yet another embodiment, the mailer 2 also applies unique, intelligent barcodes to distribution items, handling units, and the containers used to transport handling units to the mailing service 100. Containers can include, for example, pallets, gaylords, and All Purpose Containers (APCs). An intelligent barcode affixed to a handling unit or a container can include information common to all distribution items in the handling unit or the container. For example, the information encoded on the barcode for a handling unit might indicate either that every distribution item 8 is destined to the same general location or it might indicate that each of the distribution items includes the same contents.

In some aspects, the mailer 2 generates and transmits a statement, such as a postage statement to the mailing service 100 using an approved electronic method. The statement may indicate a number of pieces being mailed and the accompanying price for each of the pieces. These statements can be transmitted before or at the same time the distribution items are transmitted to the mailing service 100 to be able to track payment information and other data associated with mailing the distribution items. In other aspects, the mailer 2 generates and transmits mailing documentation to the mailing service 100 using an approved electronic method. This mailing documentation can be transmitted before or at the same time the distribution items are transmitted to the mailing service 100. In one embodiment, the mailing documentation describes how individual distribution items are linked to handling units, and how handling units are linked to containers, when containers are used. The mailing documentation may be used to allow the mailing service to appropriately track and group distribution items for more efficient distribution. Furthermore, the mailing documentation may be used to provide the mailer with a reference with respect to a certain mailing so that the mailer may more easily track and obtain information about a group of distribution items as the distribution items are being delivered. Allowing a mailer to electronically submit mailing documentation provides the mailer with an additional tool for accessing information with respect to several different mailings. Other services and aspects associated with the intelligent barcode are described in U.S. patent Ser. No. 12/405, 139 entitled INTELLIGENT BARCODE SYSTEMS, which is hereby incorporated herein in its entirety by reference. In addition, further aspects of an intelligent barcode are described in the publication U.S. Postal Service, A Guide to Intelligent Mail for Letters and Flats (2008), which is hereby incorporated herein by reference.

As described above, an intelligent barcode 30 provides a machine-readable format that may be used for categorizing and identifying each distribution item 8. The intelligent barcode 30 may be further used to associate a distribution item 8 with externally available information, such as online content, applications, and further offerings.

Figure 13:
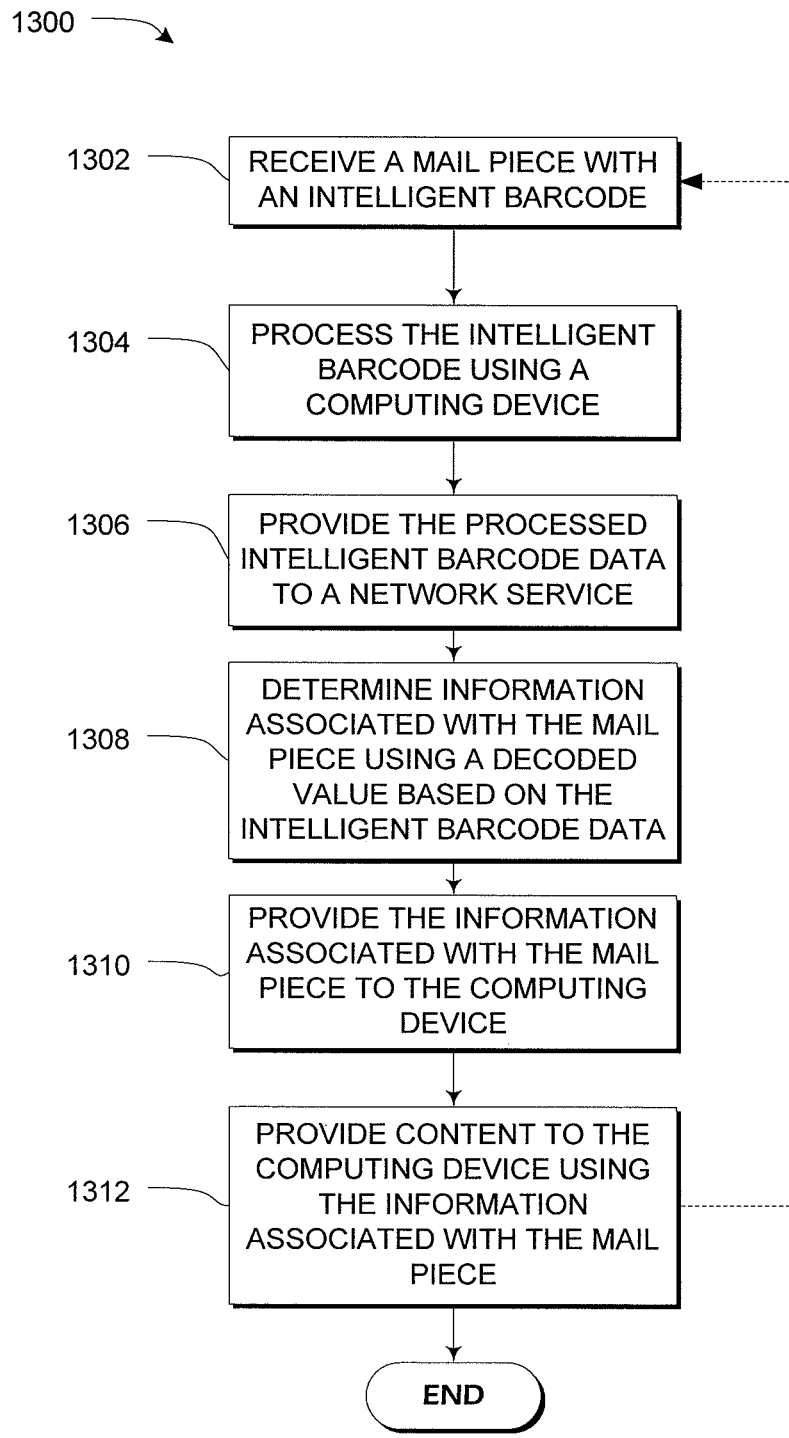
FIG. 13 shows a flowchart of an exemplary method for delivering content associated with a distribution item with an affixed intelligent barcode to a computing device as shown in FIG. 2.

FIG. 13 shows a flowchart of an exemplary method for delivering content associated with a distribution item 8 with an affixed intelligent barcode 30 to a computing device 14 as shown in FIG. 2. The method 1300 may begin at block 1302 when a distribution item 8 with an intelligent barcode 30 is received. In block 1304, the intelligent barcode 30 is processed using a computing device 14 as described above. The processing may include capturing information about the intelligent barcode 30, and decoding or preparing the intelligent barcode 30 so that it may be used by a network service to determine information associated with the distribution item 8 as will be further described below. After processing the intelligent barcode 30, in block 1306, the processed encoded value is provided to a network service. In some embodiments, the processed encoded value may be an image of the intelligent barcode 30 prepared for decoding by the network service. In other embodiments, the processed intelligent barcode 30 may be a decoded or partially decoded value which may be used by the network service to determine information associated with the distribution item 8, as will be described in further detail below.

In block 1308, the network service may determine and/or retrieve information associated with the distribution item 8 based on the information about the intelligent barcode 30 received from the computing device 14. The network service may provide the information associated with the distribution item 8 to the computing device 14 in block 1310. This information may be provided in a variety of forms, such as text viewable on the computing device 14, a link to further content accessible via a web browser on the computing device 14, media files, or other information that may be used by the computing device 14 to access information associated with the distribution item 8. In block 1312, the computing device may then use the information to display or provide content and/or services associated with the distribution item 8 as described above. The method described by FIG. 13 may be repeated for any distribution item 8 with an encoded value such as an intelligent barcode 30.

As such, in one aspect, beyond providing information regarding routing and delivering a distribution item 8 by the mailing service or other distribution entity, the intelligent barcode 30 may further provide a way for a recipient 12 to be provided with additional interactive content or services associated with the distribution item 8. In one aspect, a mailer 2 may therefore avoid putting additional information item on the distribution item 8 besides the intelligent barcode 30 already used to allow users to be connected to additional content. Furthermore, the distribution entity may be in an advantageous position by delivering and handling the distribution item 8 to be able to provide the mailer 2 with systems and opportunities for providing the additional content associated with the mail piece. In addition, the use of the intelligent barcode 30 may provide for both linking a recipient 12 with content in addition to providing routing and physical distribution services. In one aspect, the mailer 2 may be able to create and print intelligent barcodes themselves that will be recognized and used by the distribution entity to deliver and route distribution items. In addition, the intelligent barcode 30 created by the mailer 2 may be further used to allow a recipient to link to additional content. Various interfaces and systems as described herein may be adapted to allow the mailer 2 to associate information within the intelligent barcode 30 with additional content for a recipient 12 such that the intelligent barcode 30 is used to both route and deliver the package and provide a way for the recipient to view expanded content.

Figure 14A:
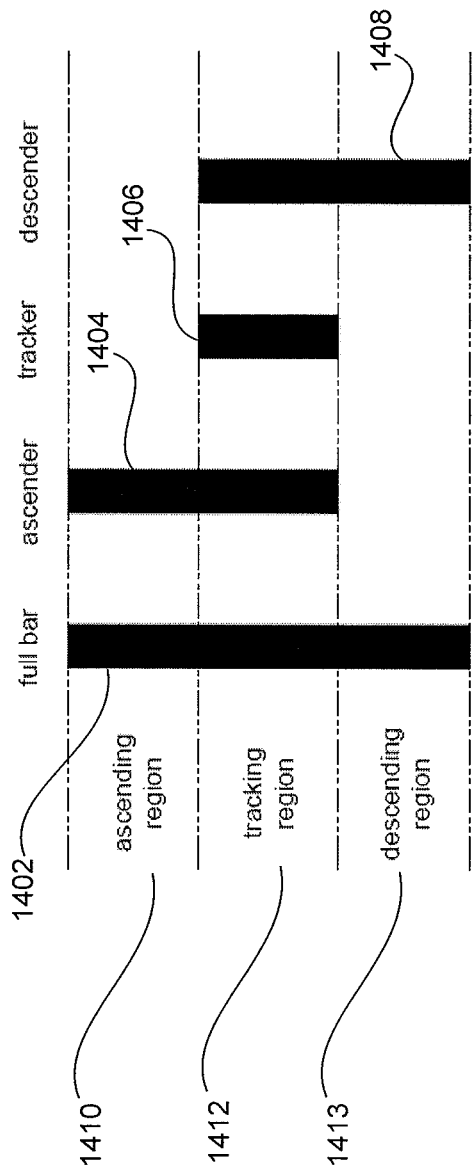
FIG. 14A shows the four types of bars included in an intelligent barcode.

The description below provides examples of how an intelligent barcode 30 may be decoded and used by a computing device 14 to deliver content associated with a distribution item 8 to a recipient 12. In one aspect, processing and decoding the intelligent barcode 30 may correspond to capturing an image of the intelligent barcode 30 and processing the image to extract the encoded information. FIG. 14A shows the four types of bars included in an intelligent barcode 30: a full bar 1402, an ascender bar 1404, a tracker bar 1406 and a descender bar 1408. According to one embodiment, the computing device captures an image of an intelligent barcode 30 and identifies the type of each bar in the intelligent barcode 30. As shown in FIG. 14A, each bar of an intelligent barcode 30 may be divided up into three regions: an ascending region 1410, a tracking region 1412 and a descending region 1413.

According to one method, these regions may be used to determine the type of bar included in the intelligent barcode 30. If the computing device 14 detects that image data for a bar exists in the ascending region 1410, the tracking region 1412 and the descending region 1413, then the computing device 14 may identify the bar as a full bar 1402. If the computing device 14 detects that image data for a bar exists in only the ascending region 1410 and the tracking region 1412, then the computing device 14 may identify the bar as an ascender bar 1404. If the computing device 14 detects that image data for a bar exists in the tracking region 1412 alone, then the computing device 14 may identify the bar as a tracker bar 1406. Finally, if the computing device 14 detects image data for a bar exists in the tracking region 1412 and the descending region 1413, then the computing device 14 may identify the bar as a descender bar 808.

Figure 14B:
FIG. 14B shows an example of an intelligent barcode image along with encoded values determined by the intelligent barcode image.

Each of the full bar 1402, ascender bar 1404, tracker bar 1406 and descender bar 1408 may be identified by a single character representing the bar. For example the character "F" may represent the full bar 1402, the character, "A" may represent the ascender bar 1404, the character "T" may represent the tracker bar 1406 and the character "D" may represent the descender bar 1408. FIG. 14B shows an example of an intelligent barcode image 1420 along with encoded values determined by the intelligent barcode image 1420. When the computing device 14 detects the type of each bar in an image, the computing device 14 may thus identify each bar by its character so that the image may be represented as a series of the "A", "D", "F" and T" characters associated with each type of bar in the barcode. This may be described as the ADFT sequence that corresponds to each intelligent barcode 30. An example of the ADFT character sequence 1430 for the intelligent barcode 3020 is shown in FIG. 14B. The ADFT sequence 1430 may then be used by the computing device 14 or some other remote processor to decode and derive numeric values corresponding to the various fields of the intelligent barcode 30 as described above with respect to FIG. 12. The numeric values for each field 1440 associated with the ADFT sequence 1430 are shown in FIG. 14B. The process by which a computing device 14 may decode the ADFT sequence into the numeric values for each of the intelligent barcode fields is further described in the U.S. Postal Service Specification No. USPS-B-3200 entitled Intelligent Mail Barcode (4-State Customer Barcode) (2009), which is hereby incorporated herein by reference in its entirety.

Figure 15:
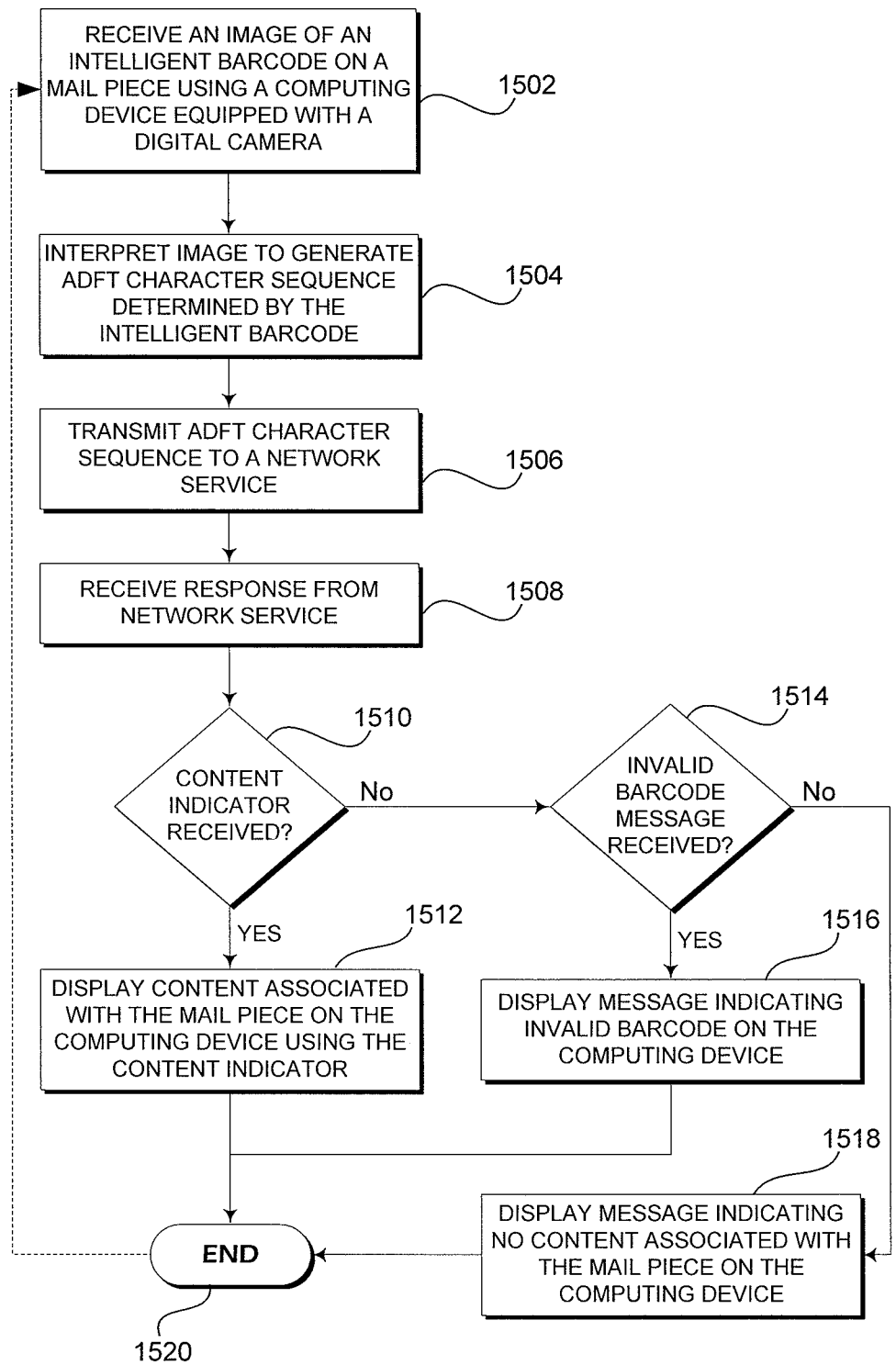
FIG. 15 shows a flowchart of an exemplary method for retrieving information associated with a distribution item including an intelligent barcode.

FIG. 15 shows a flowchart of an exemplary method for retrieving information associated with a distribution item 8 including an intelligent barcode 30. In block 1502, the method begins when an image of an intelligent barcode 30 affixed to a distribution item 8 is received and/or captured using a computing device 14 equipped with a digital camera. According to the method in FIG. 15, the computing device 14 may be a smart phone with an integrated digital camera, a personal computer with an attached digital camera device, a laptop computer with an integrated digital camera, a tablet computer, or any other computing device 14 capable of capturing and processing images. Once an image of the intelligent barcode 30 has been received by the computing device 14, in block 1504, the computing device 14 interprets the image to generate the ADFT character sequence determined by the intelligent barcode image. A variety of methods may be used to determine the ADFT sequence, as described above and as will be further described below.

Once the ADFT character sequence corresponding to the intelligent barcode 30 has been determined, the ADFT character sequence is transmitted to a network service in block 1506. The computing device 14 may thereafter receive a response from the network service 1508. The response may indicate whether a valid message was received and whether there is content associated with the distribution item 8. In block 1510, a computing device 14 processes the message and determines whether a content indicator has been received. The content indicator may be, for example, a uniform resource locator (URL) which can be used by a web browser on the computing device 14 to retrieve and display content. If a content indicator was received in the response from the network service, in block 1512, the content associated with the distribution item 8 may be displayed on the computing device 14 by using the content indicator. As described above, in another embodiment the network service may provide actual displayable and or usable content directly to the computing device 14 rather than just providing a link. The method then concludes at block 1520, until the computing device 14 captures and/or receives another image of an intelligent barcode 30.

If a content indicator was not included in the response, the method continues at block 1514 where the computing device 14 determines whether the response included an indication that the barcode was invalid. If the response indicates the barcode was invalid, the method proceeds to block 1516 where the computing device 14 displays a message indicating that the barcode image received was invalid. If no content indicator was received and there was no indication that the barcode was invalid, then the computing device 14 may determine that there was no content associated with the distribution item 8. In this case, as shown in block 1518, the computing device 14 may display a message indicating that no content associated with the distribution item 8 was identified by the network service.

Figure 16:
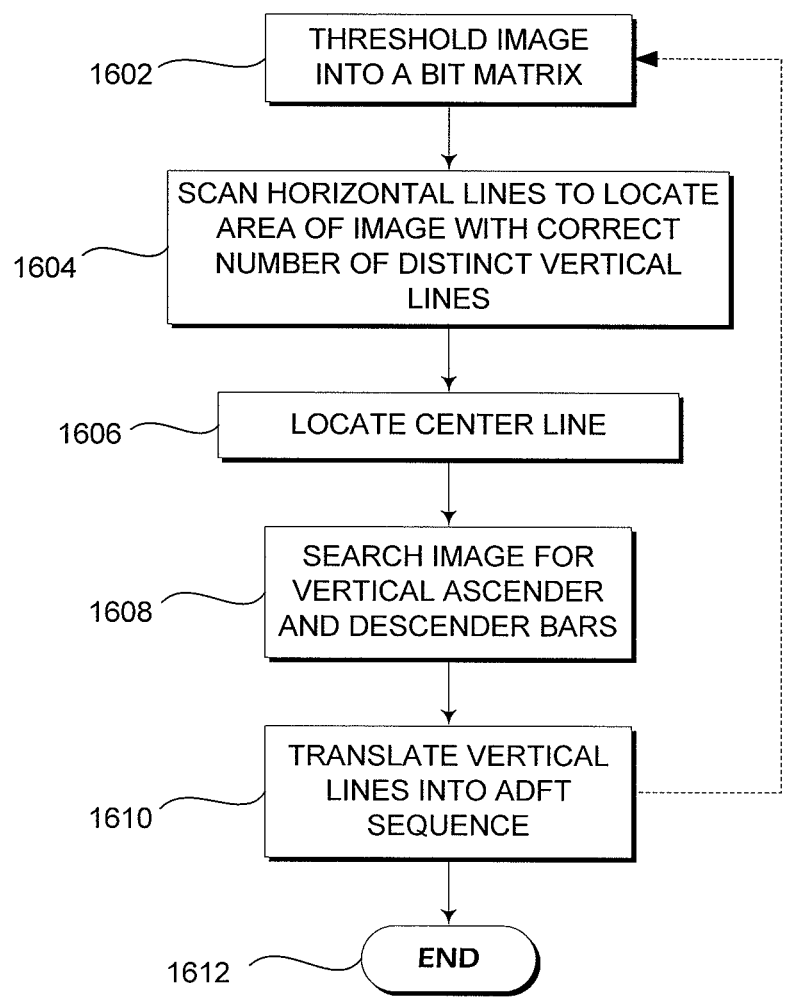
FIG. 16 shows a flowchart of an exemplary method for interpreting an intelligent barcode image to determine the corresponding ADFT character sequence.

As described in FIG. 15, a computing device 14 may interpret an image of an intelligent barcode 30 to generate the ADFT character sequence determined by the intelligent barcode image. FIG. 16 shows a flowchart of an exemplary method for interpreting an intelligent barcode image to determine the corresponding ADFT character sequence. In block 1602, the image is thresholded into a bit matrix. In some embodiments this process may first include the computing device 14 converting the image to a grey scale representation. In some embodiments, the bit matrix may be a binary representation of the barcode image. For example, as color (or the shade of a color) will not matter in identifying the type of each bar of an intelligent barcode 30, the image may choose thresholds such that any pixel in the image which has a determined value above a certain value can be considered part of a bar and represented by one value (e.g., a binary value of one), while any pixel in the image which has a determined value below a certain value can be considered to be not part of any bar and be represented by another value (e.g., a binary value of zero). As each pixel is processed, the computing device 14 may store the result, a one or a zero, in a two-dimensional array of values corresponding to the barcode image.

In block 1604, the computing device 14 may scan/process the horizontal lines of the bit matrix to locate an area of the image with the correct number of distinct vertical lines. Once the correct area of the image has been located, in block 1606, a center line for the barcode represented by the bit matrix is located. This center line may then be used by the computing device 14 to search the image for vertical ascender and descender bars as shown in block 1608, to determine the type of each bar identified. In one embodiment, each row of image data may be stored such that it can be passed as an object conforming to an interface which is used by the computing device 14 to determine whether the image data conforms to a barcode. The computing device 14 may determine a value indicating partially or fully decoded barcode data. In this process, the computing device 14 may be used to translate vertical lines from the image data into the corresponding ADFT sequence as shown in block 1610. The process ends as shown in block 1612. In other embodiments, the computing device 14 may use external libraries in conjunction with the blocks described in FIG. 16 or in conjunction with alternative methods used to decode and detect barcodes from an image.

In some cases, a single image captured by the computing device 14 may not be sufficient to extract the correct ADFT sequence due to varying lighting conditions, device movement, or in other occurrences where garbled images are returned. As such, it may be useful to analyze a series of images captured in rapid succession to more accurately determine an ADFT sequence of an intelligent barcode 30. For example, the computing device 14 may continuously capture images in the form of a video stream. The computing device 14 may then continuously analyze each image in the stream to see if an intelligent barcode 30 has been detected. This may increase the accuracy and the ability for the computing device 14 to extract the correct information from an image to be able to accurately decode the intelligent barcode 30. For example, according to one embodiment, a successive agreement algorithm may be used to improve the accuracy of the decoding process. For example, the computing device 14 may determine that a valid intelligent barcode 30 was identified when a minimum of three successive identical interpretations was detected. This may avoid false intelligent barcode detections while a camera is being positioned or when lighting conditions vary. This may further reduce the time the computing device 14 needs to process and reject garbled or incorrectly decoded images.

Figure 17:
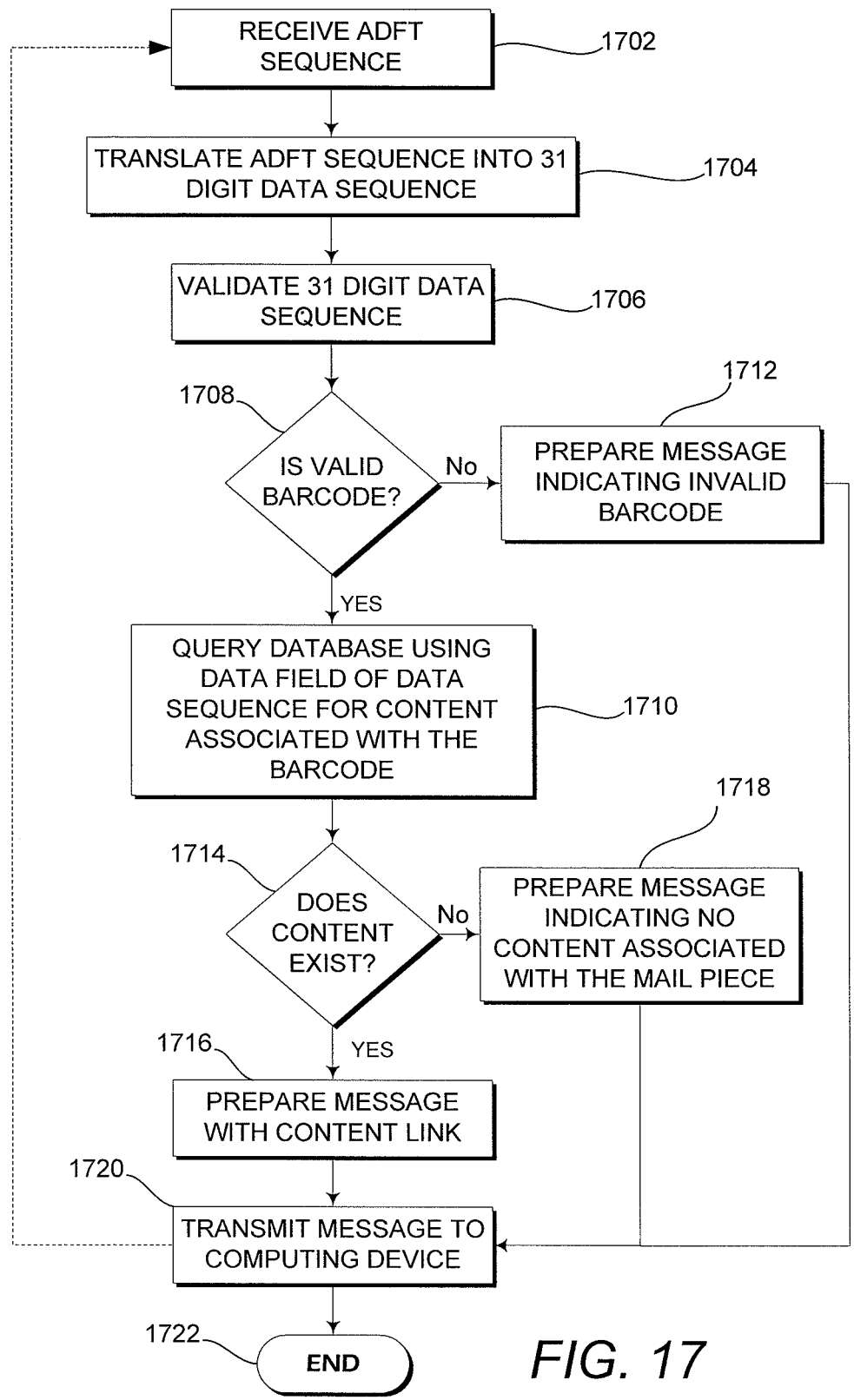
FIG. 17 shows an flowchart of an exemplary method for determining content associated with a distribution item using an ADFT character sequence derived from an image of an intelligent barcode.

Once determined from the intelligent barcode image, the computing device 14 may use the ADFT character sequence to determine attributes associated with the distribution item 8 and further to be linked to content associated with the distribution item 8. In one embodiment, the computing device 14 may send the ADFT character sequences over a network to a server 18 for further processing. FIG. 17 shows a flowchart of an exemplary method for determining content associated with a distribution item 8 using an ADFT character sequence derived from an image of an intelligent barcode 30. According to one embodiment, the method shown in FIG. 17 may be performed by a network service on a remote server 18, such as a web service. In block 1702, the method may begin when a server 18 receives an ADFT character sequence representing an intelligent barcode 30. In block 1704, the server 18 translates the ADFT character sequence into a thirty-one digit data sequence which corresponds to the intelligent barcode field discussed above with respect to FIG. 5. A process that may be implemented by a server 18 by which the ADFT sequence may be decoded into the thirty-one digit data sequence for each of the intelligent barcode fields is further described in the U.S. Postal Service Specification No. USPS-B-3200 entitled Intelligent Mail Barcode (4-State Customer Barcode) (2009), which was incorporated herein by reference above.

The thirty-one digit data sequence is validated in block 1706 to ensure that each decoded data field corresponds to an acceptable value. Some validation may also take place when translating the ADFT sequence in block 1704. Validation may include determining whether each numerical value for each intelligent barcode field is within a determined range of values or may use other validation techniques, which will be appreciated by a person/one having ordinary skill in the art. In block 1708, the server determines whether the intelligent barcode 30 is valid. If the decoded barcode information is invalid, a message is prepared indicating that the barcode was invalid in block 1712.

If the intelligent barcode 30 is valid, then in block 1710, the server 18 uses the decoded data sequence to query a database for content associated with the barcode. The database may be local to the server or may be at a remote location from the server. In block 1714, the server 18 determines whether the query to the database returned any content associated with the barcode. If the query response indicated that there was no content associated with the distribution item 8, the server 18 may prepare a message indicating that no content associated with the distribution item 8 was found at block 1718. If the query response contained content associated with the distribution item 8, then in block 1716, a message is prepared with the content or a link to the content returned by the query. As described above, the database may return either a link to content, such as a URL, or actual content that may be used by a computing device 14. The appropriate message, generated by either blocks 1712, 1716, or 1718 is then transmitted to a computing device 14 in block 1720. The process ends in block 1722.

Figure 18:
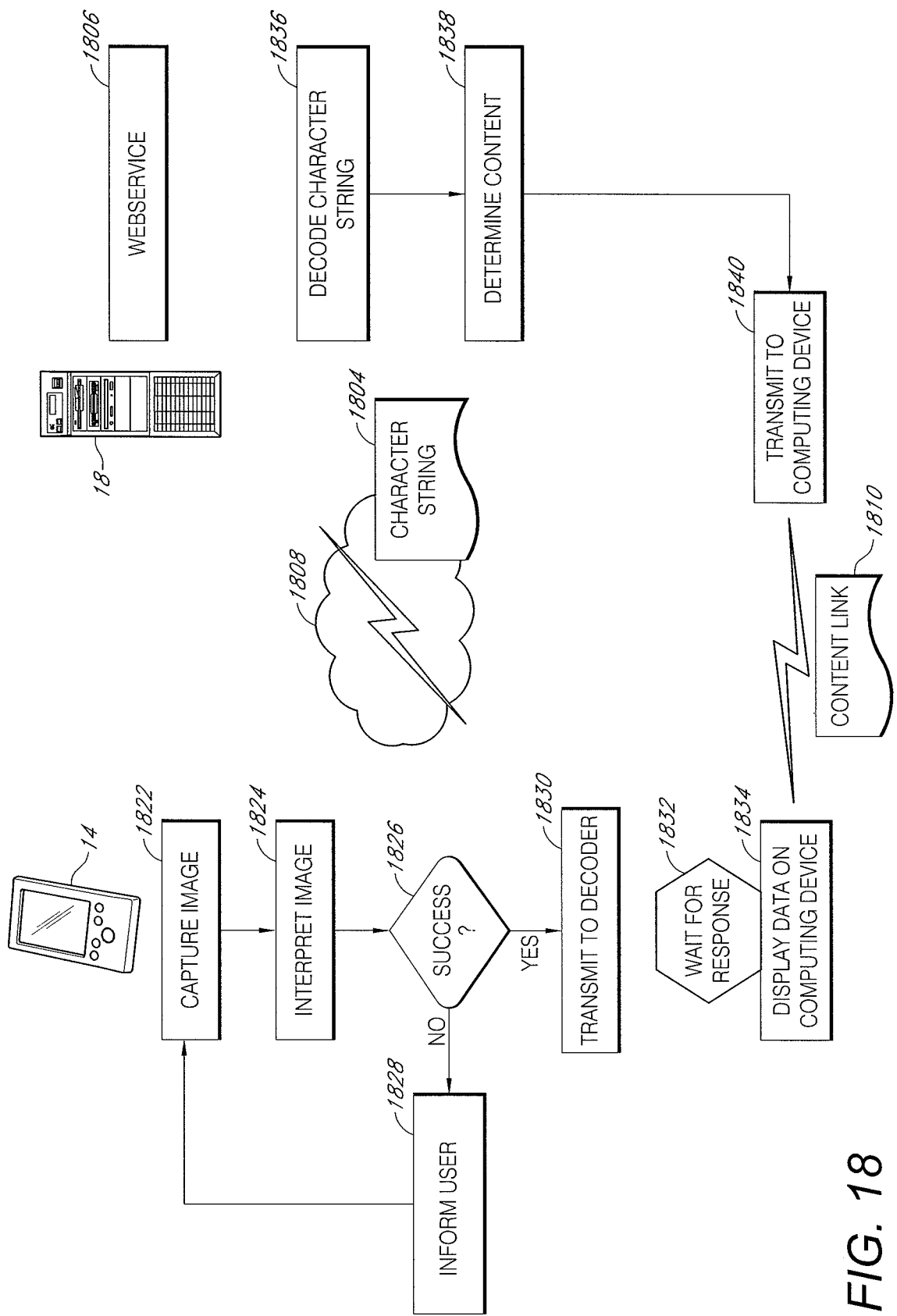
FIG. 18 shows a flowchart according to an exemplary system where image processing is performed by the computing device used to capture the intelligent barcode image.
Figure 19:
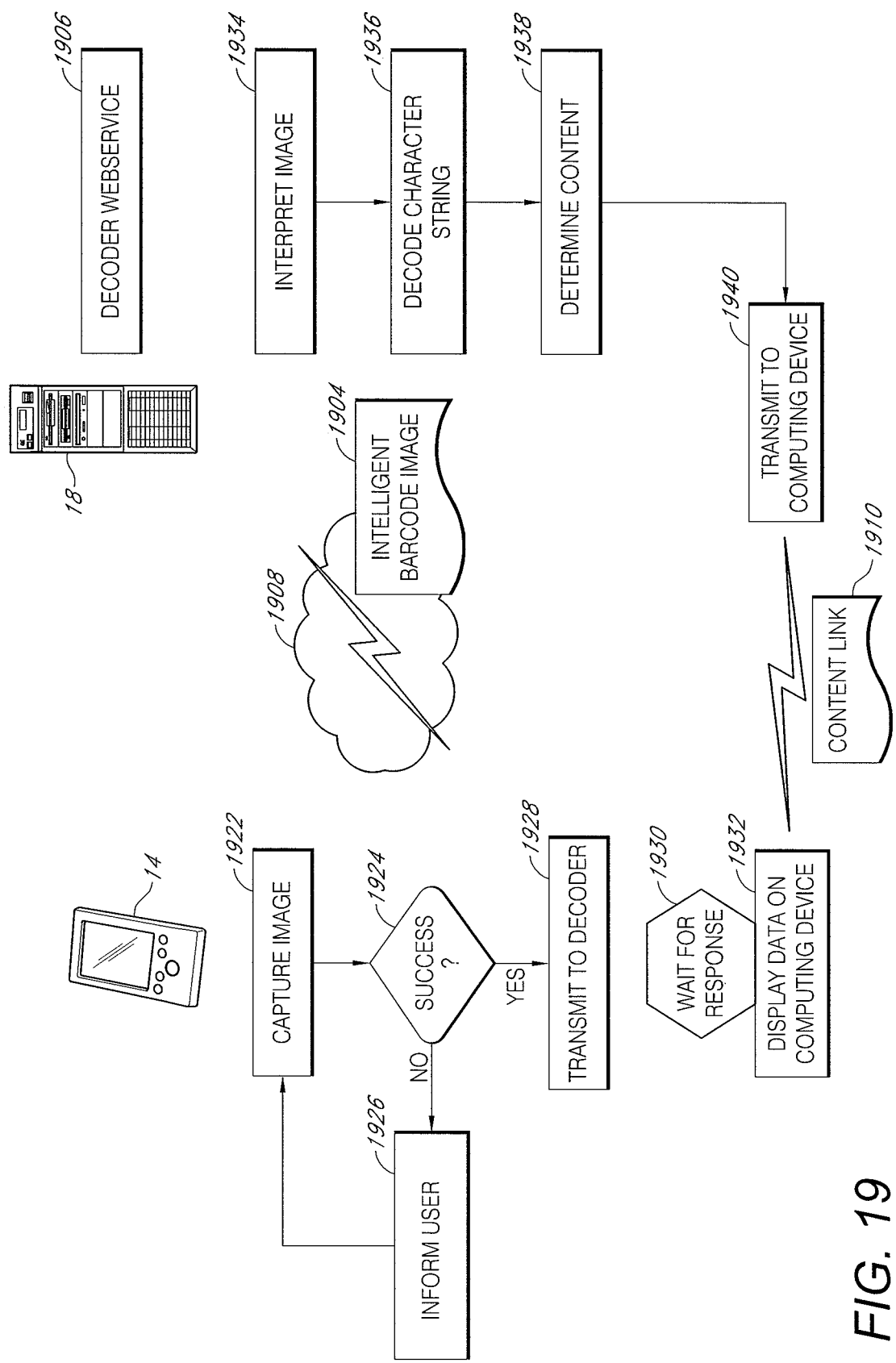
FIG. 19 shows a flowchart according to an exemplary system where image processing of an image of an intelligent mail barcode is performed by a decoder web service on a server.

As described with reference to FIGS. 15 and 16, the computing device 14 may interpret an image to generate an ADFT character sequence determined by the intelligent barcode 30. As described above with reference to FIG. 17, a server 18 may translate an ADFT sequence into a thirty-one digit data sequence. It should be appreciated that these operations may be done either entirely on the computing device 14, entirely by a network service, or any combination thereof. FIGS. 18 and 19 show examples of embodiments where intelligent barcode image processing is performed either on the server 18 or on the computing device 14.

FIG. 18 shows a flowchart according to an exemplary system where image processing is performed by the computing device 14 used to capture the intelligent barcode image. The computing device 14 in FIG. 18 is used to capture an image of an intelligent barcode 30 in block 1822, and then interpret the image to generate the corresponding ADFT character sequence in block 1824. Block 1824 may be implemented according to a process similar to that described with respect to FIG. 12. In block 1826, the computing device 14 determines whether the ADFT character sequence was successfully generated. If the ADFT character sequence 1804 was successfully generated, then the character sequence 1804 is transmitted to a server 18 that includes a decoder web-service 1806 in block 1830. If the ADFT character sequence 1804 was not successfully generated, the computing device 14 may display a message indicating such to a user in block 1828. Otherwise, the computing device 14 waits for a response in block 1832. Once the response is received, then the computing device 14 may display the response or data associated with the response (e.g., the contents of a link using a web browser) on the computing device 14 as depicted in block 1834.

Once the ADFT character sequence 1804 is received at the server's web service 1806, the ADFT character sequence 1804 is decoded to produce a thirty-one digit sequence corresponding to the fields of the intelligent barcode in block 1836. The server 18 with the web service 1806 may be accessed via a wide area network 1808, such as the Internet. Using the thirty-one digit sequence, in block 1838 the web service 1806 then determines whether there is content associated with the intelligent barcode field values, such as for example querying a database as described above with reference to FIG. 13. In block 1840, the web service 1806 transmits the content, if any, to the computing device 14. The content may be a content link 1810 which may be used by the computing device 14 to view content associated with the distribution item 8 or may be other content. According to FIG. 18, the web service receives the ADFT character sequence and is not required to perform image processing of an intelligent barcode image. Avoiding image processing by the web service may reduce latency if the web service is requested to process multiple intelligent barcode 30 requests at once. This may allow for greater scalability as an increase in requests for content associated with a barcode will have less of an impact on latency if image processing is performed by the computing device 14. Low network latency may improve the user experience such that the process is used more frequently and different and diverse applications might be more easily developed for custom intelligent barcode interpreters built for different devices.

FIG. 19 shows a flowchart according to an exemplary system where image processing is performed by a decoder web service 1906 on a server 18, rather than by the computing device 14 used to capture the intelligent barcode image. The computing device 14 in FIG. 19 captures an image of an intelligent barcode 30 in block 1922 and additionally may perform some pre-processing of the image. The computing device 14 determines if the image captured successfully as depicted at block 1924. If the image was captured successfully, then the intelligent barcode image 1904 is transmitted to the server 18 in block 1928 that includes a web service component 1906. If the image was not successfully captured, the computing device 14 may inform the user in block 1926. The computing device 14 then waits for a response in block 1930. Once the response is received, then the computing device 14 may display the response or data associated with the response (e.g., contents of a link) on the computing device 14 as depicted in block 1932.

Once the intelligent barcode image 1904 is received at the web service 1906, the image is interpreted to generate the ADFT character string determined by the intelligent barcode image in block 1934. The web service may be accessed via a wide area network 1908, such as the Internet. The web service 1906 then decodes the ADFT character string to determine the numeric digit sequences which correspond to the data fields of the intelligent barcode 30 in block 1936. In block 1938, the method determines whether there is content associated with the intelligent barcode field values, for example by querying a database as described above. The server 18 then transmits the content, if any, to the computing device 14 at block 1940. The content may be a content link 1910 which may be used by the computing device to view content associated with the distribution item 8 or it may be other content. According to FIG. 19, barcode interpretation and decoding are both preformed by the network service. In one aspect, according to this architecture, all client computing devices may reuse barcode interpretation as it would be performed on a server. This embodiment may allow for a large number of client computing devices with capabilities of acquiring images of intelligent barcodes, to use the barcode interpretation functionality without having to incorporate native barcode interpretation libraries for each client device. On the other hand, this architecture may increase latency as multiple requests to interpret barcode images may have to be processed by the network, rather than done individually by each requesting client computing device.

It should be appreciated that the network architectures shown in FIGS. 18 and 19 describe just two examples of the division of responsibility for performing the operations necessary for decoding an image of an intelligent barcode 30 and retrieving content associated therewith and other embodiments are possible. For example, the computing device 14 may be configured to decode the ADFT character sequence 1404 to determine the numerical values corresponding to the barcode fields and then be configured to transmit these fields to a network service. In this way, only a portion of the fields associated with the intelligent barcode 30 may need to be transmitted if only a portion of those fields are used to determine whether content exists for the intelligent barcode 30. Additionally, further validation may be able to occur on the computing device 14 that may improve scalability of the system where less processing is required by the network service.

Figure 20A:
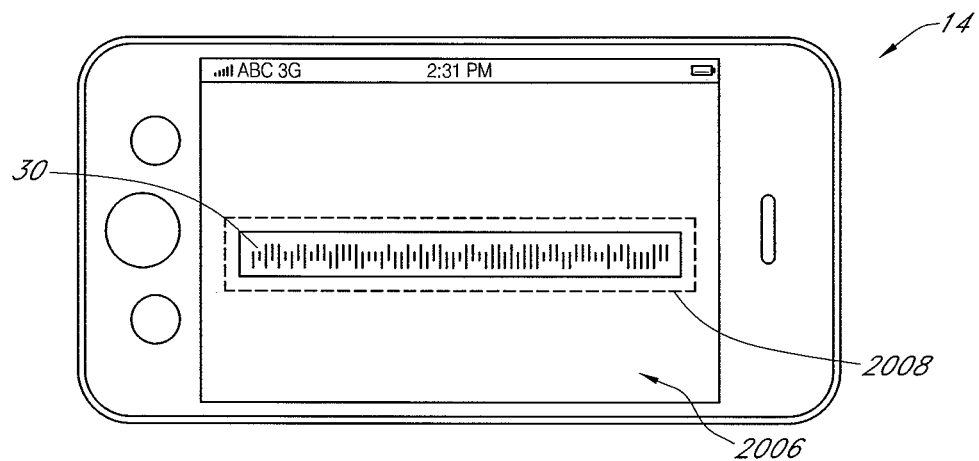
FIGS. 20A, 20B, and 20C show an example of a user interfaces that may be used with the systems described in FIGS. 1-19.
Figure 20B:
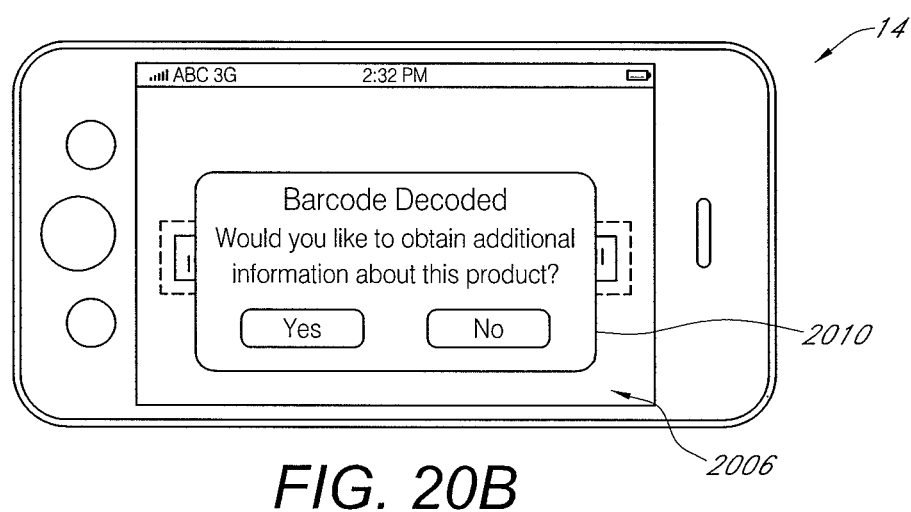
Figure 20C:
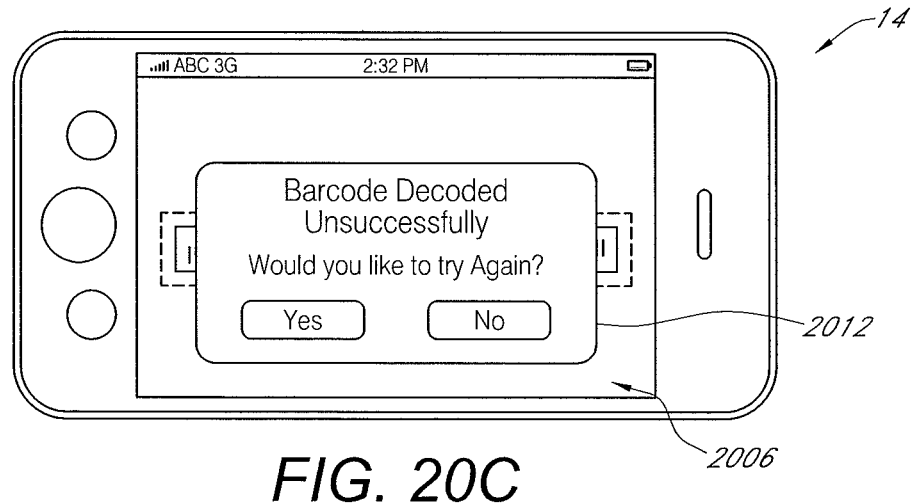

FIGS. 20A-20C show examples of exemplary user interfaces that may be used in conjunction with the methods described with respect to FIG. 1-19. FIG. 20A shows an example of a user interface that may be used to aid in capturing an intelligent barcode image using a computing device 14 such as a smart phone with an integrated digital camera (not shown). The computing device 14 may included a display 2006 which continuously displays the output of the digital camera. The continuous video stream of camera output on the display 2006 allows a user to identify and preview an intelligent barcode 30 for acquiring the image. Additionally, the display 2006 may also show an overlay frame 2008 which defines an area of the camera output viewed on the display for framing an intelligent barcode 30. The overlay frame 2008 is continuously displayed so that a user may move the computing device 14 such that an intelligent barcode 30 may be framed within the overlay frame 2008 before the computing device 14 captures the intelligent barcode image. By using the overlay frame 2008, the computing device 14 may more easily identify the portion of the image including the intelligent barcode 30 and may allow for easier processing of the intelligent barcode for determining the ADFT character sequence. For example a skewed, or mis-orientated image may make it more difficult for the computing device 14 to identify the horizontal bars. The overlay frame 2008 will help to improve the accuracy and ability to capture an intelligent barcode 30. The overlay frame 2008 is not included in the captured image.

FIG. 20B shows an example of a user interface for a computing device 14 that may be displayed when a barcode is successfully decoded and a response is received from a server 18. This display 2006 may show the captured image of the intelligent barcode 30 along with a message 2010 indicating that the barcode was successfully decoded. The message 2010 may also provide a user-selectable option to view content associated with the barcode. For example, the message may query a user as to whether the user wishes to view further information. The user selectable option may cause the computing device 14 to display a web browser that is redirected to a link retrieved from the network service.

FIG. 20C shows an example of a user interface for a computing device 14 that may be displayed when the barcode is unsuccessfully decoded by either the computing device or the network service. The display 2006 may show a message 2012 indicating that the barcode was decoded unsuccessfully and may query the user as to whether they would like to try to acquire another image of the intelligent barcode. This message 2012 may be displayed corresponding to a variety of scenarios. For example, the network service may respond with a message indicating the barcode was invalid. Or the message 2012 may be displayed if the computing device failed to process the image correctly or failed to be able to determine the ADFT character sequence from the image. Other error messages may also be displayed to notify the user, for example, that there was no content associated with a valid barcode, or more specific details for any reason why the barcode was unsuccessfully decoded.

Picture Permits and Postage

Figure 21A:
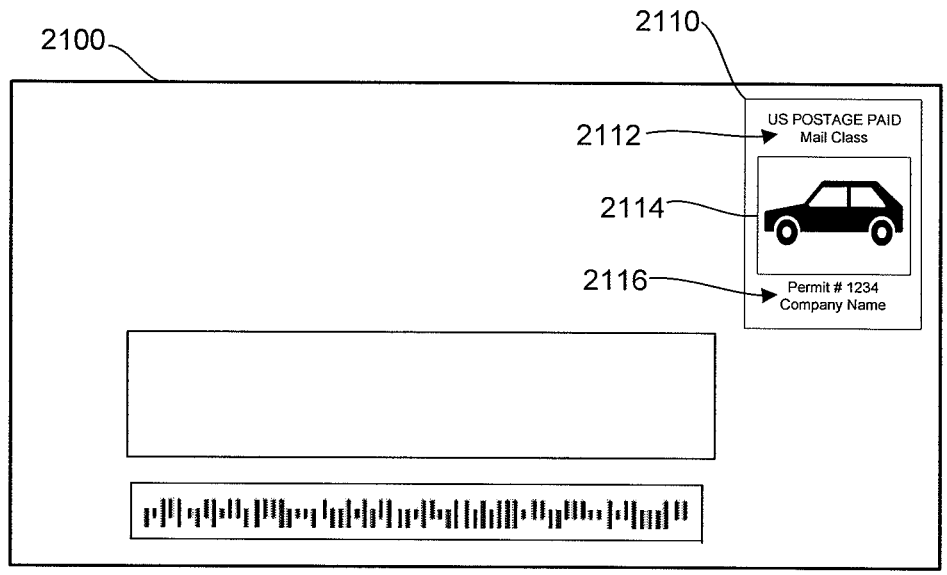
FIGS. 21A, 21B, and 21C show examples of one embodiment of an information item such as an image used in connection with a distribution item.

In some embodiments, an information item can include a picture permit. A picture permit can be located at any position on a distribution item, and can have any desired size. A picture permit can be used as postage, or in addition to postage. FIG. 21A depicts one embodiment of a distribution item 2100 with an affixed picture permit 2110. The picture permit 2110 contains a first text portion 2112, an image portion 2114, and a second text portion 2116. In some embodiments, a picture permit 2110 can be associated with additional information at a server or computing device. In some embodiments, a picture permit 2110 can be associated with addition information by the image portion 2114. In some embodiments, a picture permit 2110 can be associated with additional information by one or both of the first text portion 2112 and the second text portion 2116. In some embodiments, the picture permit 2110 can be associated with additional information by the image portion and one or both of the first text portion 2112 and the second text portion 2116. In some embodiments, the picture permit 2110, in connection with one or more other information items on the distribution item can be associated with additional information.

In some embodiments, the text portion of a picture permit can be an encoded text string. In some embodiments, the encoded text string can comprise alpha-numeric characters. In some embodiments, the text string can comprise words. These words can provide information relating to the mail piece, such as, for example, the postage status, class, delivery service, handling instructions, an internet address, an e-mail address, sender information, company information, or any other information. A picture permit can include an image. As depicted in FIG. 21A, the first text portion 2112 describes the postage status and the mail class for the mail piece. As also depicted in FIG. 21A, the second text portion 2116 provides company name and permit number. A permit number can be associated with a permit account associate with delivery services, handling instructions, billing or payment information, or any other information.

The image portion 2114 can include an image. The image can be a color image, a black-and-white image, a grayscale image, or any other type of image. In some embodiments, the image can be of an object or item recognizable to the recipient of the mail piece. In some embodiments, the image may be non-recognizable to the recipient of the mail piece. An image can be created using a variety of techniques. In some embodiments, an image can be embedded in a computer readable code, such as, for example, a barcode, or a quick response code ("QR code"). In some embodiments, a computer readable code, such as, for example, a barcode or a QR code can be embedded in an image. In some embodiments, aspects of the image can comprise the computer readable code. These can include, for example, image shape, image dimensions, image color, image border shape, or any other image characteristic.

An image can be created through a variety of techniques, including printing, embossing, impregnating, or any other technique. In some embodiments, an image can be created using ink with detectable characteristics. In one embodiment, a portion of the image may include magnetic ink, fluorescent ink, infrared ink, ultraviolet ink, radioactive ink, or other detectable ink. In one embodiment, a portion of the image may include an embedded electronic device, such as, for example, a radio-frequency identification (RFID) device.

An image portion 2114 can include any desired image. In some embodiments, an image can depict the subject of additional information with which the picture permit is associated. Alternatively, an image can depict something with no apparent association to the subject of the additional information. In some embodiments, the image can be of or a symbol of a product or service. In one embodiment, for example, an image can identify a specific good or service, such as an image of a specific make and model of, for example, an automobile. In one embodiment, an image can designate a line or class of goods or services, such as, for example, an image depicting a washing machine representing all washing machines made by a manufacturer. In one embodiment, an image can be associated with the general topic of the additional subject matter of the additional information with which the image is associated. FIG. 21a depicts an embodiment of a black-and-white image of a recipient recognizable item, namely, an automobile. The image itself, or something within the image, may allow for specifically or uniquely identifying the distribution item. For example, the image may have a marking in a particular location that provides a feature allowing for unique identification.

In one embodiment, the second text portion 2116, including information relating to the permit number and sender and the image portion 2114 can be associated with additional information. Advantageously, use of information from the text portion in connection with information from the image portion can simplify the image recognition process.

Figure 21B:
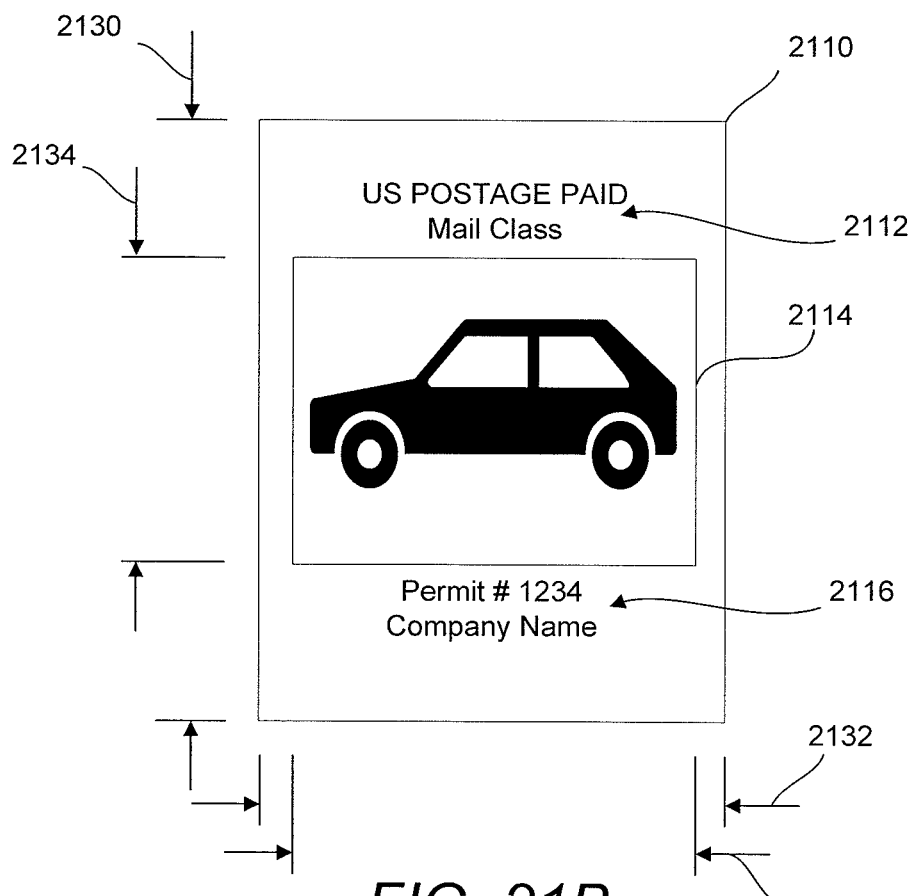

A picture permit can be of a defined size and shape. In some embodiments one or more of an image portion or a text portion can have a defined size or shape. FIG. 21B depicts one embodiment of a picture permit 2110. As depicted in FIG. 21B, picture permit 2110 is defined by a first dimension 2130 and a second dimension 2132. First dimension 2130 describes the height of picture permit 2110 and second dimension 2132 describes the width of picture permit 2110. The height and width of the picture permit can comprise a variety of dimensions. In embodiments in which a picture permit is configured for use in connection with a distribution item that is a mail piece, the picture permit can be sized and shaped to fit on the mail piece. In some embodiments, for example, a picture permit can have a first dimension 2130 less than three inches, less than two inches, or less than one inch and a second dimension 2132 less than three inches, less than two inches, or less than one inch. In one embodiment, the first dimension 2130 is between approximately 1.75 and 1.5 inches and the second dimension can be between approximately 1.5 and 1.31 inches.

As depicted in FIG. 21B, the dimensions of the picture permit can be different from the dimensions of the different portions 2112, 2114, 2116 of the picture permit 2110. In one embodiments, image portion 2114 can be defined by a first dimension 2134 and a second dimension 2136. First dimension 2134 of the image portion 2114 describes the height of the image portion and second dimension 2136 describes the width of the image portion. In one embodiment, the first dimension 2134 of the image portion 2114 can be less than three inches, less than two inches, or less than one inch, and the second dimension 2136 of the image portion 2110 can be less than three inches, less than two inches, or less than one inch. In one embodiment, the first dimension 2134 of the image portion 2110 is between 0.84 and 1.0 inches and the second dimension 2136 of the image portion 2110 is between 1.31 and 1.5 inches.

In some embodiments, the first dimension 2134 or the second dimension 2136 of the image portion 2114 can coincide with the first dimension 2130 and the second dimension 2132 of the picture permit 2110. In some embodiments, the first dimension 2134 and the second dimension 2136 of the image portion do not coincide with the first dimension 2130 and the second dimension 2132 of the picture permit 2110.

Text portions 2112, 2116 can include text of varying fonts, colors, and sizes. In one embodiment, text portions can include text larger than 4 point, 6 point, 8 point, 10 point, 12 point, 20 point, or any other size. In one embodiment, text in text portions 2112, 2116 can be 8 point or larger.

Text portions can be defined by a height and a width. In one embodiment, the width of text portions 2112, 2116 can be less than or equal to the second dimension 2136 of the image portion 2114. In one embodiment, the width of text portions 2112, 2116 can be greater than or equal to the second dimension 2136 of the image portion 2114. In one embodiment, the width of text portions 2112, 2116 can be less than or equal to 1.31 inches.

Text portions 2112, 2116 can be separated from image portion 2114 by a distance. The distance of separation between the text portions 2112, 2116 and the image portion 2114 can vary. In one embodiment, the minimum separation between each of the text portions 2112, 2116 and the image portion can be at least 0.05 inches, 0.1 inches, 0.25 inches, 0.5 inches, or any other distance.

Figure 21C:
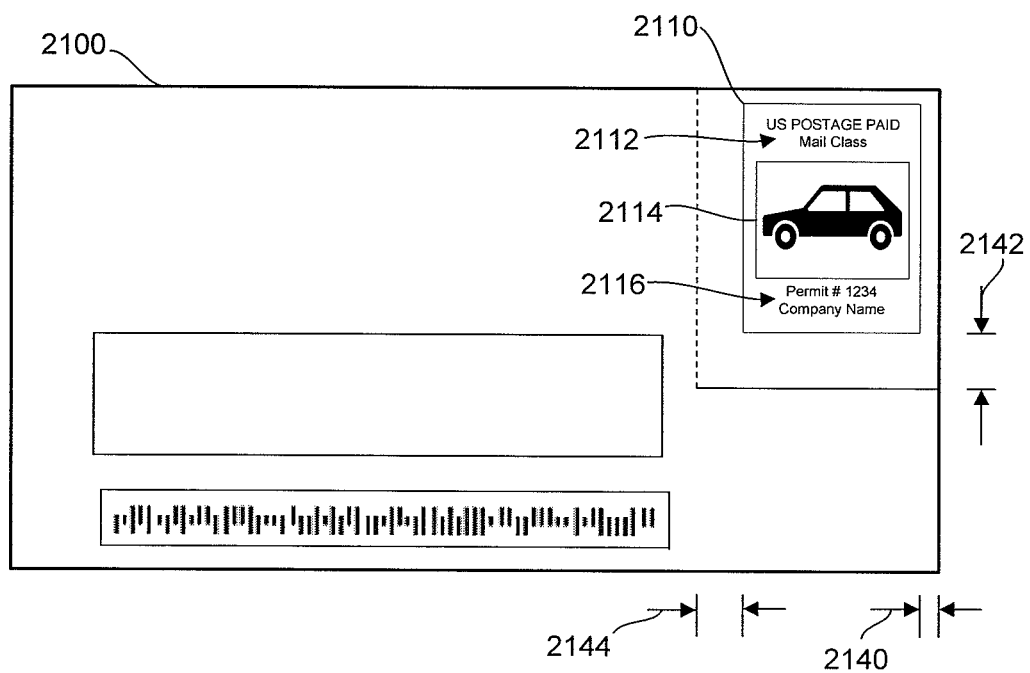

A picture permit 2110 can be located at any position on a distribution item 2100. In some embodiments in which a picture permit 2110 is used in connection with a mail piece, the picture permit may be located in the postage position. FIG. 21C depicts a distribution item 2100 with a picture permit 2110 located in the postage position. In some embodiments, the picture permit can be specifically located relative to the sides of the distribution item 2100. As depicted in FIG. 21C, the picture permit 2110 is spaced a distance 2140 from the edges of the distribution item 2100. Distance 2140 can vary. In some embodiments, distance 2140 can be, for example, less than three inches, less than one inch, less than one-half inch, less than one-quarter inch, or any other distance. In one embodiment, distance 2140 can be approximately 0.25 inches.

In some embodiments, and as depicted in FIG. 21C, a picture permit 2110 can be positioned so as to be separated from other portions of the distribution item 2100 by a first distance 2142 and a second distance 2144. First distance 2142 can be the same or different than second distance 2144. In some embodiments, first distance 2142 can be greater than 0.1 inches, greater than 0.25 inches, greater than 0.5 inches, greater than 1 inch, greater than two inches, or any other distance, and second distance 2144 can be greater than 0.1 inches, greater than 0.25 inches, greater than 0.5 inches, greater than 1 inch, greater than two inches, or any other distance. In some embodiments, first distance 2142 and second distance 2144 are greater than or equal to 0.5 inches.

Figure 22A:
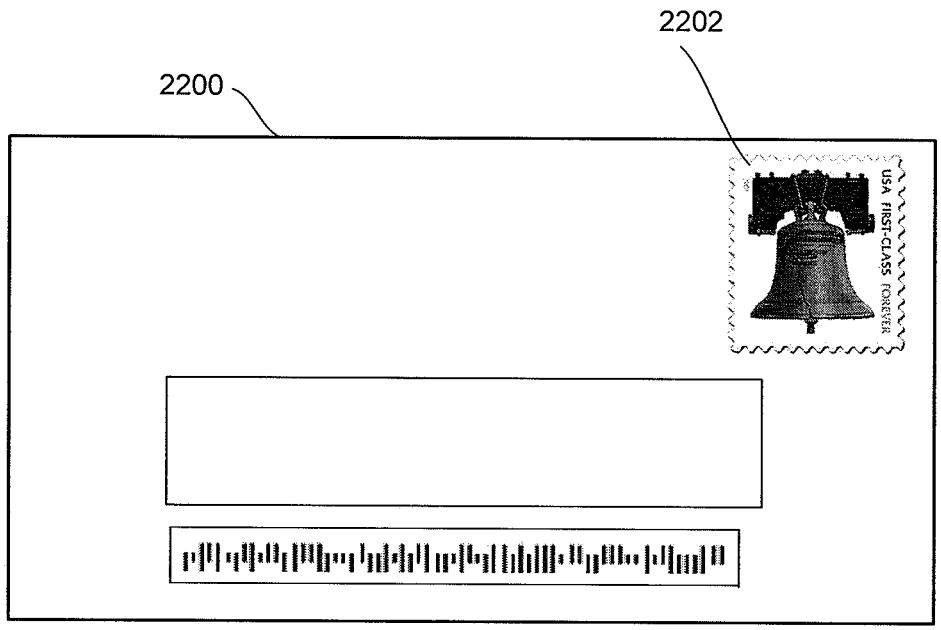
FIGS. 22A and 22B show examples of other embodiments of an information item with images used in connection with a distribution item.
Figure 22B:
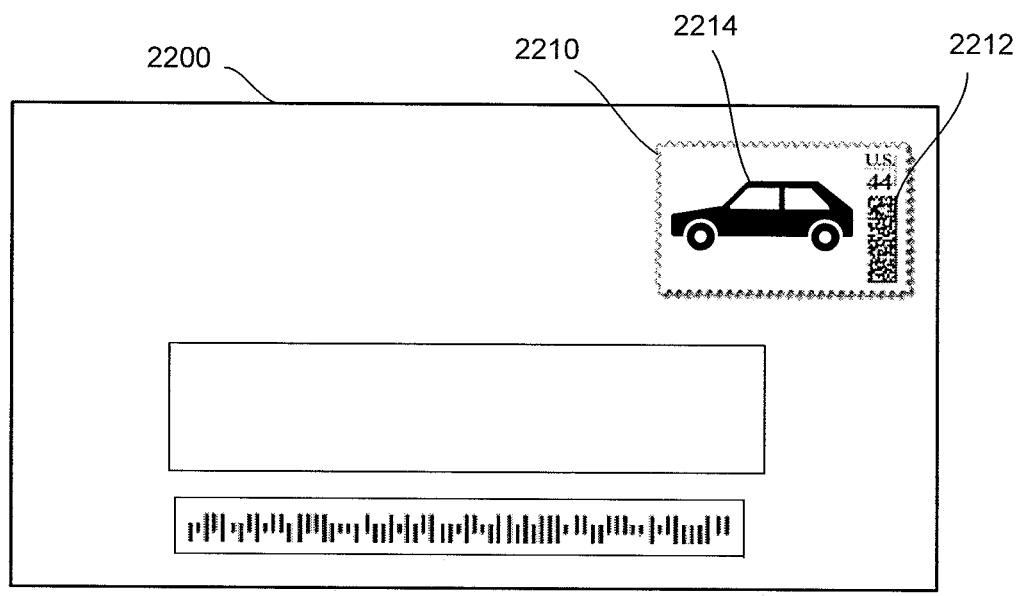

Some embodiments of a distribution item content retrieval system provide association of a distribution item with additional information through the use of a standard stamp or custom postage. FIG. 22A depicts one embodiment of a standard stamp 2202 on a distribution item 2200 and FIG. 22B depicts one embodiment of a custom postage 2210 on a distribution item 2200.

A standard stamp 2202 can be used as one of several sources of information on a distribution item for associating the distribution item with additional information. In one embodiment, a distributer may provide one or more information items on a distribution item. One of these information items can be a standard stamp 2202. A distributer may use a designated one of the standard stamps 2202 as an additional information item. In such an embodiment, the standard stamp 2202, in addition to other information items could be evaluated to identify additional information associated with the distribution item.

Custom postage can be used as one of several sources of information on a distribution item for association the distribution item with additional information. As depicted in FIG. 22B, custom postage 2210 (e.g., Postage PC) can comprise a code portion 2212 and an image portion 2214. The code portion 2212 can comprise any form of computer readable encoding, including text, a barcode, a QR code, or any other encoding. An image portion 2214 of custom postage 2210 can comprise an image integrated into a computer readable code, a computer readable code encoded into the image, or an identifiable image. In some embodiments, the image portion 2214 of the custom postage 2210 can be used in connection with other information items on a distribution item to identify additional information. In some embodiments, the code portion 2212 of the custom postage 2210 can be used in connection with other information items on a distribution item to identify additional information. In some embodiments, both the image portion 2214 and the code portion 2212 of a custom postage 2210 can be used, alone, or in connection with other information items of a distribution item to identify additional information.

Figure 23:
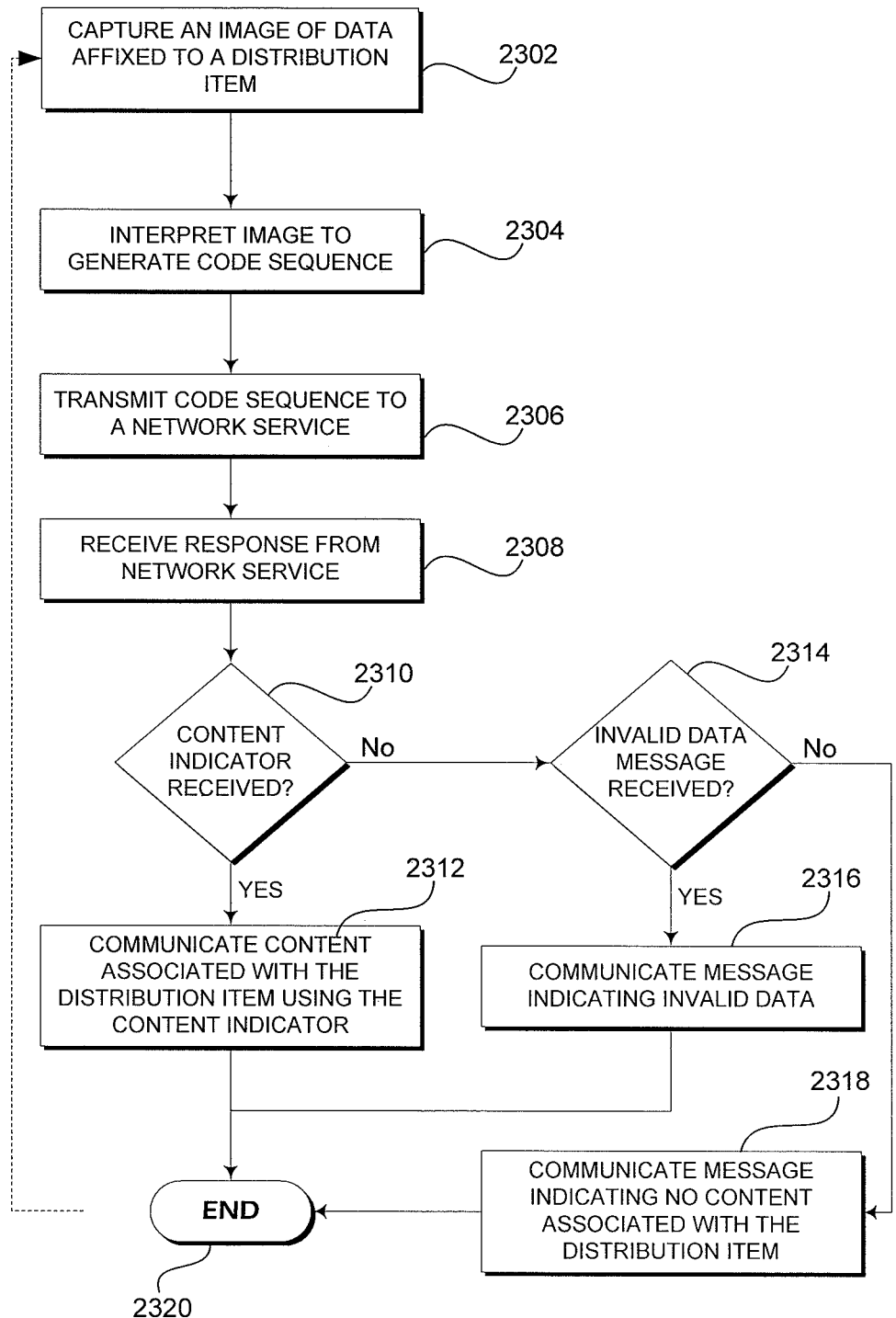
FIG. 23 shows a flowchart depicting one method of requesting and receiving additional information associated with a distribution item.
Figure 24:
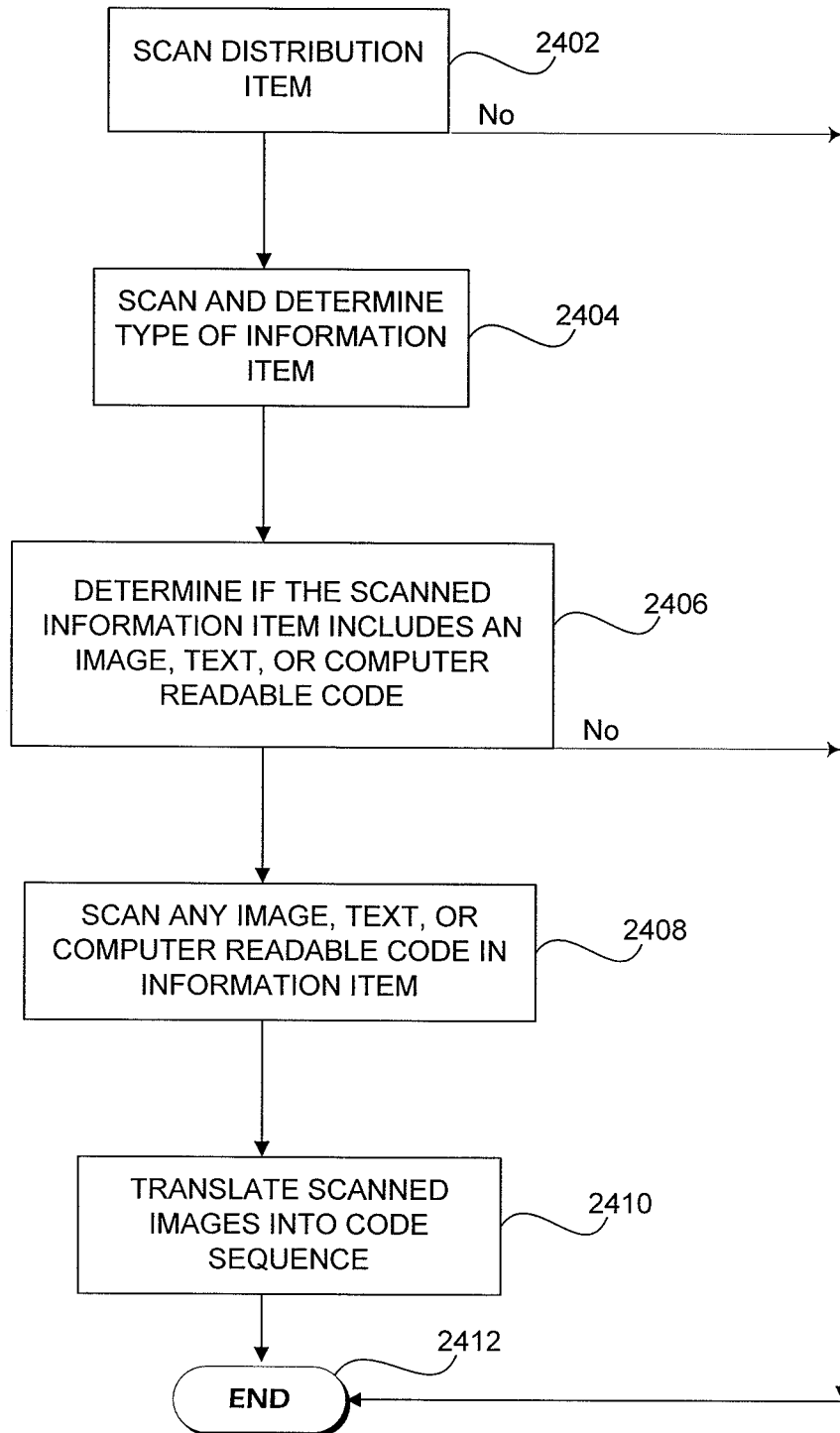
FIG. 24 shows a flowchart depicting one method of obtaining a code sequence from an information item.

FIGS. 23-24 show flowcharts depicting an exemplary method for use of a printed permit 2110, standard stamp 2202, or custom postage 2210 for retrieving information associated with a distribution item. FIG. 23 shows a flowchart of an exemplary method for retrieving information associated with a distribution item including one of a printed permit 2110, a standard stamp 2202, or a custom postage 2210. In block 2302, the method begins when an image of a printed permit 2110, standard stamp 2202, or custom postage 2210 affixed to a distribution item is received and/or captured using a computing device equipped with a digital camera. According to the method in FIG. 23, the computing device may be a smart phone with an integrated digital camera, a personal computer with an attached digital camera device, a laptop computer with an integrated digital camera, a tablet computer, or any other computing device capable of capturing and processing images. Once an image of the printed permit 2110, standard stamp 2202, or custom postage 2210 has been received by the computing device, in block 2304, the computing device interprets the image to generate a code sequence determined by the image of the printed permit 2110, standard stamp 2202, or custom postage 2210. A variety of methods may be used to determine the code sequence, as described above and as will be further described below.

Once the code sequence corresponding to the printed permit 2110, standard stamp 2202, or custom postage 2210 has been determined, the code sequence is transmitted to a network service in block 2306. The computing device may thereafter receive a response from the network service 2308. The response may indicate whether a valid message was received and whether there is content associated with the mail piece. In block 2310, a computing device processes the message and determines whether a content indicator has been received. The content indicator may be, for example, a uniform resource locator (URL) which can be used by a web browser on the computing device to retrieve and display content. If a content indicator was received in the response from the network service, in block 2312, the content associated with the mail piece may be communicated to the user by computing device. In some embodiments, the content associated with the mail piece may be displayed on the computing device by using the content indicator. As described above, in another embodiment the network service may provide actual displayable, communicable, and or usable content directly to the computing device rather than just providing a link. The method then concludes at block 2320, until the computing device captures and/or receives another image of a printed permit 2110, standard stamp 2202, or custom postage 2210. It should be appreciated that a printed permit 2110, standard stamp 2202, or custom postage 2210 may be used to associate a distribution item 8 with digital educational, entertainment, promotional and marketing material that may be provided to a recipient 12 via a computing device 14. Furthermore, at least a portion of a printed permit 2110, standard stamp 2202, or custom postage 2210 may be may be manipulated and superimposed on other pictures, images and materials to produce new digital impressions. Furthermore, stamps, custom postage, or picture permits, etc, may be manipulated or superimposed via an APIs and other applications to enable customers to reach their target audience digitally with expanded offerings and services.

If a content indicator was not included in the response, the method continues at block 2314 where the computing device determines whether the response included an indication that the image of the printed permit 2110, standard stamp 2202, or custom postage 2210 was invalid. If the response indicates the image of the printed permit 2110, standard stamp 2202, or custom postage 2210 was invalid, the method proceeds to block 2316 where the computing device displays a message indicating that the image received of the printed permit 2110, standard stamp 2202, or custom postage 2210 was invalid. If no content indicator was received and there was no indication that the image of the printed permit 2110, standard stamp 2202, or custom postage 2210 was invalid, then the computing device may determine that there was no content associated with the distribution item. In this case, as shown in block 2318, the computing device may display a message indicating that no content associated with the distribution item was identified by the network service.

As described in FIG. 23, a computing device may interpret an image of a printed permit 2110, standard stamp 2202, or custom postage 2210 to generate the code sequence determined by the printed permit 2110, standard stamp 2202, or custom postage 2210 image. FIG. 24 shows a flowchart of an exemplary method for interpreting a printed permit 2110, standard stamp 2202, or custom postage 2210 image to determine the corresponding code sequence. In block 2402, the distribution item is scanned to determine if it includes an information item, such as a printed permit 2110, standard stamp 2202, or custom postage 2210. If the distribution item does not include a printed permit 2110, standard stamp 2202, or custom postage 2210, the process goes to block 2412. If the distribution item includes an information item such as a printed permit 2110, standard stamp 2202, or custom postage 2210, the process moves to block 2404 where the printed permit 2110, standard stamp 2202, or custom postage 2210 is scanned and the type of the information item is determined.

The image may be broken into components as the computing device determines, in block 2406, if the printed permit 2110, standard stamp 2202, or custom postage 2210 includes computer readable code, text, and or an image. If the information item such as a printed permit 2110, standard stamp 2202, or custom postage 2210, does not include computer readable code, text, and or an image, then the process moves to block 2412. If the computing device determines that the information item such as a printed permit 2110, standard stamp 2202, or custom postage 2210, does include computer readable code, text, and or an image, the computing device scans each of the computer readable code, text, and or an image in the information item at block 2408.

The computing device then proceeds to translate the scanned images into a code sequence in block 2410. This process can use Optical Character Recognition ("OCR") software, code scanning software, or image recognition software. This code can then be used, alone or in connection with other code taken from the distribution item, to determine and deliver data or information associated with the distribution item. In some embodiments, specifications may direct a specified placement of the printed permit 2110, standard stamp 2202, or custom postage 2210 on a distribution item 8. This may be used by image recognition systems, software, and/or devices to accurately detect the location of images and/or textual information and further aid in the ability to process and derive information from the scanned images. Image recognition may include using other information extracted from the distribution item to narrow the possible images need to be recognized. Image recognitions software may further identify specific areas of an image that allow for unique identification and to perform additional processes as will be known in the art. For example, image recognition software and hardware may perform functions some as object segmentation, object recognition, facial recognition, color segmentation, orientation, image matching, and the like. In some embodiments, deriving information about a distribution item 8 from an image may include performing image recognition on the image to determine what is depicted in the image. For example, the image in a stamp, picture permit, or custom postage may be a product offered by a mailer that may be detected using image recognition software on a server or computing device. In one embodiment, the image recognition may include comparing the image against possible matches to determine the image. Determining the specific image may allow for identifying the distribution item 8 and/or content associated with the distribution item 8 that may be experienced via a computing device 14.

Figure 25A:
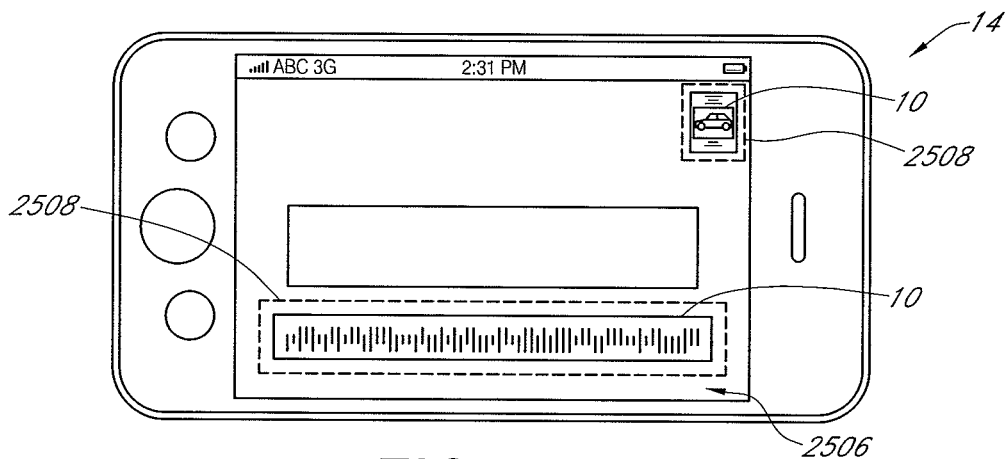
FIGS. 25A, 25B, and 25C show examples of one embodiment of the display of a computing device used to acquire additional information associated with a distribution item.
Figure 25B:
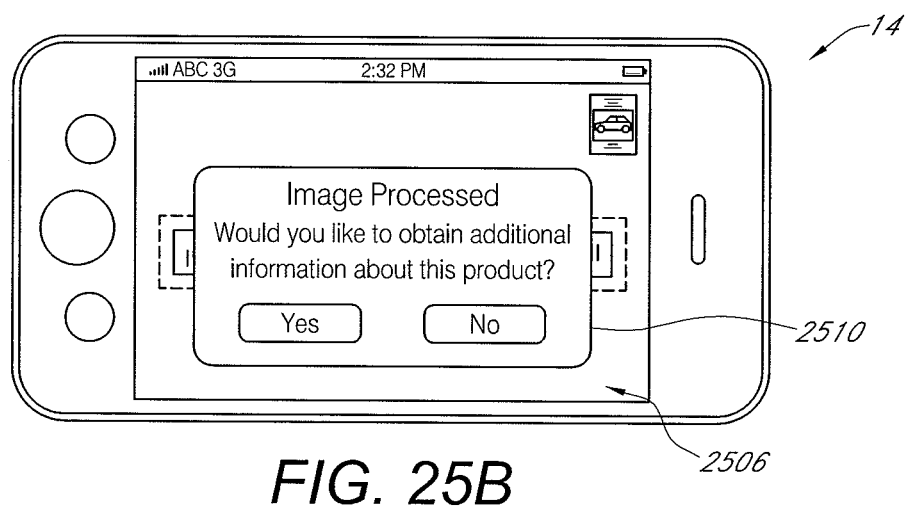
Figure 25C:
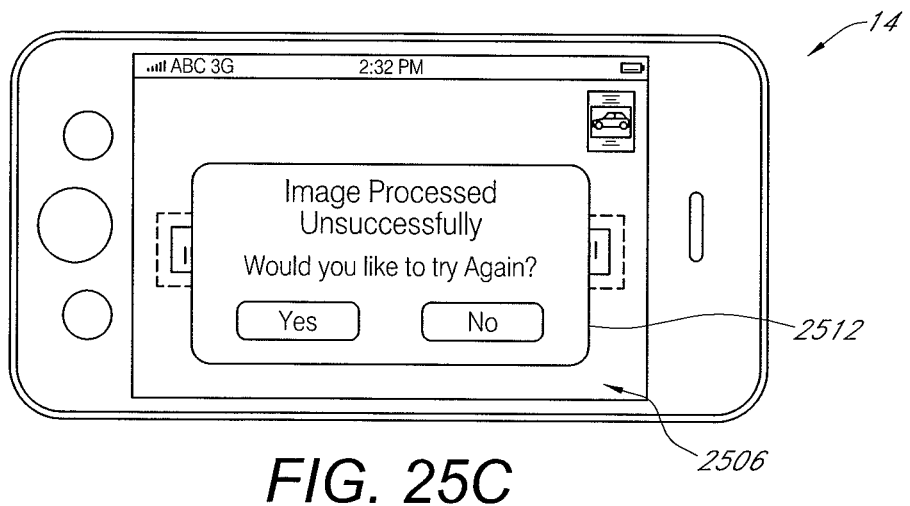

FIGS. 25A-25C show examples of exemplary user interfaces that may be used in conjunction with the methods described with respect to FIGS. 21-24. FIG. 25A shows an example of a user interface that may be used to aid in capturing an image of a printed permit 2110, standard stamp 2202, or custom postage 2210 using a computing device 14 such as a smart phone with an integrated digital camera (not shown). The computing device 14 may included a display 2506 which continuously displays the output of the digital camera. The continuous stream of camera output on the display 2506 allows a user to identify and preview information items 10 for acquiring the image. Additionally, the display 2506 may also show one or more overlay frames 2508 which defines an area of the camera output viewed on the display for framing information items 10. The overlay frame 2508 is continuously displayed so that a user may move the computing device 14 such that the information items 10 may be framed within the overlay frames 2508 before the computing device 14 captures the information item data. By using the overlay frame 2508, the computing device 14 may more easily identify the portion of the image including the information items 10 and may allow for easier processing of the information items. The overlay frame 2508 can improve the accuracy and ability to capture information items 10. The overlay frame 2508 is not included in the captured image.

FIG. 25B shows an example of a user interface for a computing device 14 that may be displayed when an information item is successfully decoded and a response is received from a server 18. This display 2506 may show the captured image of the information item 10 along with a message 2510 indicating that the information item was successfully decoded. The message 2510 may also provide a user-selectable option to view content associated with the information item. For example, the message may query a user as to whether the user wishes to view further information. The user selectable option may cause the computing device 14 to display a web browser that is redirected to a link retrieved from the network service.

FIG. 25C shows an example of a user interface for a computing device 14 that may be displayed when the information item is unsuccessfully decoded by either the computing device or the network service. The display 2506 may show a message 2512 indicating that the information item was decoded unsuccessfully and may query the user as to whether they would like to try to acquire another image of the information item. This message 2512 may be displayed corresponding to a variety of scenarios. For example, the network service may respond with a message indicating the barcode was invalid. Or the message 2512 may be displayed if the computing device failed to process the image correctly or failed to be able to determine the code sequence from the image. Other error messages may also be displayed to notify the user, for example, that there was no content associated with a valid information item, or more specific details for any reason why the information item was unsuccessfully decoded.

It should be appreciated that the figures described above may use a single piece of information (such as a barcode, image, etc) or may use a combination of information items 10. For example, an image may be captured of a distribution item that includes both a picture permit 2110 and an intelligent barcode 30 as described above. This information may be processed and data derived from both the intelligent barcode 30 and the picture permit 2110 and combined to further identify a distribution item and provide information that will allow customization and/or selection of content to be provided. As such, any combination of the above systems and method is contemplated for delivering content to a recipient via a computing device 14 that is able to electronically process information items 10 associated with the distribution item.

Content, Services and Offerings Associated with a Distribution Item

As described above with reference to FIGS. 1-20, various embodiments provide for delivering content associated with a distribution item 8 to a computing device 14 using an information item 10 delivered with the distribution item 8. In this way, customized and/or interactive content may be provided to a recipient 12. In one sense, this allows a distribution item 8 to be accompanied by computer-generated augmented reality content that is associated with the content of the distribution item 8. For example, a 2D image printed on a distribution item 8 may be used and processed by a computing device 14 to link to virtual and interactive content associated with an item represented in the 2D image.

In one embodiment, the distribution item 8 may include printed media or a postcard depicting a product. The information item 10 described above may be an image of a product that is printed on the distribution item 8. For example, an image of a vehicle may appear on an envelope of a distribution item 8 sent from a company seeking to advertise a new vehicle. The computing device 14 may be used by the recipient 12 to capture an image of the vehicle. The computing device 14 may then be able to send the captured image of the vehicle, after performing any additional processing as necessary, for efficient transmission, to a server 18. The server 18 may be operated by the distribution service provider, such as, for example, by the U.S. Postal Service. As described above, the server may perform image recognition on the image to determine the type of vehicle. Additional information items 10 processed by the computing device 14 may be used in conjunction with the image of the vehicle to more easily determine a specific type of vehicle represented by the image.

Based on the image, the server 18 may be able to associate the image of the vehicle with further content with respect to the vehicle that may be delivered to the computing device 14 and provided for experiencing by the recipient via the computing device 14. For example, using data received from the server 18 (via either a link or actual content) an application (either a native application or via a web browser application) on the computing device 14 may be configured to display different perspective views of the vehicle along with further information. In addition, an application on the computing device 14 may be configured to let a recipient 12 virtually "test drive" the vehicle after the recipient 12 uses the computing device 14 to process the image of the vehicle. In some embodiments, as described above, the mailer may operate a server which may receive processed data relating to the information item 10. The mailer's server may generate the content for delivery to the computing device either directly or via the server 18 that may be operated by the distribution service provider. As can be appreciated, there is a wide variety of other types of interactive content that may be desirable to be provided via a computing device 14 in association with content sent with a distribution item 10.

In another embodiment, the content delivered via the computing device 14 may include a customized animation associated with the product, or a video with further information or advertising with respect to the product. For example 2D or 3D video presentations may be delivered. Furthermore, the content may allow virtual or actual interaction with a prototype or model of a product. Content may include visual, narrated, and media-rich content.

As such, in one aspect, an image on a picture permit or stamp used for mailing purposes (e.g., payment and routing) may further be taken advantage of to link a recipient 12 to expanded content associated with the image and the distribution item 8. This may further allow a mailer 2 in flexibility in providing a distribution item 8 that is able to attract recipients 12 and provide them with additional interactive service offerings and content.

In other embodiments, the content delivered via the computing device 14 may be a catalog detailing information about the product and other products that may give more price details, other views, and additional information. In addition, the content may include coupons associated with the product represented on a distribution item when the distribution item is scanned by the computing device 14. In other embodiments, the content may provide the computing device with the ability to display an online product offering that allows purchasing the product directly from the computing device 14, such as an e-commerce website. In this case, if a recipient chooses to place an order for a product in response to viewing content after processing the information item 10 on the distribution item 8, the distribution service provider used to facilitate this process, such as the U.S. Postal Service, may be automatically selected as the shipper of that product. As such, the distribution service provider would be able to benefit from providing services for allowing a recipient to process and associate content with a distribution item 8.

In another embodiment, additional data may be sent by the computing device 14 in addition to the data derived from the information item 10 to deliver customized content to the recipient 12. For example, the computing device 14 may also transmit its geographic location, date/time information, object proximity, other actions performed by a recipient 12, and the like. For example, geo-location information provided by a computing device 14 (or alternatively by an intelligent barcode 30 field) may be used to gather data and provide localized services or offerings. For example, an advertiser may send a distribution item 8 out to a large geographical area. When a recipient 12 uses a computing device 14 to derive data from the information item 10, the computing device may be linked to content or offerings specific to the location in which the distribution item 8 was processed using the computing device 14. In another example, an increased discount might be made available through the intelligent barcode 30 for recipients in a certain zip code or series of zip codes defining a geographic location. This data may also be used to better track recipients based on their preferences and choices when they use a computing device 14 to decode the barcode.

In other embodiment, content can be provided based on the proximity of the recipient to the delivery address of the recipient based on the current geographical location provided by the computing device 14. For example, a distribution item 8 may include an advertisement for a product that may be purchased at some retail location. When a recipient 12 uses a computing device 14 to access content associated with the product depicted in the distribution item 8 as described above, the content generated and sent to the recipient's 12 computing device 14 may be determined by the geographical location and the recipient's 12 address to which the distribution item was delivered. If the geographical location of the computing device is closer to the retail location than the address of the recipient, then the content sent to the computing device 14 may be a coupon. However, if the geographical location of the computing device 14 is closer in proximity to the address for the recipient, then the content provided via the computing device 14 may include a catalog, video, or other offering detailing information about a variety of products. In another embodiment, a coupon for a local retail location may be provided rather than a nationally based advertisement based on the geographical location of the computing device 14. Further customization of content based on the geographical location is also possible and contemplated herein. Other data, including date/time information, and other actions performed by a recipient 12 on the computing device 14 may also be used to provide targeted/customized content to the computing device 14.

According to various embodiments described above and contemplated herein, a third party, such as a mailer, may operate a network service that is configured to provide customized content that may be experienced via a computing device 14. The third party may enter into an agreement (e.g., sign up) for a service provided by the distribution service provider (e.g., the U.S. Postal Service) which provides the systems necessary for allowing a recipient to be linked to content associated with a distribution item 8. The service may allow a network service (or other service) to receive information when a distribution service provider service receives information in response to a recipient 12 using a computing device 14 to process the distribution item 8 to be linked to further content. For example, the distribution item 8 may be sent from the third party who receives data at a network service from the distribution service provider's service in response to the recipient 12 using the computing device 14 to access additional content as described above. Once the information is received, the third party service may generate customized content and either provide the content directly to the computing device 14 or via the distribution service provider service. As such, a wide range of partnerships and combinations of systems and services may exist between mailers and the distribution service provider to allow providing expanded offerings and user experiences to a recipient 12 of a distribution item 8.

In another embodiment, the system described in the figures above may provide additional interactivity associated with receiving a distribution item 8. For example, a distribution service provider may provide for a service that allows a user to provide personalized content that may be affixed or printed on a distribution item. For example, a mailer may wish to send an invitation to a birthday party and may be able to upload a custom picture from a digital camera or other drawings or personally chosen illustration to be printed on a mail piece. In some cases, the personalized item may be used as postage. The mailer would then be able to print or have printed the distribution item 8 for mailing to a select group of recipients. The mailer may also provide additional content, such as a media file that provides a personalized audio message to a service operated by the distribution service provider. The service of the distribution service provider would associate the uploaded image affixed to potential distribution items with the additional content.

After being sent, a recipient of the birthday invitation would be able to use a computing device 14 to electronically capture information about the personalized image sent with the invitation and provide the image or information derived from the image to a network service of the distribution provider as described in the figures above. The network service provider may then use the information or image to identify the distribution item 8 and associate the distribution item with content the mailer uploaded. This content may then be provided to the computing device 14 to be experienced by the recipient 12 using the computing device 14. For example, the computing device 14 may play the media file originally provided by the mailer. For example, a birthday card with a personalized image printed on the card could be used to link the computing device 14 to a media file that plays a "Happy Birthday" song. In another embodiment, a sender of the birthday card may be able to record and store a personalized greeting in a media file. The media file may be provided to a server and associated with an image affixed to the birthday card. As such, when a computing device 14 is used to process information on the distribution item 8, the computing device 14 may be able to access and play the personalized greeting. It should be appreciated that a wide variety of other invitations, greetings, and other such customized mailings could be provided by a mailer along with customized content that may be associated with the distribution item 8 and accessed by the recipient 12 upon receipt via a computing device 14.

In another embodiment, a distribution item 8 could include an invitation to an event, such as, for example, a wedding. When a recipient 12 uses a computing device 14 to decode an information item 10, the computing device 14 may prompt the user to add the event to an electronic calendar/reminder application. Further, the computing device may be able to link a recipient 12 to an electronic service or website associated with the event such as a website allowing a recipient 12 to RSVP, or to a gift registry web site.

In another embodiment, the system described in the figures above may facilitate and/or add interactivity to a coupon offering. For example, a service provider may send a distribution item 8 with an affixed information item 10 with a coupon that indicates a restriction on the total number of recipients that may redeem the coupon. In one case, to redeem the offer, a recipient 12 may use a computing device 14 to decode an information item 10, such as a barcode, on the coupon. The computing device 14 may then be linked to content that allows the recipient 12 to pay for the item advertised if the number of recipients that have redeemed the coupon is still within the amount allowed. Furthermore, the computing device 14 may display the remaining amount of coupon redemptions available. In another embodiment, the distribution item 8 including the coupon may be taken to a vendor and redeemed for some product or service. The information item 10 may be processed and/or decoded by the vendor in order to track the total amount of coupons used and to limit the coupon offering. Furthermore, before taking the coupon to a vendor to redeem the coupon, the recipient 12 may use a computing device 14 to process and/or decode the information item 10, so that the computing device 14 is linked to content that displays whether or not the coupon is still valid.

In another embodiment, the computing device 14 and information item 10 may be used to provider a recipient 12 with other unique product offerings that provide for a socialization concept. For example, a mailer may wish to make an offer for a product at a discount but only if enough people take advantage of such an offer. As one example, a car dealership may provide a discount price on an incoming shipment of new cars if 100 people in a geographic area are willing to make the purchase. According to the development, the mailer may send the offering in the mail to a geographic area indicating that the offer is valid if enough people within the area are willing to accept the offer. A recipient 12 in the defined area may use a computing device 14 to process and/or decode an information item 10 and be linked to information indicating how many people have currently expressed their willingness to accept the offer as a group as well as an option to accept or decline the offer. The information item 10 may be processed and/or decoded by the computing device 14 at a later time to check whether enough people have accepted the offer to make the offer effective. In this way, a sender can target and coordinate a group discount by sending the offer as a distribution item 8 with an information item 10.

In another embodiment, the systems described in the figures above may allow a computing device 14 to be used as a replacement of a physical distribution item 8 currently in route. For example, if a person loses a concert ticket, they may request a replacement ticket to be sent in the mail. However, the concert date may be sooner than the time needed to send the replacement ticket in the mail. In this case, a person may be allowed to obtain an image of an information item 10, such as an encoded value, that is being sent with the concert ticket. This may then be used to print the encoded value and be decoded at the concert venue to verify that the person has a valid ticket in the mail. In another embodiment, a recipient 12 of a concert ticket in the mail may use a computing device 14 to decode an encoded value affixed to the ticket. This may allow a recipient 12 to later store and/or access an image of the ticket (or encoded barcode affixed to the original ticket) at any time in case the original ticket is lost.

In another embodiment, a mailer may not wish to provide certain personal information, or may wish to conserve the amount of information, provided in a delivery item. For example, a mailer may send out phone bills to a recipient who has signed up for telephony services. The mailer may not wish to provide certain sensitive information about the identities of persons called, and other such information. Furthermore, the mailer may wish to conserve paper by limiting the amount of information sent with the bill in a distribution item. As such, the mailer may provide an information item 10 that may be used by a computing device 14 to be provided further information with respect to the bill. For example, a barcode or image may be affixed to the bill sent inside an envelope that may be decoded and or processed by a computing device 14.

Using the systems and services according to the description and figures described above, the computing device 14 may be provided with information about the bill in response to processing the bill with the computing device 14. The computing device and associated systems may further provide authorization services to authenticate that the recipient 12 is authorized to access the information. In addition to providing password protection and authentication services, the systems may use the geographic location of computing device 14 to determine the proximity of the person using the computing device to the address where the bill was delivered. If there is an anomaly, then access might be restricted. Furthermore, if the time the bill is processed using the computing device 14 is too far removed from the time the bill was sent to the recipient, then access may also be restricted. One skilled in the art can appreciate the variety of authorization that may be provided. Once authorized, the content via the computing device 14 may provide further information with respect to the bill such as personal information, further billing data, other sensitive information, and the like. Furthermore, the computing device 14 may provide an interface for sending an electronic payment or other automated payment options with respect to the bill in response to electronically processing information on the bill.

The systems and services according to the description and figures described above may therefore be used to verify the location of a user, for protecting, for example, against identify theft. For example, a user may sign up, via an online application, for a service and may submit an address along with other identifying information. The service provider providing the service may physically mail a distribution item 10 such as a mail piece to the address provided affixed with a barcode or other information described above. The user may then process the information affixed to the distribution item as described above. In response, geographic location information provided via the computer device 14 may be sent to verify the user's location in proximity to the address provided. This may allow to the service provider to verify the user and protect against identify theft or like scenarios.

In addition to the types of content/offerings described above, the development provided by the system in the figures above further contemplates other offerings, interactive services, tracking services, or the like.

Applications, User Interfaces, and User Preferences

Much of the functionality described above that may be performed on the computing device 14 may be provided via an application or set of application provided by the computing device 14. In this way, the computing device 14 may perform other functions and existing computing devices 14 may be enabled to perform the processing of information items 14 on distribution items 8 as described above. For example, the computing device 14 may be a smartphone. An application may be provided by the distribution service provider that may be downloaded or installed on the smartphone and be used for processing an information item 10 (or combination of information items) and communicating with a server 18 operated or configured by the distribution service provider. The application may comprise of a set of applications. Furthermore, third party applications may also be used that may make use of, for example, an application programming interface (API), to communicate with the servers 18 operated or configured by the distribution service provider to provide the functionality described above. Third party applications may need permission from the distribution service provider, providing the systems, to actually deliver content to a computing device using the systems and methods described herein. It should be noted that the operator of the third party application may need to have an agreement (such as a license, etc.) with the distribution service provider to be able to access information. It should be appreciated that the application(s) may be native applications that run on the computing device or may be non-native applications, such as web applications, that may be accessed via a web browser or similar functionality.

An application may provide the user with the ability to configure preferences with the types of information sent to an external server and with respect to the types of content received. More specifically, an application may allow the user select the types of information that will be sent to the server 18 by the computing device 14. For example, a user may not wish to have geographic location information sent to a server 18, or may wish other personal information that could be sent to further customized services or offerings not to be sent to a server 18. Further, an application may provide user preferences for which type of targeted content may be delivered to a computing device. For example, a user may be able to select a preference such that only coupons are returned, or that coupons are preferred over other advertisement content. Alternatively, a selectable preference may provide that no coupons are to be received and only other targeted offerings. One skilled in the art may appreciate the variety of different types of preferences that may be configured and set-up by the user to select the type of content that may be provided by the systems described above. Furthermore, user preferences may be configured per mailer such that each mailer may have set of preferences for content delivered or the type of information that may be sent by the computing device. Further information regarding user preferences per mailer may be found in U.S. patent application Ser. No. 13/179,442 entitled SYSTEM AND METHOD OF ELECTRONIC AND PHYSICAL MAIL CATEGORIZATION AND TARGETED DELIVERY, which is hereby incorporated by reference in its entirety.

The applications may provide a variety of user interfaces for displaying and providing content to a recipient 12. The applications may be able to provide haptic feedback and may provide a variety of audio visual capabilities as necessary or determined by the content associated with the distribution item 8.

Furthermore, applications and user interfaces may be provided to allow users to upload content and to associate uploaded content with mail sent to various recipients. For example, in the example above, a user interface may be provided to allow a user to upload personalized postage that will be affixed to a distribution item 8 along with uploading content that will be delivered to a recipient according to the figures described above. Furthermore, other systems and devices and accompanying user interfaces may be provided for mailers. For example, a mailer sending an advertising campaign may be able to sign up to associate content with distribution using systems and services provided by the distribution service provider. User interfaces may be provided to allow the mailer to associate different content with an information item 10 or a group of information items that will be sent with each distribution item 8. The mailer may further be able to customize the content according to the types of information that will be provided when the recipient processes the information item(s) 10. In conjunction with the disclosure above, one skilled in the art will appreciate the systems and devices and user interfaces that may be provided to allow for managing a mailing and associating targeted content with distribution items 8 that may be experienced by a recipient 12 via a computing device 14.

As described above, the systems and devices operated by the distribution service provider may provide the functionality to allow a computing device 14 to access content related to a distribution item 8 by using information items 10 on the distribution item 8. For example, the systems and devices operated by the distribution service provider may perform image recognition and other image processing and/or data processing to extract data from information items 10 captured by a computing device 14. The system and devices operated by the distribution service provider may further provide connectivity to third party services that host content or provide customized content. Further, as previously described, the systems and devices operated by the distribution service provider may provide user interfaces for allowing mailers to upload content and associate content with distribution items that will be sent.

Furthermore, the systems and applications described herein may further incorporate security measures that protect against various exploits (e.g., bots harvesting content) and to protect user data to ensure that user data being transmitted is not compromised. One skilled in the art will appreciate the various security measures that may be provided.

It should be further appreciated that the manner in which content is delivered via a computing device 14 may be performed in variety of ways. In some embodiments content is provided through a link that provides access to associated content in a web browser. In other embodiments, the content may be provided via a native application or integrated video player. In another embodiment, a computing device 14 may not have a display and may physically print content, or provide content through other mediums.

Customized Shipping Options

Figure 26:
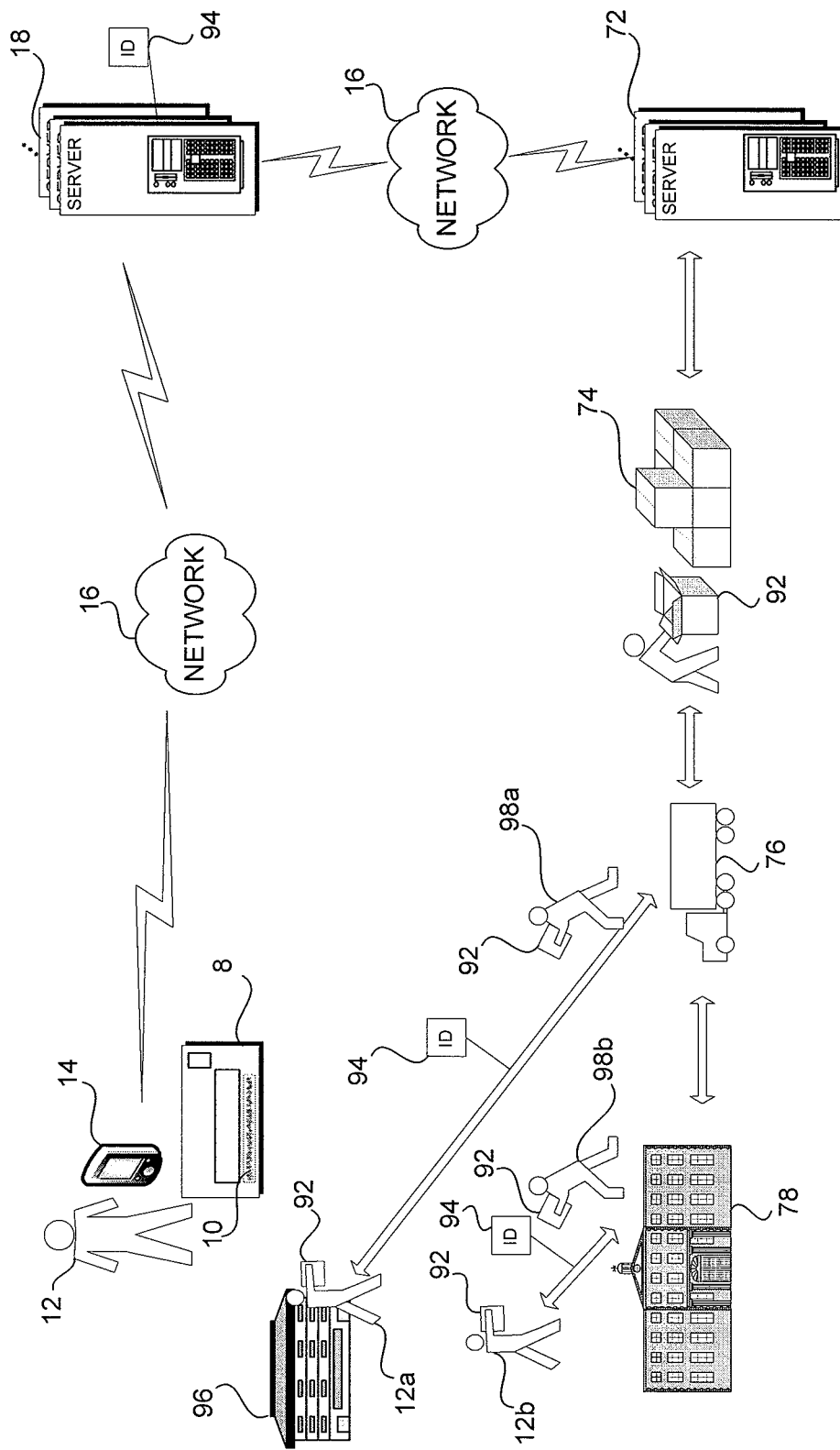
FIG. 26 shows an example of one aspect of a method for facilitating the purchase and delivery of a product or products.

FIG. 26 shows an example of one aspect of a system for providing content associated with a product to a purchaser 12 using an information item 10, as described above. In one embodiment, the purchaser 12 may be a recipient of a distribution item 8, as described in association with FIG. 2. The system may provide content associated with the distribution item 8 to the purchaser 12 of the distribution item 8 by using the information item 10. Additional types of possible information item 10 on the distribution item 8 may include Quick Response (QR) codes or Universal Product Codes (UPC) codes. A purchaser 12 may be an individual or any other entity described above. In certain embodiments the information item 10 is not limited to placement on a distribution item 8. For example, the encoded value 10 may be displayed on a physical product located in a store or the encoded value may be found in an advertisement or catalog.

The purchaser 12 can capture the information item 10 using a computing device 14 equipped with a digital camera. The computing device 14 can be a smart phone with an integrated digital camera, a personal computer with an attached digital camera device, a laptop computer with an integrated digital camera, a tablet computer, or any other computing device 14 capable of capturing and processing images. Once an image of the information item 10 has been captured by the computing device 14, the purchaser 12 may decode the information item 10 using the computing device 14 capable of transmitting a encoded or decoded value over a network 16. The encoded or decoded value may then be provided to a server 18, such as a web server, to retrieve the content or an indication of content associated with the distribution item 8 and identified by intelligent barcode 30 or other image as described above. The server 18 may then deliver the content to the computing device 14 over the network 16.

In one embodiment, the server 18 may act as a host server or network service to host the content of, for example, a merchant, such as an eCommerce merchant or internet merchant. The host server may be operated by the U.S. Postal Service. The content hosted on the remote server 18 may be delivered to the computing device 14. The content may be, for example, a product catalog containing product information such as price, size, color, or quantity available. Through communication with the remote server 18, the purchaser 12 may purchase one or more products offered for sale by the merchant. The purchase information may be routed to the server 72 of the merchant for order fulfillment. The accounting transaction may occur on the hosting server 18 or on the merchant server 72. User payment information may be stored on the hosting server 18 or other merchant server 72 that may allow for using different types of payments methods such as, but not limited to, credit cards, debit cards, PayPal, and the like.

In one embodiment, the hosting server 18 may route the purchaser 12 to the merchant server 72. The eCommerce partner server 72 may then deliver content to the computing device 14 over the network 16 by either passing the information through the hosting server 18 or delivering the content directly to the computing device 14 over the network 16. The content may be, for example, a product catalog containing product information such as price, size, color, and quantity available. Information may also be provided in the form of deferred purchase reminders, barcodes, QR codes, product images, and the like as described above. Through communication with the merchant server 72, the purchaser 12 may purchase one or more products offered for sale by the merchant.

As part of the purchase of the product, the purchaser 12 may be presented with an option of selecting a shipping location to which to have the product shipped. The purchaser 12 may choose to have the order shipped to his or her residence 96 or place of business (not shown). The purchaser 12 may also choose to have the order shipped to another person at his or her residence 96 or place of business. The purchaser 12 may also be presented with the option to have the order shipped to an alternative pick-up location 78, such as, for example, a U.S. Post Office. For example, the purchaser 12 may be able to set up delivery such that the merchant is aware of the destination mailer office address, but the actual delivery address is known exclusively by the mailer. In another embodiment, as is further described below, anonymous delivery may be provided. In addition, the purchaser 12 may be presented with information relating to different shipping pricing information and shipping service commitment information. The purchaser 12 may further be provided with tracking information and to set up tracking notifications. Information exchanged between the computing device 14 of the purchaser and the host server 18 or the merchant server 72 may be exchanged security using a secured electronic data interchange, e.g., via the Internet.

The hosting server 18 may generate a unique identifier 94 to be associated with the order for the purchase of the products. The unique identifier 94 may be, for example, a series of or letters or numbers, a symbol, a picture, or a number chosen by the purchaser 12 or a combination of any of these options. The unique identifier 94 may be transmitted from the hosting server 18 to the merchant server 72. The unique identifier 94 may also be transmitted from the hosting server 18 to the computing device 14 to be viewed by the purchaser 12. The purchaser 12 may be required to disclose the unique identifier 94 to a delivery person 98a, 98b at a later time in order to receive the product from the delivery person 98a, 98b.

When the merchant has received the order information and the unique identifier 94 from the hosting server 18, the merchant may fulfill the order at the merchant's facility 74. The ordered product 92 may be provided to a shipping service 76, such as, for example, the U.S. Postal Service, to be delivered to the shipping location chosen by the purchaser 12. In one embodiment, the merchant may also provide to the shipping service 76 the unique identifier 94. In one embodiment, the unique identifier may be transmitted directly from the hosting server 18 to the shipping service 76 without requiring the merchant to relay the unique identifier 94 to the shipping service 76. The shipping service 76 may then deliver the product to the shipping location, such as the chosen pick-up location 78 or the purchaser's residence 96.

If the purchaser 12 has chosen a residence 96 or place of business as the shipping location, the shipping service 76 can deliver the product 92 directly to the residence 96 or place of business. In such a case, the shipping service 76 and delivery personnel 98a would have received the unique identifier 94 from the hosting server 18. In order to provide the product to the purchaser 12a (or the purchaser's representative) upon delivery, the purchaser 12a would be required to disclose or otherwise provide proof of the unique identifier 94 to the delivery personnel 98a. When the delivery personnel 98a is assured that the unique identifier 94 disclosed by the purchaser 12a matches the unique identifier 94 provided by the hosting server 18, the delivery personnel 98a may transmit the product 92 to the purchaser 12a.

In one embodiment, the purchaser 12 may choose a pick-up location 78 as the shipping location. In one embodiment, the pick-up location 78 may be a U.S. Post Office. In this manner the shipping service 76 delivers the product 92 to the pick-up location 78 for retrieval by the purchaser 12b. The purchaser may be notified by the hosting server 18 that the product 92 has been delivered to the pick-up location 78 and is available for retrieval by the purchaser 12b. The unique identifier 94 may be provided by the shipping service 76 to the pick-up location 78 at the time of delivery. When the purchaser 12b arrives at the pick-up location 78 to retrieve the product 92, the purchaser 12a is required to disclose or otherwise provide proof of the unique identifier 94 to delivery personnel 98b. When the delivery personnel 98b is assured that the unique identifier 94 disclosed by the purchaser 12b matches the unique identifier 94 provided by the hosting server 18, the delivery personnel 98b may transmit the product 92 to the purchaser 12a.

According to one embodiment, a potential recipient may sign up for a service to have items delivered to a locker. As such, the unique identifier 94 may be identified for deliver to a specific locker. The mailer would receive the unique identifier that may be provided to the shipping service 76 to allow the shipping service to know what locker to deliver an item to. The purchaser may then be notified electronically when there is an item in the locker to be retrieved. The purchaser 12 may then retrieve the item from the locker. By using a unique identifier in conjunction with the systems just described, the user can anonymously be delivered and pick up a product.

Figure 27:
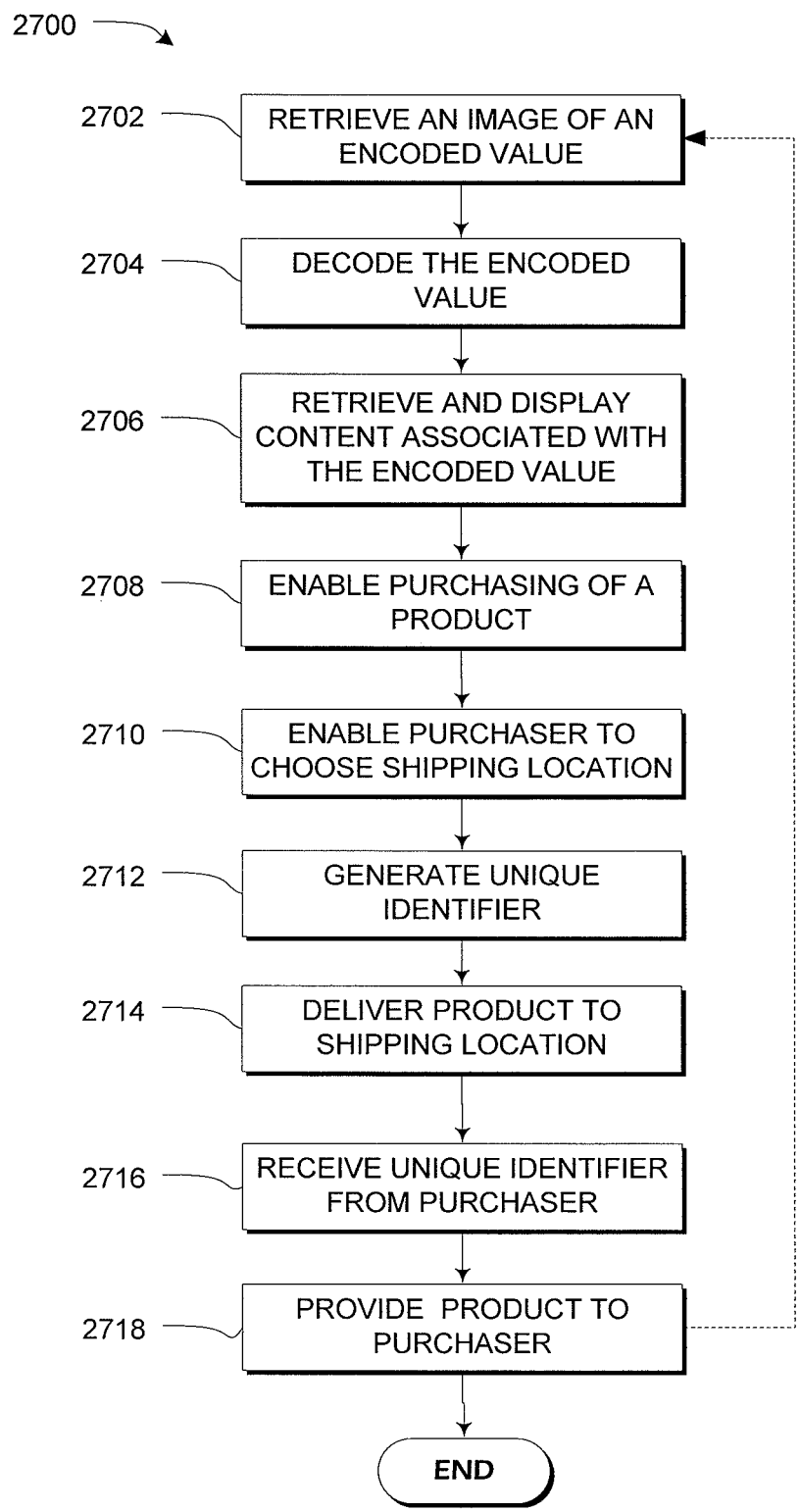
FIG. 27 shows a flowchart of an exemplary method for facilitating the purchase and delivery of a product as shown in FIG. 26.

FIG. 27 shows a flowchart of an exemplary method for facilitating the purchase and delivery of a product as shown in FIG. 26. The method 2700 may begin at block 2702 when a distribution item 8, product, catalog, advertisement, etc. having a machine-readable encoded value is received and/or viewed by a purchaser. The machine-readable encoded value may be an intelligent barcode 30 as described above. In block 2704, the machine readable encoded value is processed and decoded using a computing device 14. The computing device 14 may be, for example, a desktop computer, a portable computer (e.g., laptop, netbook, etc.), a smart-phone, a tablet computer, or the like. The processing may include capturing information about the encoded value, and decoding or preparing the encoded value so that it may be used by a network service to determine information associated with the distribution item 8 as will be further described below.

After processing and decoding the encoded value in block 2704, in block 2706 the processed encoded value is provided to a network service and the network service may retrieve information associated with the encoded value 10 based on the information about the encoded value received from the computing device 14. The network service may provide the information associated with the encoded value 10 to the computing device 14. This information may be provided in a variety of forms, such as text viewable on the computing device 14, a link to further content accessible via a web browser on the computing device 14, media files, purchasing information or other information that may be used by the computing device 14 to access information associated with the encoded value 10 and associated product.

In some embodiments, the processed encoded value may be an image of the encoded value prepared for decoding by the network service. In other embodiments, the processed encoded value may be a decoded or partially decoded value which may be used by the network service to determine information associated with the distribution item 8, as will be described in further detail below.

In block 2706, the network service may determine and/or retrieve information associated with the distribution item 8 based on the information about the encoded value received from the computing device 14. The network service may provide the information associated with the encoded value and the product to the computing device 14 and may enable the purchasing of a product in block 2708.

In block 2710, the network service may allow the purchaser of the product to choose a shipping location and in block 2712 may generate and provide to the purchaser a unique identifier associated with the order of the product. The unique identifier may also be provided to the merchant selling the product and/or the shipping service tasked with delivering the product. The unique identifier may be a series of numbers or letters, a picture, or a symbol. The merchant may then fulfill the order and provide the product to the shipping service for delivery in block 2714.

In block 2714, the shipping service may deliver the product to the shipping location chosen by the purchaser. The shipping location can be a residence or place of business of the purchaser or may be the residence or place of business of another person to whom the purchaser would like to send the product. Alternatively, the shipping location can be a pick-up location, such as a U.S. Post Office or other shipping service hub.

If the purchaser elects to send the product to a residence or place of business, the delivery personnel would, in block 2716, receive from the purchaser (or person to whom the purchaser had the product sent) the unique identifier. In this manner, the product may be shipped using semi-discrete shipping in that the delivery personnel would know the shipping location, but the merchant need not know the shipping location, but only the unique identifier to fulfill the order and provide the product to the shipping service. The delivery personnel then may receive the unique identifier and match the unique identifier with the shipping location which would be received from the network services, such as hosted by the U.S. Postal Service. The delivery personnel may then verify that the unique identifier provided by the purchaser matches the unique identifier generated by the network services. The delivery personnel may then provide the product to the purchaser in block 2718.

If the purchaser elects to send the product to a pick-up location, the delivery personnel would, in block 2716, deliver the product to the pick-up location. The purchaser (or the purchaser's authorized representative) may then be notified of the delivery of the product to the pick-up location. In this manner, the product may be shipped and delivered using a discrete shipping method because the delivery personnel and the pick-up location personnel would not need to know the address of the residence or place of business of the purchaser. The purchaser may then go to the pick-up location to retrieve the product. At the pick-up location the personnel at the pick-up location would then receive from the purchaser the unique identifier and verify that it matches the unique identifier generated by the network services. The pick-up location personnel may then provide the product to the purchaser in block 2718. The method described by FIG. 27 may be repeated for any distribution item 8 or other product with an encoded value such as an intelligent barcode 30.

As mentioned above, while several aspects of several embodiments have been described above with respect to intelligent barcodes, a wide variety of machine-readable encoded values are contemplated by the development. For example, the encoded values could correspond to other types of barcodes and further to include 2D barcodes and other machine-readable values. Furthermore, the encoded value may simply be a string of numbers which may be decoded and interpreted according to the embodiments described above.

While several aspects of several embodiments have been described above with respect to distribution items, an information item 10 along with the systems and methods described above may be used with a wide variety of distribution items. Distribution items may include distribution items, products, periodicals, books, and the like. Furthermore, information items 10 may be affixed to other objects and are not limited to distribution items. As such, the intelligent barcode and the systems and methods described above may be used in a variety of contexts not limited to a mailing system and may be used in conjunction with a variety of products and or items. Interactive content and further services or offerings may be accessed via a computing device for any one of these items similar to the descriptions provided above.

Figure 28:
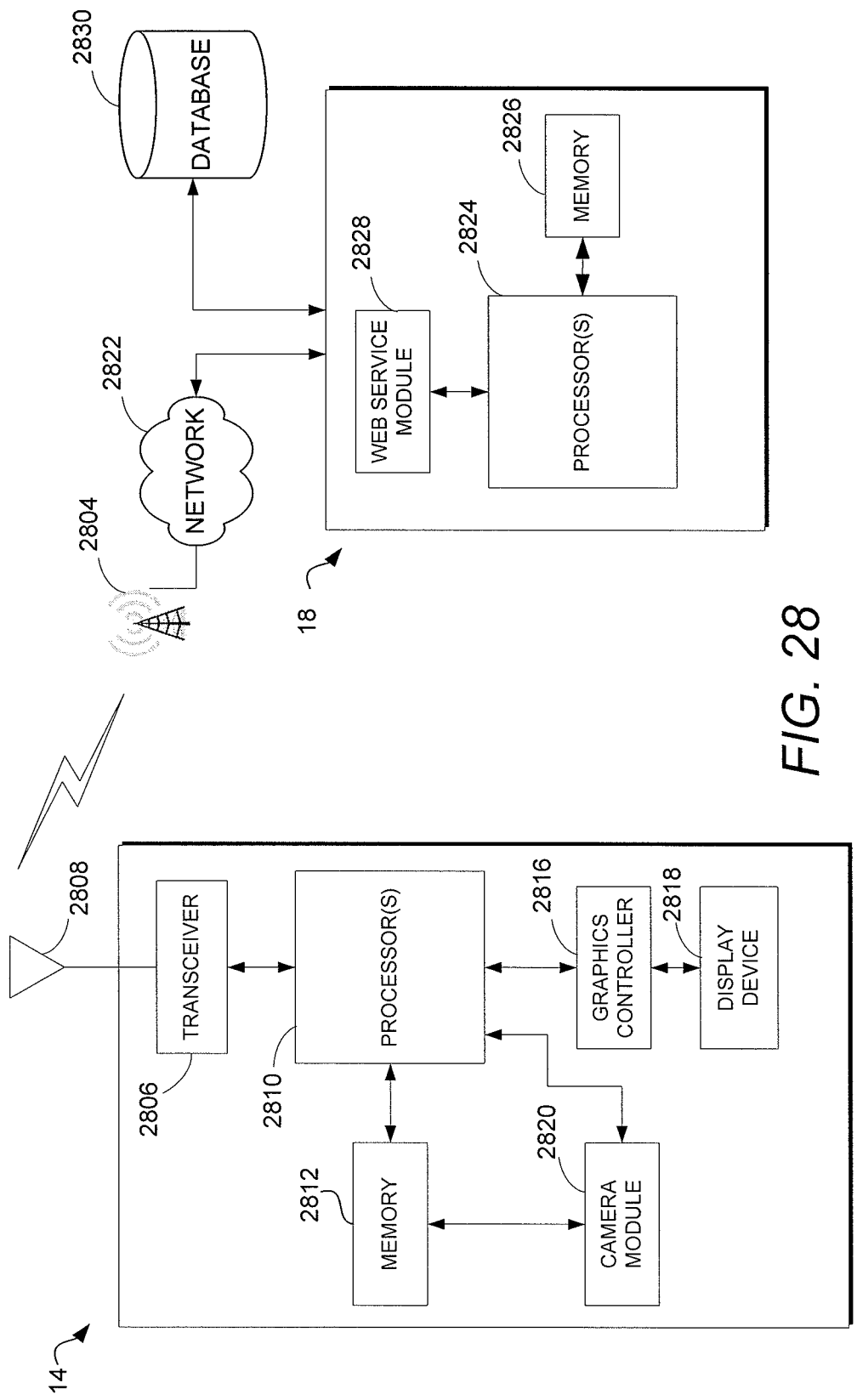
FIG. 28 shows an exemplary functional block diagram illustrating one embodiment of a computer system that can be used in retrieving content associated with a mail piece using an encoded value.

A detailed block diagram of an example computer environment, according to some embodiments, is now described. In particular, FIG. 28 illustrates a computing device 14 that may be used for processing an information item 10 affixed to a distribution item 8, according to some example embodiments as describe above. As illustrated in FIG. 28, the computing device 14 comprises a processor(s) 1710. The computing device 1702 also includes a memory unit 2812, a processor bus (not shown), and an Input/Output controller hub (ICH) (not shown). The processor(s) 2810, the memory unit 2812, and the ICH are coupled to a processor bus (not shown). The processor(s) 2810 may comprise any suitable processor architecture. The computing device 14 may comprise one, two, three, or more processors, any of which may execute a set of instructions in accordance with embodiments of the development.

The memory unit 2812 may store data and/or instructions, and may comprise any suitable memory, such as a dynamic random access memory (DRAM). The computing device 14 may also includes an IDE drive(s) (not shown) and/or other suitable storage devices. A graphics controller 2816 controls the display of information on a display device 2818, according to some embodiments of the development. A camera module 2820 may also be included which includes hardware and/or circuitry that allows images to be captured that may be stored in the memory 2812 and processed using the processor(s) 2816. The computing device may further have a near field communication (NFC) module (not shown) which may be an RFID tag reader or other NFC hardware that allows communication with other short range wireless objects, affixed, for example, to a distribution item. In addition, the computing device 14 may include a global positioning system (GPS) module that may provide data with respect to the geographic location of the computing device 14.

The input/output controller hub (ICH) (not shown) provides an interface to I/O devices or peripheral components for the computer system 14. The ICH may comprise any suitable interface controller to provide for any suitable communication link to the processor(s), the memory unit 2812, and/or to any suitable device or component in communication with the ICH. In one embodiment of the development, the ICH provides suitable arbitration and buffering for each interface.

As also shown in FIG. 28, a server 18 is illustrated that may be used to carry out the functions as described with reference to the figures above. The server 18 may include a processor(s) 2824. The server 18 also includes a memory unit 2826 and a processor bus (not shown). The processor(s) 2824 and the memory unit 2826 are coupled to a processor bus (not shown). The processor(s) 2826 may comprise any suitable processor architecture. The server 18 may comprise one, two, three, or more processors, any of which may execute a set of instructions in accordance with embodiments of the development.

The memory unit 2826 may store data and/or instructions, and may comprise any suitable memory, such as a dynamic random access memory (DRAM). The server 18 may also includes an IDE drive(s) (not shown) and/or other suitable storage devices. The server may further be able to communicate with a database 2830 that may be integrated along with the hardware of the server or may be in a different location. The server 18 may further comprise network interface modules and hardware for communicating over a network. The server 18 may further comprise a web service module 2828. In some embodiments the web service module 2828 may comprise instructions stored in memory 2826 and executed using the processor 2824.

In some embodiments, the computing device 14 includes a machine readable medium that stores a set of instructions (e.g., software) embodying any one, or all, of the methodologies described herein. Furthermore, software may reside, completely or at least partially, within the memory unit 2812 and/or within the processor(s) 2810.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A computing device comprising:
   an image capture device;
   a display device;
   one or more processors configured to receive image data from the image capture device; and
   a non-transitory medium containing instructions that, when executed by the one or more processors, causes the one or more processors to perform operations comprising:
   identifying an image of an information item on a distribution item using the image data;
   generating a data item determined by the information item;
   at least partially decoding, by a decoder component, the data item to determine a set of attributes of the distribution item;
   transmitting, by a network component, at least one of the attributes in the set of attributes, the at least one of the attributes comprising routing information, tracking information, or sorting information corresponding to the distribution item;
   receiving, by the network component, a response to the transmitted at least one of the attributes, the response comprising an indicator of content associated with the distribution item;
   retrieving, by the network component in response to receiving the indicator, the content associated with the distribution item using the indicator; and
   causing the display device to display the content associated with the distribution item.

2. The computing device of claim 1, wherein the information item comprises computer-readable indicia usable by a distribution entity to route and track the distribution item for physical delivery.

3. The computing device of claim 1,
   wherein instructions cause the one or more processors
   to transmit an identifier corresponding to a mailer and wherein retrieving the content comprises retrieving a product or service offering associated with the mailer.

4. The computing device of claim 1, wherein determining the set of attributes comprises identifying at least one of a barcode identifier, a service type identifier, a mailer identifier, a distribution item identifier, and a routing code.

5. The computing device of claim 1, wherein the response comprises a link to the content associated with the distribution item, wherein the causing the display device to display the content associated with the distribution item comprises viewing the link in a web browser.

6. The computing device of claim 1, wherein the information item comprises a barcode.

7. The computing device of claim 6, wherein the barcode comprises a number of vertical bars, and wherein each of the number of vertical is one of an ascender bar, a descender bar, a full bar, or a tracker bar, and wherein a character in the character string comprises a letter corresponding to one of the ascender bar, descender bar, full bar, or tracker bar.

8. The computing device of claim 1, wherein the display device is configured to display an overlay frame for use in identifying the image of the encoded value.

9. The computing device of claim 1, wherein the information item comprises an image of a product being advertised by the distribution item, and wherein retrieving the content comprises retrieving interactive product information about the product.

10. The computing device of claim 1, wherein the information item comprises an Intelligent Mail Barcode™, and wherein retrieving the content comprises retrieving interactive product information about a product being advertised in the distribution item.

* * * * *